US007904396B2

(12) United States Patent
Hinchey et al.

(10) Patent No.: US 7,904,396 B2
(45) Date of Patent: Mar. 8, 2011

(54) SYSTEMS, METHODS AND APPARATUS FOR QUIESENCE OF AUTONOMIC SAFETY DEVICES WITH SELF ACTION

(75) Inventors: Michael G. Hinchey, Bowie, MD (US); Roy Sterritt, Newtownabbey (GB)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 117 days.

(21) Appl. No.: 11/533,895

(22) Filed: Sep. 21, 2006

(65) Prior Publication Data

US 2007/0260570 A1 Nov. 8, 2007

Related U.S. Application Data

(60) Provisional application No. 60/789,629, filed on Mar. 28, 2006.

(51) Int. Cl.
*G06F 17/00* (2006.01)
*G06F 17/20* (2006.01)

(52) U.S. Cl. ........................................................ 706/11

(58) Field of Classification Search .................... 706/11
See application file for complete search history.

(56) References Cited

U.S. PATENT DOCUMENTS 4,225,860 A * 9/1980 Conforti ..................... 340/629
7,113,091 B2 * 9/2006 Script et al. ................. 340/546
2004/0104807 A1 * 6/2004 Ko ............................ 340/5.83
2006/0103540 A1 * 5/2006 Rutter et al. ................ 340/628

OTHER PUBLICATIONS

Sterritt, R. and Hinchey, M. "Apoptosis and Self-Destruct: A Contribution to Autonomic Agents?", Formal Approaches to Agent-Based Systems, Springer Berlin/Heidelberg, Jan. 2005, pp. 262-270.*
Sterritt, R. "Autonomic computing", J. Innovations in Systems and Software Engineering, Mar. 2005, pp. 79-88.*
Chakraborty, G. Murakami, M. Shiratori, N. and Noguchi, S. "A growing network that optimizes between undertraining andovertraining", IEEE ICNN, 1995, pp. 1116-1120.*
Saffre et al. "Reliable sensor networks using decentralised channel selection", Computer Networks, 45 (2004), 651-663.*
Hsin et al. "Self-monitoring of wireless sensor networks", Computer Communications 29 (2006) 462-476.*

* cited by examiner

*Primary Examiner*—Michael B. Holmes
*Assistant Examiner*—Li-Wu Chang
(74) *Attorney, Agent, or Firm*—Heather Goo

(57) ABSTRACT

Systems, methods and apparatus are provided through which in some embodiments an autonomic environmental safety device may be quiesced. In at least one embodiment, a method for managing an autonomic safety device, such as a smoke detector, based on functioning state and operating status of the autonomic safety device includes processing received signals from the autonomic safety device to obtain an analysis of the condition of the autonomic safety device, generating one or more stay-awake signals based on the functioning status and the operating state of the autonomic safety device, transmitting the stay-awake signal, transmitting self health/urgency data, and transmitting environment health/urgency data. A quiesce component of an autonomic safety device can render the autonomic safety device inactive for a specific amount of time or until a challenging situation has passed.

36 Claims, 41 Drawing Sheets

4000

SYSTEMS, METHODS AND APPARATUS FOR QUIESENCE OF AUTONOMIC SAFETY DEVICES WITH SELF ACTION

RELATED APPLICATIONS

This application claims the benefit of U.S. Provisional Application Ser. No. 60/789,629 filed Mar. 8, 2006 under 35 U.S.C. 119(e). This application also claims, under 35 U.S.C. 120, the benefit of, and is a continuation-in-part to, co-pending U.S. Original application Ser. No. 11/533,855 filed Sep. 21, 2006, entitled "SYSTEMS, METHODS AND APPARATUS FOR QUIESCENCE OF AUTONOMIC SYSTEMS," which claims the benefit of U.S. Provisional Application Ser. No. 60/811,149 filed May 15, 2006 under 35 U.S.C. 119(e), which claims, under 35 U.S.C. 120, the benefit of, and is a continuation-in-part to co-pending U.S. Original application Ser. No. 11/426,853, filed Jun. 27, 2006, entitled "SYSTEMS, METHODS AND APPARATUS OF SELF-PROPERTIES FOR AN AUTONOMOUS AND AUTOMATIC COMPUTER ENVIRONMENT" which claims the benefit of U.S. Provisional Application Ser. No. 60/662,990 filed Jun. 27, 2005 under 35 U.S.C. 119(e), which claims, under 35 U.S.C. 120, the benefit of, and is a continuation-in-part to co-pending U.S. Original application Ser. No. 11/251,538, filed Sep. 29, 2005, entitled "SYSTEM AND METHOD FOR MANAGING AUTONOMOUS ENTITIES THROUGH APOPTOSIS," which claims the benefit of U.S. Provisional Application Ser. No. 60/634,459 filed Dec. 7, 2004 under 35 U.S.C. 119(e).

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates generally to artificial intelligence and, more particularly, to architecture for collective interactions between autonomous entities.

BACKGROUND OF THE INVENTION

Conventional smoke detectors are helpful in alerting people to fire danger and thus saving lives and property. Smoke detectors are generally categorized or described as devices that improve safety for subjects such as humans, animals and equipment by detecting hazardous conditions that are unsafe to the subject and that also improve safety by providing an alert of the condition.

One function of conventional smoke detectors is detecting a weak battery source, or other weak power source. Commonly, smoke detectors emit an intermittent high-pitched beep to alert humans to the unreliability of the smoke detector and the need to replace the batteries. Alerting humans to the low battery may provide only the most primitive of status reporting and indication. Most unfortunately, the beeping can be performed only while sufficient power remains in the battery. At some point in time, as the battery power continues to weaken, without refreshed batteries, or connection to an A/C power source, the smoke detector will not receive sufficient power from the batteries In some instances, the operation of a particular smoke detector can be either detrimental to the smoke detector itself or to the facility in which the smoke detector is located. For example, a smoke detector itself might cause a fire in the facility when the electronics in the smoke detector malfunction. However, conventional systems are largely ineffective at preventing such a problem.

For the reasons stated above, and for other reasons stated below which will become apparent to those skilled in the art upon reading and understanding the present specification, there is a need in the art to discover and report fault(s) or failure of the smoke detectors when most needed. There is also a need in the art to reduce the possibility that smoke detectors will damage the system of which the smoke detector is a part. There is also a need in the art for smoke detectors that can be functionally extracted from an environment upon the occurrence of a predetermined condition.

BRIEF DESCRIPTION OF THE INVENTION

The above-mentioned shortcomings, disadvantages and problems are addressed herein, which will be understood by reading and studying the following specification.

In at least one embodiment, a method for managing a system of autonomic environmental safety devices based on functioning state and operating status of the system of autonomic environmental safety devices may include processing received signals from the system of autonomic environmental safety devices indicative of the functioning state and the operating status to obtain an analysis of the condition of the system of autonomic environmental safety devices, generating one or more stay awake signals based on the functioning status and the operating state of the system of autonomic environmental safety device, transmitting the stay-awake signal, transmitting self health/urgency data, and transmitting environment health/urgency data of the autonomic environmental safety devices. In some embodiments, an autonomic environmental safety device may be a smoke detector.

In other embodiments, an autonomic environmental safety device may include a self-monitor that is operable to receive information from sensors and operable to monitor and analyze the sensor information and access a knowledge repository; a self adjuster operably coupled to the self-monitor in a self control loop, the self adjuster operable to access the knowledge repository, the self adjuster operable to transmit data to effectors, and the self adjuster operable to plan and execute; an environment monitor that is operable to receive information from sensors and operable to monitor and analyze the sensor information and access the knowledge repository; an autonomic manager communications component operably coupled to the environment monitor in an environment control loop, the autonomic manager communications component operable to access the knowledge repository, the autonomic manager communications operable to produce and transmit a pulse monitor signal, the pulse monitor signal including a heart beat monitor signal and a reflex signal, the reflex signal including self health/urgency data and environment health/urgency data.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

The detailed description is divided into five sections. In the first section, a system level overview is described. In the second section, embodiments of methods are described. In the third section, hardware and the operating environments in conjunction with which embodiments may be practiced are described. In the fourth section, particular implementations of apparatus are described. Finally, in the fifth section, a conclusion of the detailed description is provided.

System Level Overview

Figure 1:
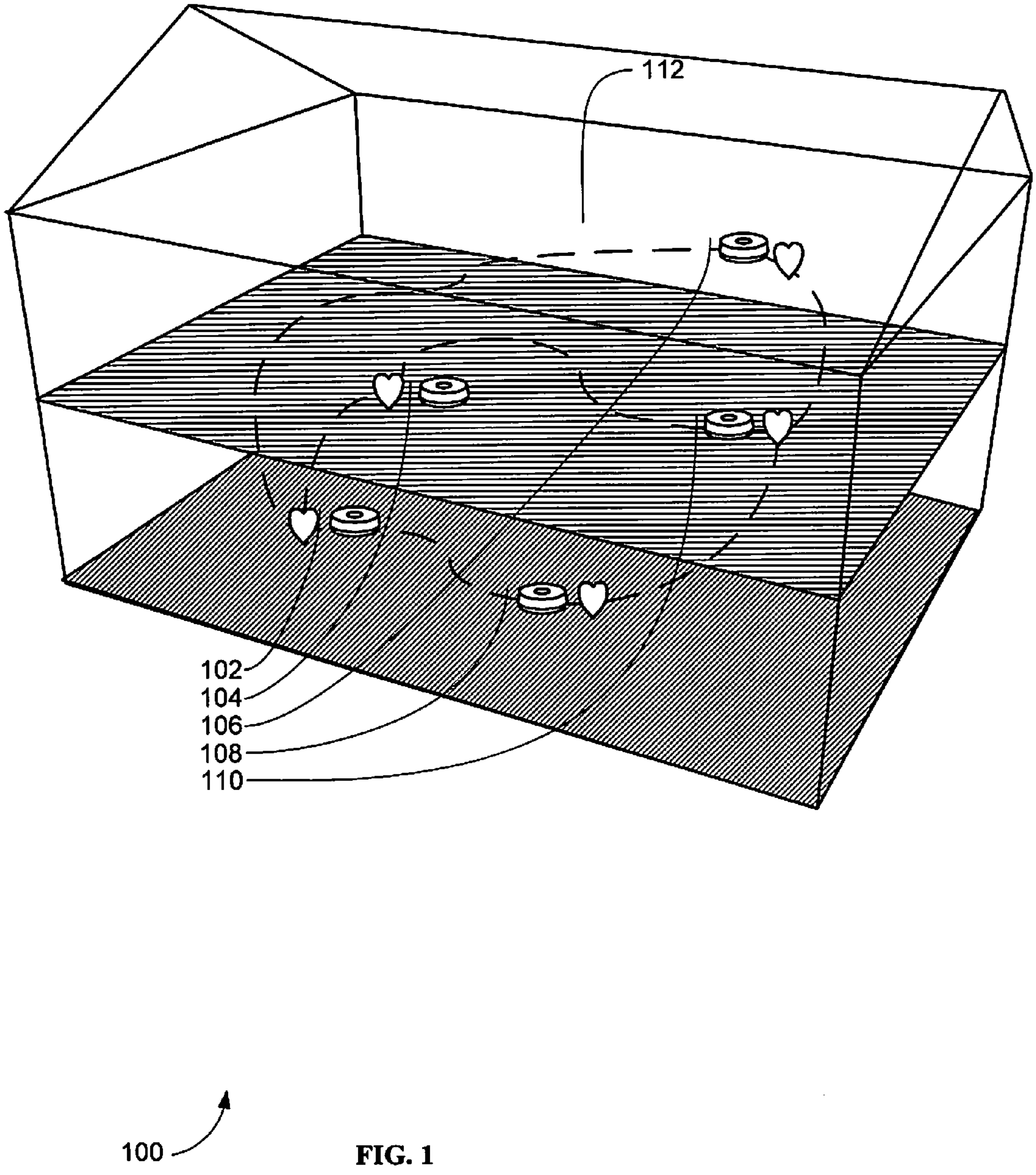
FIG. 1 is a block diagram of an overview of a system of autonomic environmental safety devices, according to an embodiment.

FIG. 1 is a block diagram of an overview of a system 100 of autonomic environmental safety devices, according to an embodiment. System 100 may solve the need in the art to discover and report fault(s) or failure of the smoke detectors and may solve the need in the art to reduce the possibility that smoke detectors will jeopardize the mission of the system of which the smoke detector is a part.

The autonomic smoke detectors 102, 104, 106, 108 and 110 (or other autonomic environmental safety devices), can transmit status data such as environment health/urgency data of the autonomic smoke detectors over a network 112. The status data may be available for analysis by all of the autonomic smoke detectors 102, 104, 106, 108 and 110 and by other entities that access the network 112. The status information can be analyzed to identify existing or potential faults of the smoke detectors. Thus, system 100 may provide a mechanism to determine if any of the autonomic environmental safety devices may be faulty.

The autonomic smoke detectors 102, 104, 106, 108 and 110 and the network 112 may be organized in a heuristic neural system (HNS) architecture. Each smoke detector can be a member of a swarm of autonomous environmental safety devices and may provide coordination and interaction between each HNS that yields performance of the aggregate of the swarm that exceeds the performance of a group of generalist autonomic environmental safety devices.

In some embodiments of system 100, each of a number of AESDs may be an autonomic smoke detector. Each autonomic smoke detector in a swarm may have a specialized mission, much like ants in an ant colony have a specialized mission. Yet, a heuristic neural system (HNS) architecture of each autonomic smoke detector may provide coordination and interaction between each HNS that yields performance of the aggregate of the AESDs that exceeds the performance of a group of generalist AESDs.

A synthetic neural system may be defined as an information processing paradigm that is inspired by biological nervous systems that process information, such as the brain. Biological systems inspire system design in many other ways, such as reflex reaction and health signs, nature inspired systems, hive and swarm behavior, and fire flies, for example. These synthetic systems can provide an autonomic computing entity that can be arranged to manage complexity, continuous self adjustment, adjustment to unpredictable conditions, and prevention and recovery from failures.

In some embodiments, a key element of synthetic neural systems may be the general architecture of the synthetic neural system. A synthetic neural system may be composed of a large number of highly interconnected processing autonomic elements that may be analogous to neurons in a brain working in parallel to solve specific problems. Unlike general purpose brains, a synthetic neural system may be typically configured for a specific application and sometimes for a limited duration.

In some embodiments of system 100, the autonomic smoke detectors 102, 104, 106, 108 and 110 may be operable to signal a network alarm, and in some embodiments, the autonomic smoke detectors 102, 104, 106, 108 and 110 may also be operable to trip an alarm on the autonomic smoke detector that detected an environmental condition.

In some embodiments, the autonomic smoke detectors 102, 104, 106, 108 and 110 may also be operable to transmit a signal indicating failure of the autonomic smoke detectors 102, 104, 106, 108 and 110. In other embodiments, all of the autonomic smoke detectors 102, 104, 106, 108 and 110 may be operable to signal the failure of one of the other autonomic smoke detectors 102, 104, 106, 108 and 110.

In a situation where all but one of the autonomic smoke detectors 102, 104, 106, 108 and 110 in a building may be operating correctly (i.e., if one autonomic smoke detector is faulty, or to lose power, such as battery failure, etc.) the fault of that one autonomic smoke detector would be detected by the failure of other autonomic smoke detectors 102, 104, 106, 108 and 110 to receive a first "heartbeat" (the "lub") within a specified period of time, and the second beat (the "dub") to carry operational data. The heartbeat (the "lub") can also be known as a heart beat monitor (HBM) signal and second beat can also be known as a pulse monitor (PBM) signal. In some embodiments, if an alarm signal is to be sounded by one of the autonomic smoke detectors, the second beat (the PBM) may convey the alarm information to the other autonomic smoke detectors in the building so that the other autonomic smoke detectors can activate their own alarm.

In some embodiments, the autonomic smoke detectors 102, 104, 106, 108 and 110 may be operable to link devices within a building together through wireless connections.

System 100 may have applications and embodiments in a large number of areas beyond a smoke detector. Beyond smoke detectors, other types of autonomic environmental safety devices may include burglar alarm systems, sprinkler systems, satellites, and any "sensor network" or monitoring system where a number of simple sensors may be used together in a way that collects information regarding the status of various devices. In some of these applications, the first beat of the lub-dub is used to carry health information (i.e., that the device is functioning correctly and forwarding data readings in a timely fashion) and the second to carry instructions or signals, either trigged by a particular event (e.g., detection of smoke) or to perform various operational functions.

The autonomic smoke detectors 102, 104, 106, 108 and 110 may be a particular embodiment of autonomic environmental safety devices that illustrate the principles of how autonomic environmental safety devices in general operate. System 100 may provide a way for all smoke detectors in the house/building to indicate environmental hazards. Wireless embodiments of the network 112 can provide for easy installation of the autonomic smoke detectors 102, 104, 106, 108 and 110.

System 100 is not limited by the number of autonomic environmental safety devices. Some embodiments of system 100 may include one autonomic environmental safety device, some embodiments may include a plurality of autonomic environmental safety devices.

Method Embodiments

In the previous section, an overview of some system embodiments is described. In this section, embodiments of particular methods of such embodiments are described by reference to a series of flowcharts. Describing the methods by reference to a flowchart enables one skilled in the art to develop such programs, firmware, or hardware, including such instructions to carry out the methods on suitable computers, executing the instructions from computer-readable media. Similarly, the methods performed by the server computer programs, firmware, or hardware may also be composed of computer-executable instructions. In some embodiments, method 200 may be performed by a program executing on, or performed by firmware or hardware that is a part of a computer, such as computer 2202 in FIG. 22.

Figure 2:
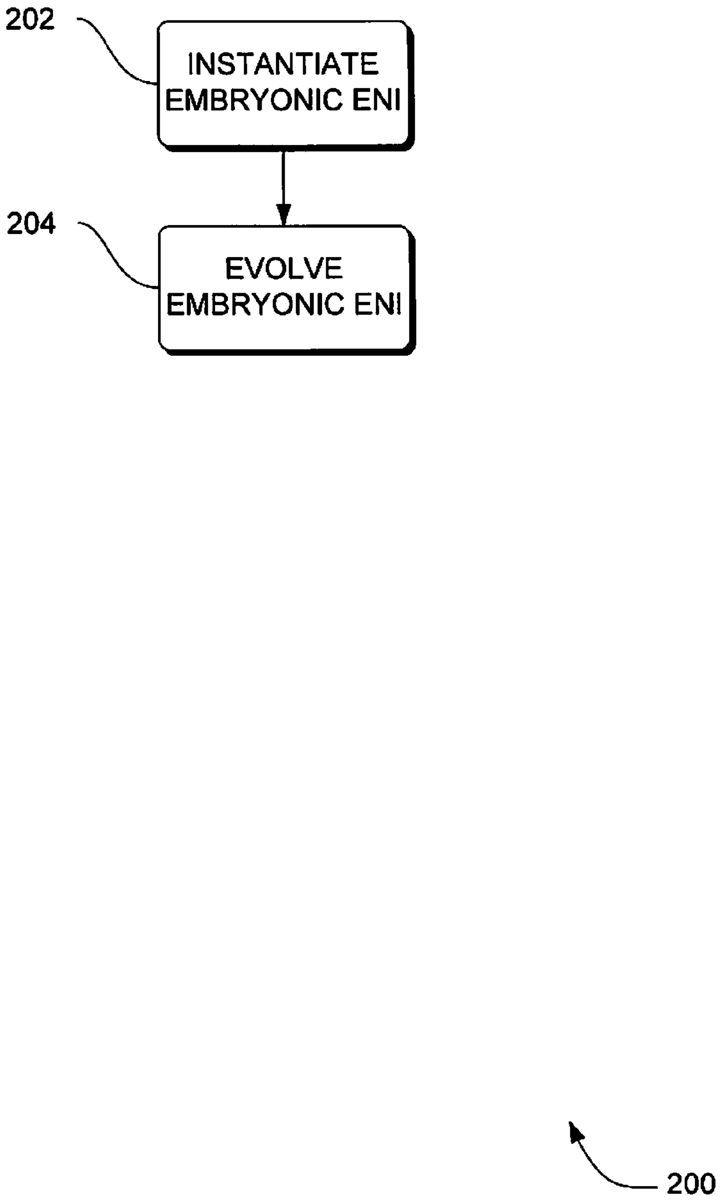
FIG. 2 is a flowchart of a method to construct an environment to satisfy increasingly demanding external requirements, according to an embodiment.

FIG. 2 is a flowchart of a method 200 to construct an environment to satisfy increasingly demanding external requirements, according to an embodiment.

Method 200 may include instantiating 202 an embryonic evolvable neural interface (ENI). In some embodiments, the embryonic ENI lacks a complete specification of the operational characteristics of the ESNS or an ENI. The embryonic ENI can be a neural thread possessing only the most primitive and minimal connectivity.

Method 200 can further include evolving 204 the embryonic ENI towards complex complete connectivity. Specifications of the inter-ENI 106 can be developed from the initial embryonic form. Thus, a very complex problem that, in some embodiments, may be represented by a complete specification can be replaced by a simpler specification of the embryonic ENI that is evolved to meet increasingly demanding requirements. Progression from an embryonic state to a more complex state can avoid the necessity of specifying the complex complete connectivity initially, but rather can reduce the problem to one of developing methods to drive the evolution of simple limited connectivity to complex complete connectivity.

An adaptive or evolutionary nature of an artificial intelligence construct in method 200 can be predicated on an active revision of the embryonic ENI to meet external action requirements for a sensory input. In particular, the ENI can evolve due to changing conditions that are either driven by training requirements or operational requirements.

Figure 22:
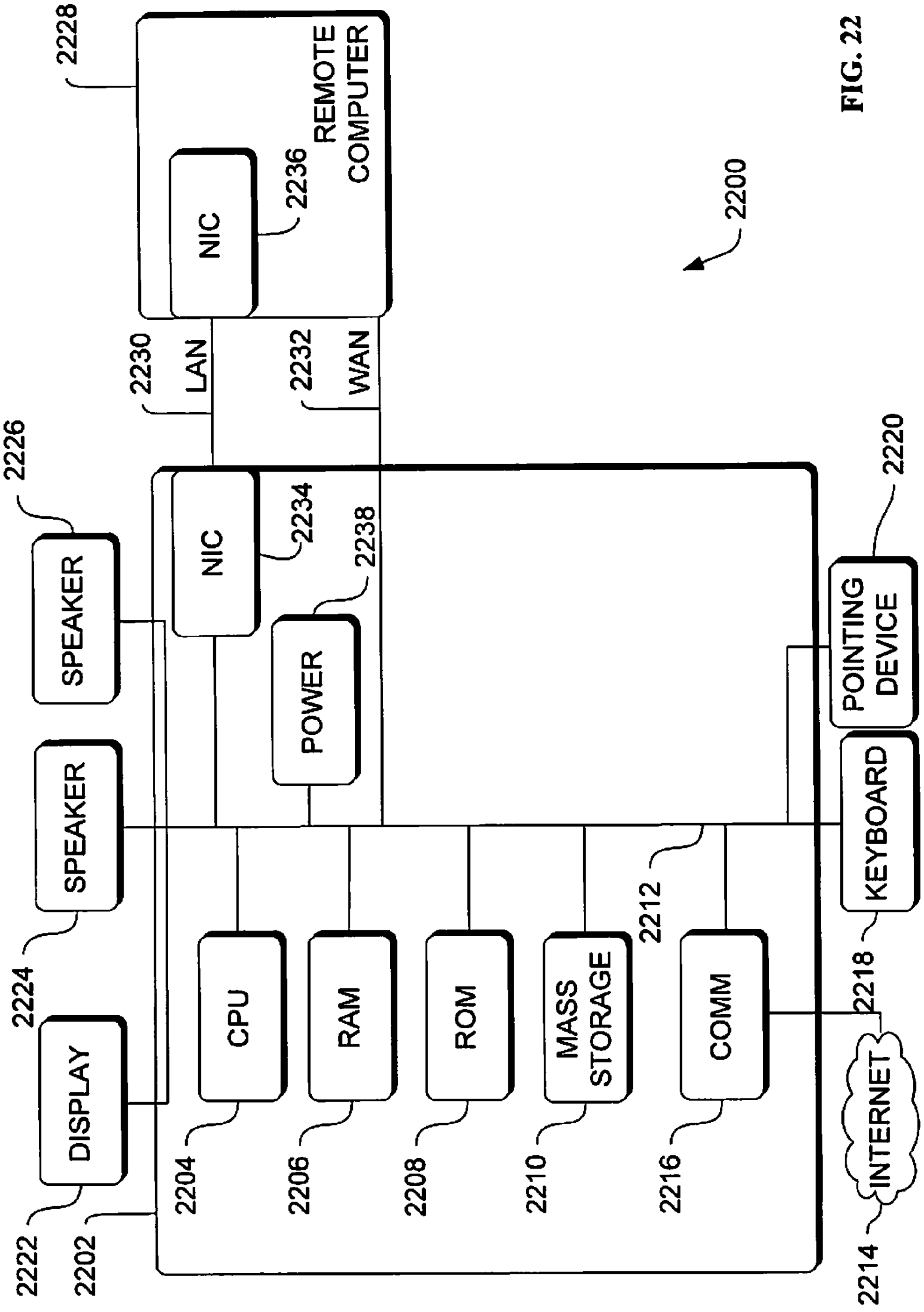
FIG. 22 is a block diagram of a conventional hardware and operating environment in which different embodiments can be practiced.

In some embodiments, method 200 may be implemented as a computer data signal embodied in a carrier wave that represents a sequence of instructions, which, when executed by a processor, such as processor 2204 in FIG. 22, causes the processor to perform the respective method. In other embodiments, method 200 may be implemented as a computer-accessible medium having executable instructions capable of directing a processor, such as processor 2204 in FIG. 22, to perform the respective method. In varying embodiments, the medium can be a magnetic medium, an electronic medium, or an optical medium.

Figure 3:
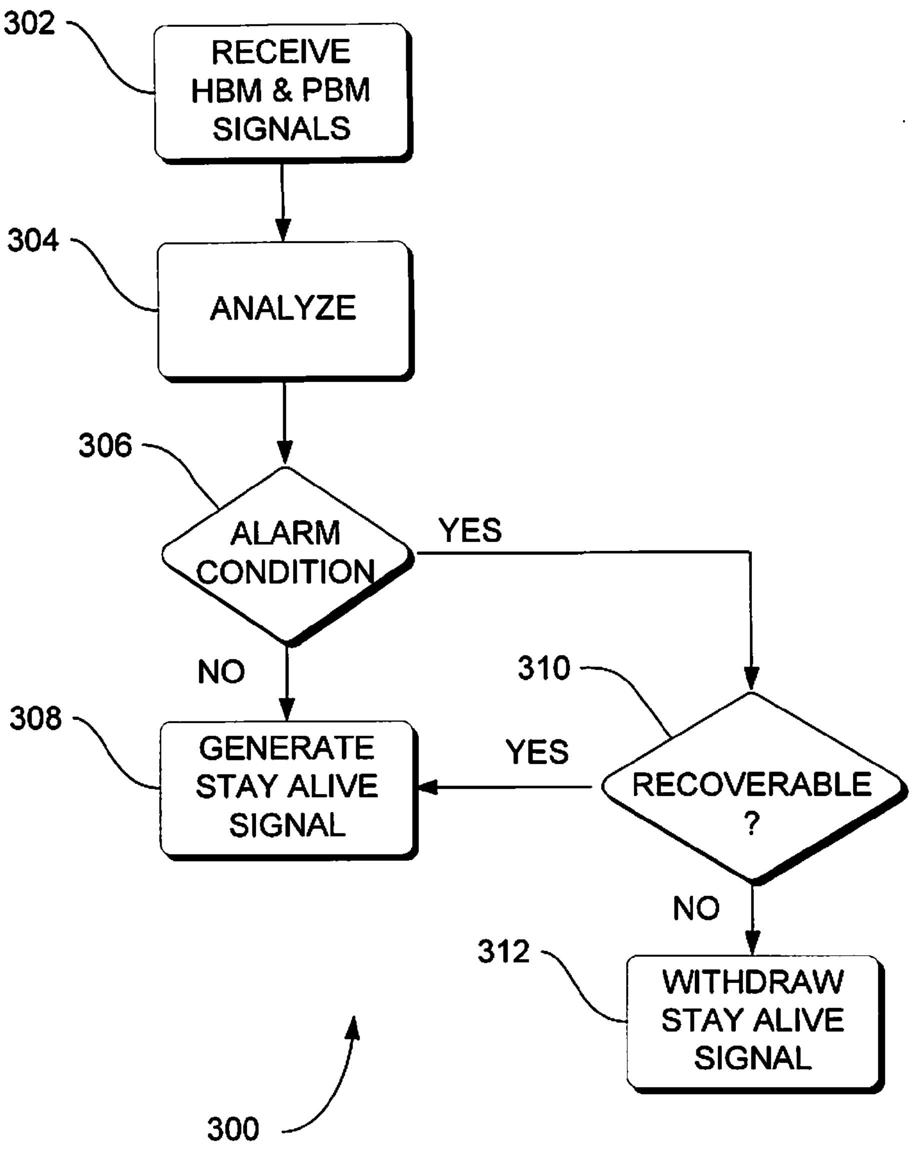
FIG. 3 is a flowchart of a method to construct an environment to satisfy increasingly demanding external requirements, according to an embodiment, where a ruler entity decides to withdraw or generate a stay alive signal.

FIG. 3 is a flowchart of a method 300 to construct an environment to satisfy increasingly demanding external requirements, according to an embodiment, where a ruler entity decides to withdraw or generate a stay alive signal. Method 300 may solve the need in the art for management of autonomous entities that can be functionally extracted from an environment upon the occurrence of a predetermined condition. Method 300 can begin with action 302 when receiving a signal from a managed entity.

Action 302 can receive a heart beat monitor (HBM) signal and pulse monitor (PBM) signal from a managed entity such as worker entities 3118 or 3120. The HBM signal can be an indication that the managed entity (worker entity) is operating. The HBM can be an "ON/OFF" state signal, an indication that a process is being performed, or any other signal that can convey information that the worker entity is alive or active. The PBM signal may extend the HBM signal to incorporate reflex/urgency/health indicators from the autonomic manager representing its view of the current self-management state. The PBM signal can thus convey the performance and characteristics of the entity in the form of engineering data summarization to add context to the received HBM signal. Engineering data summarization can be a set of abstractions regarding sensor that may comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 304 for further processing.

In action 304, an analysis of the HBM and PBM signal may be performed to determine trends and possible areas of concern. Some purposes of the analysis may be to determine exceedance from a predetermined condition, make projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can pass to action 306 for further processing.

In action 306, an alarmed condition may be determined. In action 306, the analysis of action 304 may be consulted to determine if there is one or more alarm condition that can trigger the withdrawal of a stay alive signal. If it is determined that there are no alarm conditions, control may be passed to action 308 so as to generate a stay alive signal. In the event that an alarm condition is present, control may be passed to action 310 for further processing.

In action 310, a determination may be made to ascertain whether the identified alarmed condition of action 306 is recoverable by the managed entity. When an alarmed condition is determined to be recoverable, control may be passed to action 308 to generate a stay alive signal. When an alarmed condition is determined not to be recoverable, control may be passed to action 312 to withdraw the stay alive signal. Method 400 below can be one embodiment of determining 310 if the identified alarmed condition is recoverable.

Figure 4:
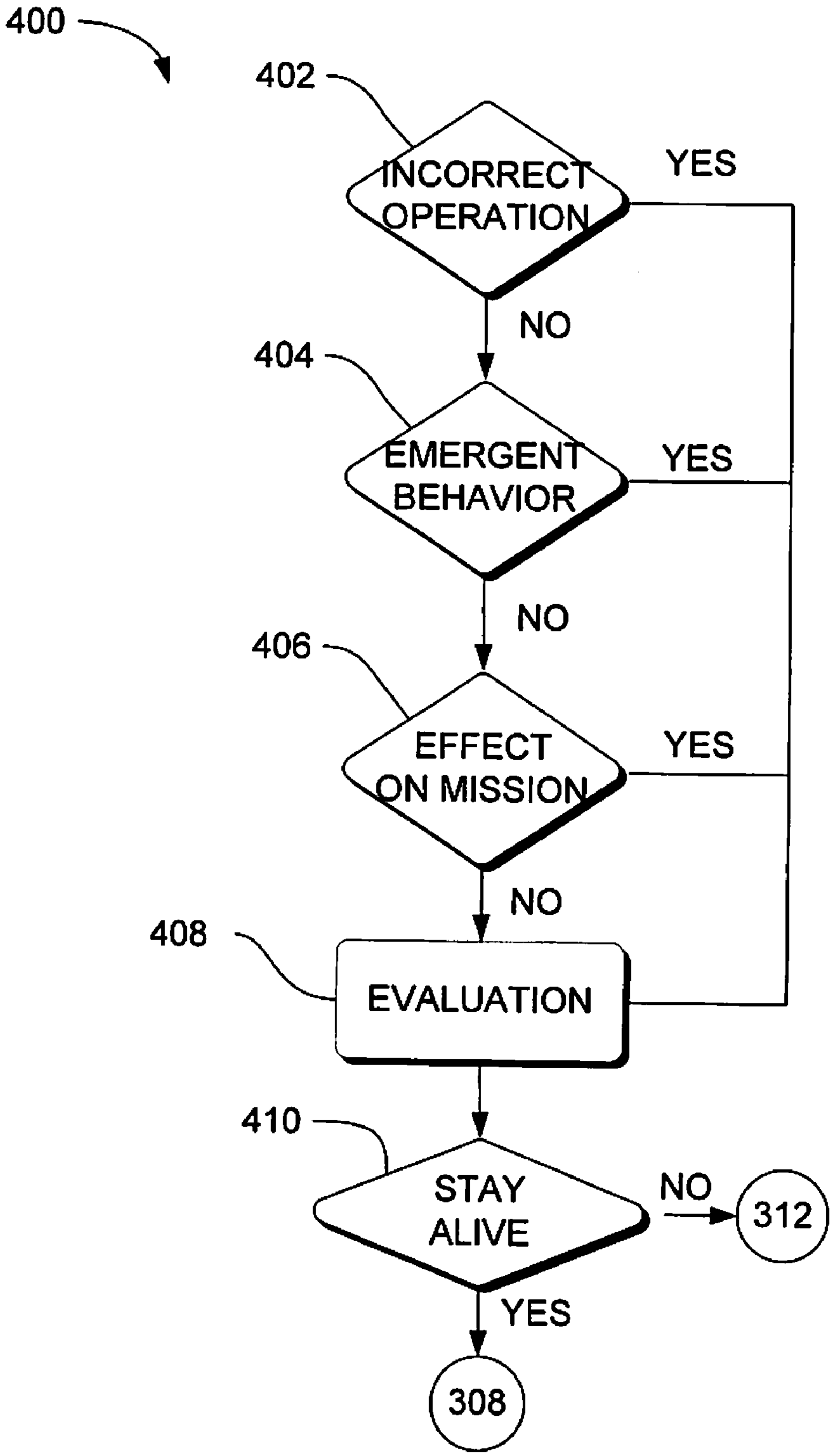
FIG. 4 is a flowchart for generating a stay alive signal when a warning condition occurs, according to an embodiment.

FIG. 4 is a flowchart of a method 400 for ascertaining the recoverability of an alarmed condition determined at action 306, according to an embodiment. Method 400 may solve the need in the art for management of autonomous entities that can be functionally extracted from an environment upon the occurrence of a predetermined condition. Method 400 may be one possible embodiment of the action in FIG. 3 above of determining 310 if the identified alarmed condition is recoverable.

Method 400 may begin with action 402 when receiving one or more alarmed condition. In action 402, there may be a determination if an incorrect operation from the managed system has been identified in action 304 of FIG. 3. An incorrect operation can range from not initializing sensors to failing to self-heal when internal decision logic recommends such as an appropriate cause of action. In action 402, in addition to determining if an incorrect operation has been identified, it may also be possible to ascertain the number of devices or processes within the entity that registered an incorrect operation. If at least one incorrect operation is determined, the action may transfer the identity of the unit to evaluation block 408 for further processing.

In action 404, there may be a determination whether emergent behavior from the managed system has been identified in action 304 of FIG. 3. An emergent behavior or emergent property can appear when a number of entities (agents) operate in an environment forming behaviors that are more complex as a collective. The property itself can often be unpredictable and unprecedented and can represent a new level of the system's evolution. This complex behavior in the context of control system may be known as non-linearity, chaos, or capacity limits. The complex behavior or properties may not be properties of any single such entity, nor can they easily be predicted or deduced from behavior in the lower-level entities. One reason why emergent behavior occurs may be that the number of interactions between autonomic components of a system increases combinatorially with the number of autonomic components, thus potentially allowing for many new and subtle types of behavior to emerge. Nothing may directly command the system to form a pattern, but the interactions of each part (entities) to its immediate surroundings may cause a complex process that leads to order. Emergent behavior can be identified based on parameters that give rise to the complex behavior in a system such as demands on resources. Once an emergent behavior condition has been identified, the information may be forwarded to evaluation block 408 for further processing.

In action 406, a determination may be made of alarm conditions that can have an impact on the success of the mission or task by which all entities are striving to accomplish. The impact could be the ability to accomplish individual tasks or the potential for failure of the overall mission by permitting an entity to stay alive. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined the information may be passed to evaluation block 408 for further processing.

Evaluation block 408 may marshal the incorrect operation identified in action 402, the emergent behavior in action 404, or the effect on mission in action 406 to suggest a course of action that the managed entities should adopt, which in the illustrated embodiment is based on a stay alive signal. The determination of withdrawing or affirming the stay alive signal can be based on the occurrence of one or more of the identified alarmed conditions, or a combination of two or more of the identified alarmed conditions. For example, the stay alive signal could be withdrawn if there is emergent behavior and there would be an effect on the mission. In the alternative, the stay alive signal could be affirmed if there was only emergent behavior, or incorrect operation. Once the evaluation is determined, control may be passed to decision block 410 for further processing in accordance to the decision made in evaluation block 408.

In action 410, if the desired control instruction is to maintain the stay alive signal, control can be passed to action 308 for further processing. In the alternative, a withdrawal of the stay alive signal can be sent to action 312 for further processing. It should be noted that generating a stay alive signal may be equivalent to generating a stay alive signal, affirming a stay alive signal, not withdrawing a stay alive signal, or any other condition that can determine if an entity is to perish or to extinguish unless allowed to continue by another entity. The other entity might be a managing entity since it can determine the outcome (life or death) of an entity.

Figure 5:
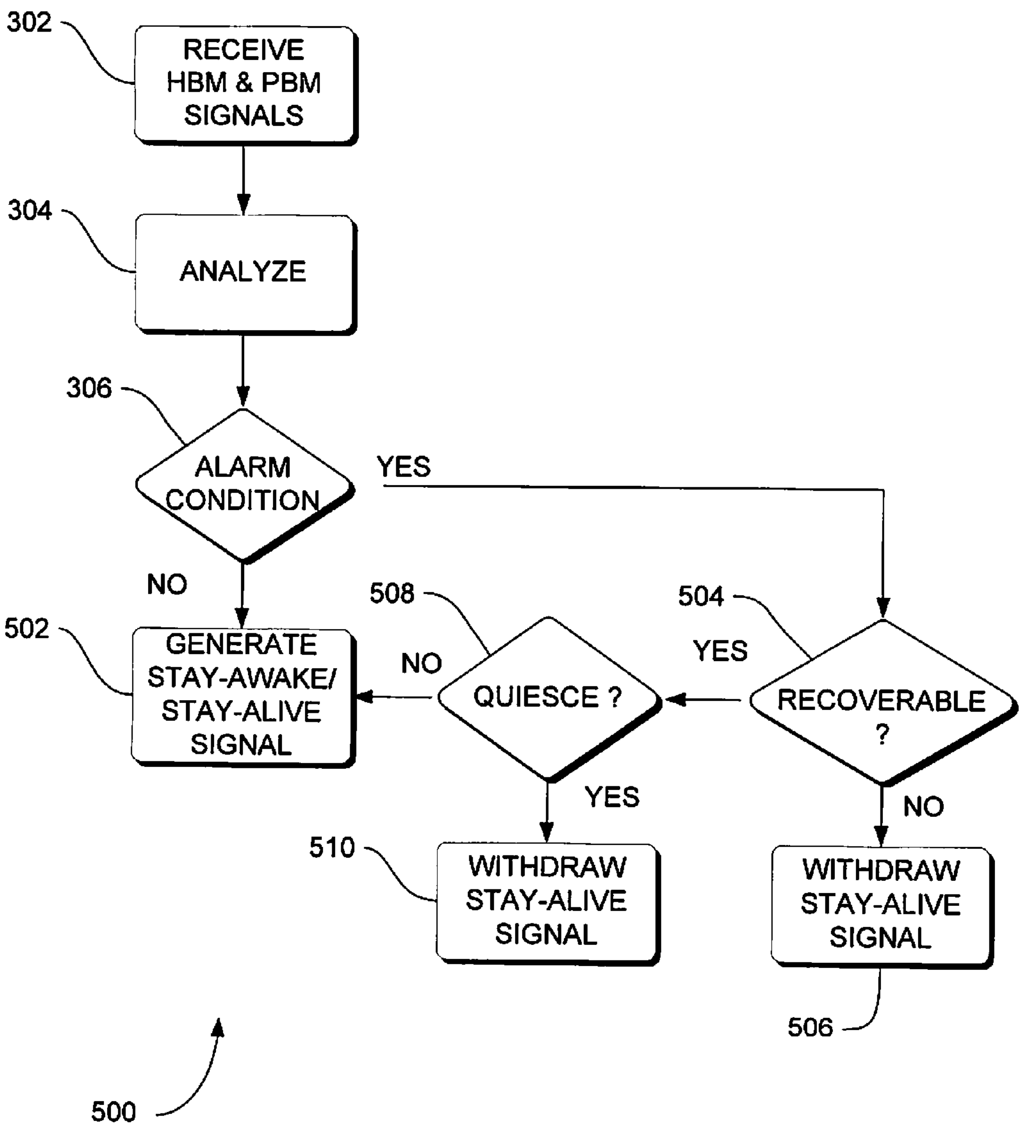
FIG. 5 is a flowchart of a method to construct an environment to satisfy increasingly demanding external requirements, according to an embodiment, where a ruler entity decides to withdraw or generate a stay awake signal.

FIG. 5 is a flowchart of a method 500 to construct an environment to satisfy increasingly demanding external requirements according to an embodiment where a ruler entity decides to withdraw or generate a stay-awake signal. Method 500 may solve the need in the art to reduce the possibility that an autonomic element will jeopardize the mission of the autonomic element.

Method 500 may begin with action 302 when receiving a signal from a managed entity. Action 302 can receive a heart beat monitor (HBM) signal and pulse monitor (PBM) signal from a managed entity such as worker entities 1418 or 1420. In some embodiments, the HBM signal is an indication that the managed entity (worker entity) is operating. The HBM can be an "ON/OFF" state signal, an indication that a process is being performed, or any other signal that can convey information that the worker entity is awake or active. The PBM signal may extend the HBM signal to incorporate reflex/urgency/health indicators from the autonomic manager representing its view of the current self-management state. The PBM signal may thus convey the performance and characteristics of the entity in the form of engineering data summarization to add context to the received HBM signal. Engineering data summarization could be a set of abstractions regarding sensors that, in some embodiments, could comprise rise and fall of data by a certain amount, external causes for parameter deviations, actual numerical value of the parameters being summarized, warning conditions, alarm conditions, and any other summarization that would convey the general health of the system. Once the HBM and PBM signals have been received, control can be forwarded to action 304 for further processing.

In action 304, an analysis of the HBM and PBM signal may be performed to determine trends and possible areas of concern. The purpose of the analysis could be to determine that a predetermined condition has been exceeded, generate a projection through simulation and data modeling areas of parameters that can lead to the failure of the worker entity or that might jeopardize the assigned mission, and ascertain the quality of performance of the system. The analysis can be performed by using regression techniques, neural network techniques, statistical techniques, or any other technique that can convey information about the state of a system or emergent behavior of the system. Once the analysis has been performed, control can be passed to action 306 for further processing.

In action 306, an alarmed condition can be determined. In action 306, the analysis of action 304 may be consulted to determine if there is one or more alarm condition that can trigger the withdrawal of a stay-awake signal. If it is determined that there are no alarm conditions, control may be passed to action 502 so as to generate a stay-alive signal. In the event that an alarm condition is present, control may be passed to action 504 for further processing.

Figure 14:
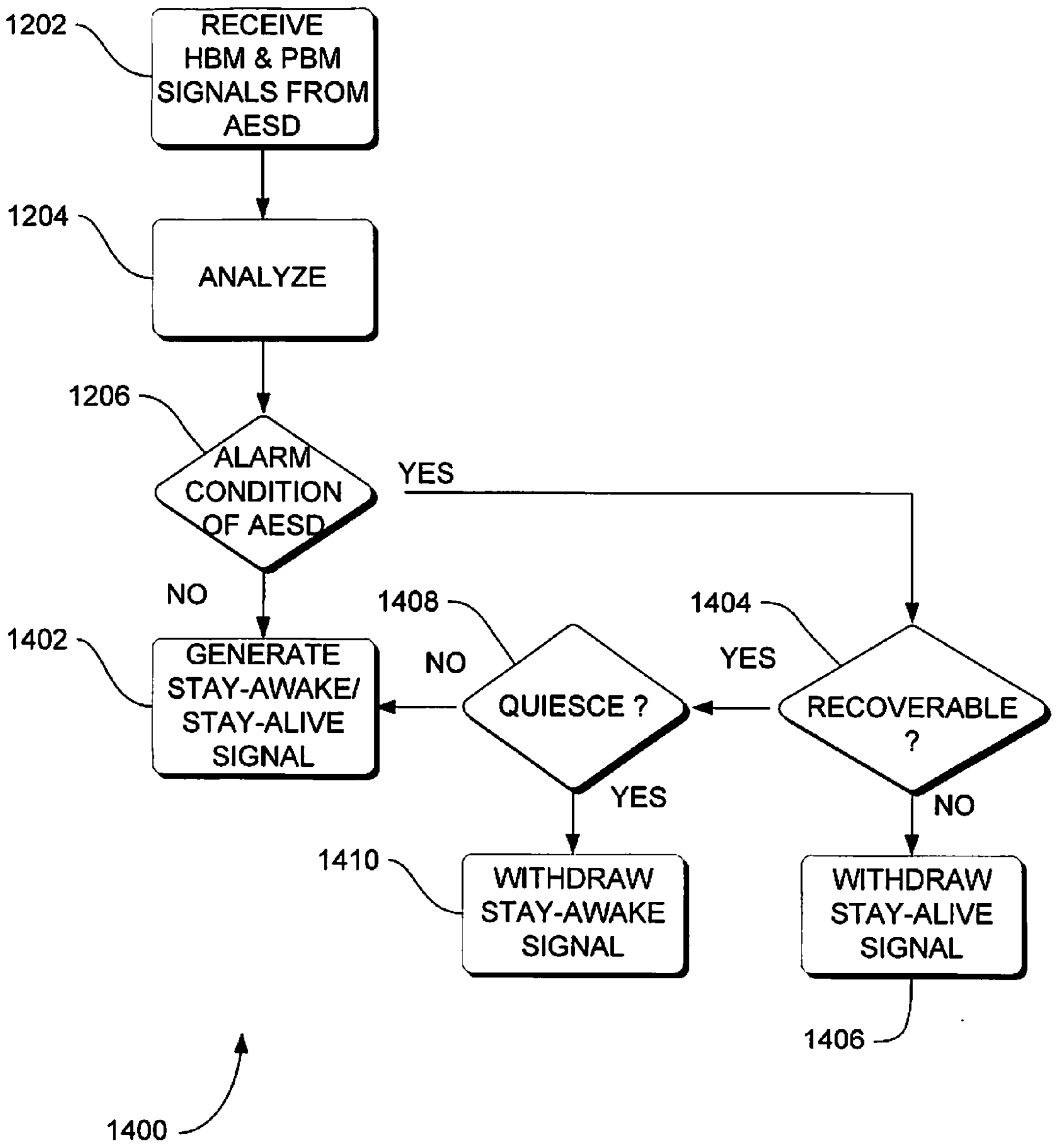
FIG. 14 is a flowchart of a method of a ruling autonomic device controlling a stay-awake signal of an autonomic environmental safety device, according to an embodiment.

In action 504, a determination can be made to ascertain if the identified alarmed condition of action 306 is recoverable by the managed entity such as worker entities 1418 and 1420 of FIG. 14. When an alarmed condition is determined not to be recoverable, control may be passed to action 312 to withdraw the stay-alive signal. Method 600 below could be one embodiment of determining 504 if the identified alarmed condition is recoverable. When an alarmed condition is determined to be recoverable, control may be passed to action 508 in which a determination can be made to ascertain if quiescing the managed entity and/or subsequent recovery is possible. When quiescence of the managed entity and/or need for later recovery is determined as not possible, control can pass to action 502 to generate a stay-awake/stay-alive-signal. When quiescence of the managed entity is determined as possible and/or needed in action 508, control can pass to action 510, to withdraw the stay-awake signal. Thus, quiescing the managed entity may solve the need in the art to functionally extract the managed entity from an environment upon the occurrence of an alarmed condition. Quiescence may be a less encompassing alternative to withdrawing the stay-awake signal of apoptosis. Method 500 can allow an agent or craft that is in danger or endangering the mission to be put into a self-sleep mode, then later reactivated or self-destructed.

Figure 6:
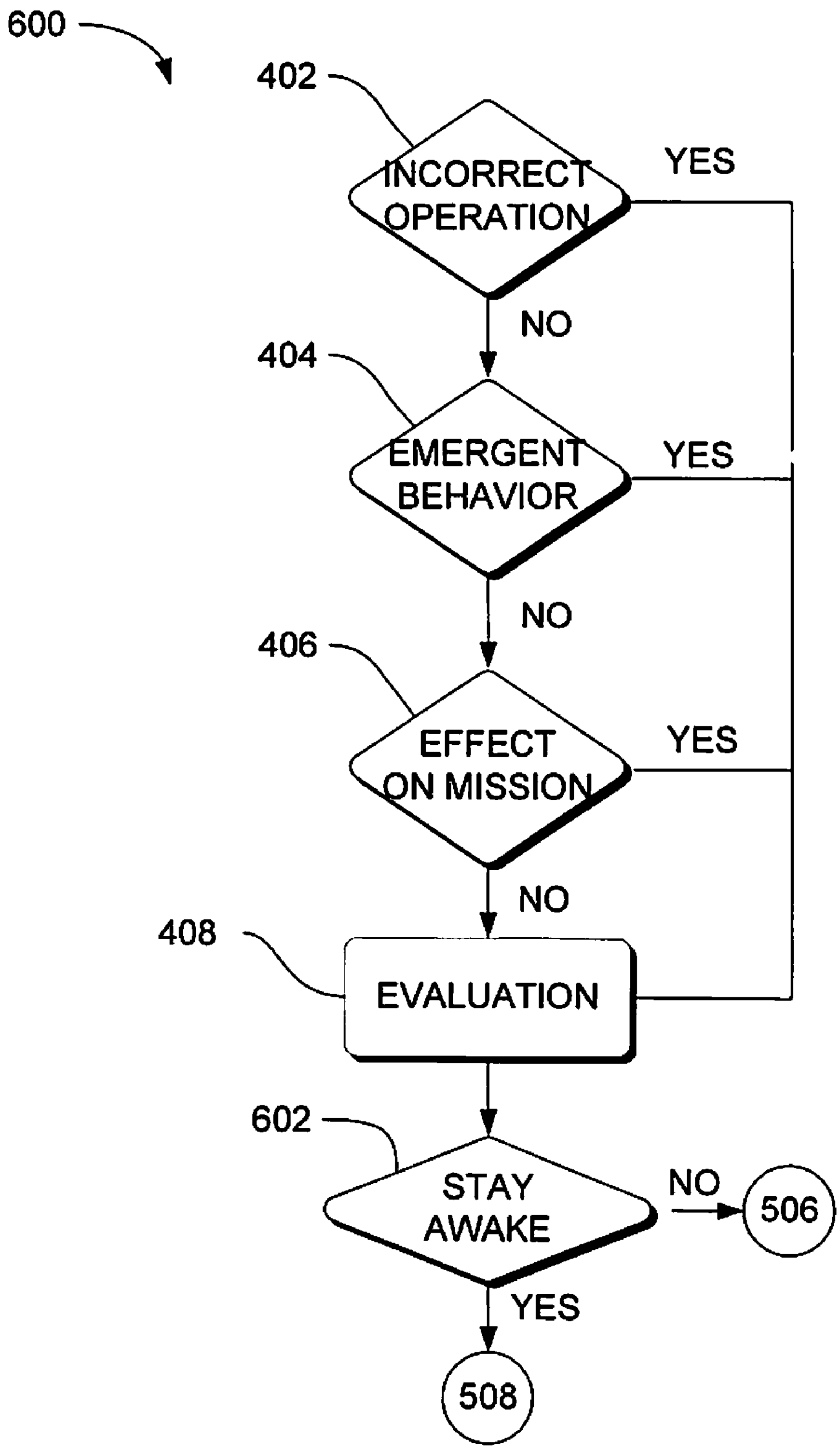
FIG. 6 is a flowchart for generating a stay awake signal when a warning condition occurs, according to an embodiment.

FIG. 6 is a flowchart of a method 600 for ascertaining the recoverability of an alarmed condition determined at action 504. Method 600 may solve the need in the art for management of autonomous entities that can be functionally extracted from an environment upon the occurrence of a predetermined condition. Method 600 may begin with action 402 when receiving one or more alarmed condition.

In action 402, there may be a determination if an incorrect operation from the managed system has been identified in action 304 of FIG. 3. An incorrect operation can range from not initializing sensors to failing to self-heal when internal decision logic recommends such as an appropriate cause of action. In action 402, in addition to determining if an incorrect operation has been identified, it may also be possible to ascertain the number of devices or processes within the entity that registered an incorrect operation. If at least one incorrect operation is determined, the action can transfer the identity of the unit to evaluation block 408 for further processing.

In action 404, there may be a determination of emergent behavior from the managed system that has been identified in action 304 of FIG. 3. An emergent behavior or emergent property can appear when a number of entities (agents) operate in an environment forming behaviors that are more complex as a collective. The property itself may often be unpredictable and unprecedented and can represent a new level of the system's evolution. This complex behavior in the context of control system can be known as non-linearity, chaos, or capacity limits. The complex behavior or properties may not be properties of any single such entity, nor can they easily be predicted or deduced from behavior in the lower-level entities. One reason why emergent behavior occurs could be that the number of interactions between autonomic components of a system increases combinatorially with the number of autonomic components, thus potentially allowing for many new and subtle types of behavior to emerge. Nothing may directly command the system to form a pattern, but instead the interactions of each part (entities) to its immediate surroundings can cause a complex process that leads to order. Emergent behavior can be identified based on parameters that give rise to the complex behavior in a system such as demands on resources. Once an emergent behavior condition has been identified, the information may be forwarded to evaluation block 408 for further processing.

In action 406, a determination can be made of alarm conditions that can have an impact on the success of the mission or task which all entities are striving to accomplish. The impact could be the ability to accomplish individual tasks or the potential for failure of the overall mission by permitting an entity to stay awake. This impact can be determined through Bayesian belief networks, statistical inference engines, or by any other presently developed or future developed inference engine that can ascertain the impact on a particular task if one or more agent is showing incorrect operation or harmful emergent behavior. Once the impact has been determined, the information may be passed to evaluation block 408 for further processing.

Evaluation block 408 can marshal the incorrect operation identified in action 402, the emergent behavior in action 404, and the effect on mission in action 406 to suggest a course of action that the managed entities should adopt, which in the illustrated embodiment is based on a stay-awake signal. The determination of withdrawing or affirming the stay-awake signal can be based on the occurrence of one or more of the identified alarmed conditions, or a combination of two or more of the identified alarmed conditions. For example, the stay-awake signal could be withdrawn if there is emergent behavior and there would be an effect on the mission. In the alternative, the stay-awake signal could be affirmed if there was only emergent behavior, or incorrect operation. Once the evaluation is determined, control can pass to decision block 602 for further processing in accordance with the decision made in evaluation block 408.

In action 602, if the desired control instruction is to maintain the stay-awake signal, control can be passed to action 508 for further processing. In the alternative, a withdrawal of the stay-awake signal can be sent to action 506 for further processing. It should be noted that generating a stay-awake signal is equivalent to affirming a stay awake signal, not withdrawing a stay awake signal, or any other condition that can determine if an entity is to perish or to extinguish unless allowed to continue by another entity. The other entity could be a managing entity since it can determine the outcome (life or death) of an entity.

Figure 7:
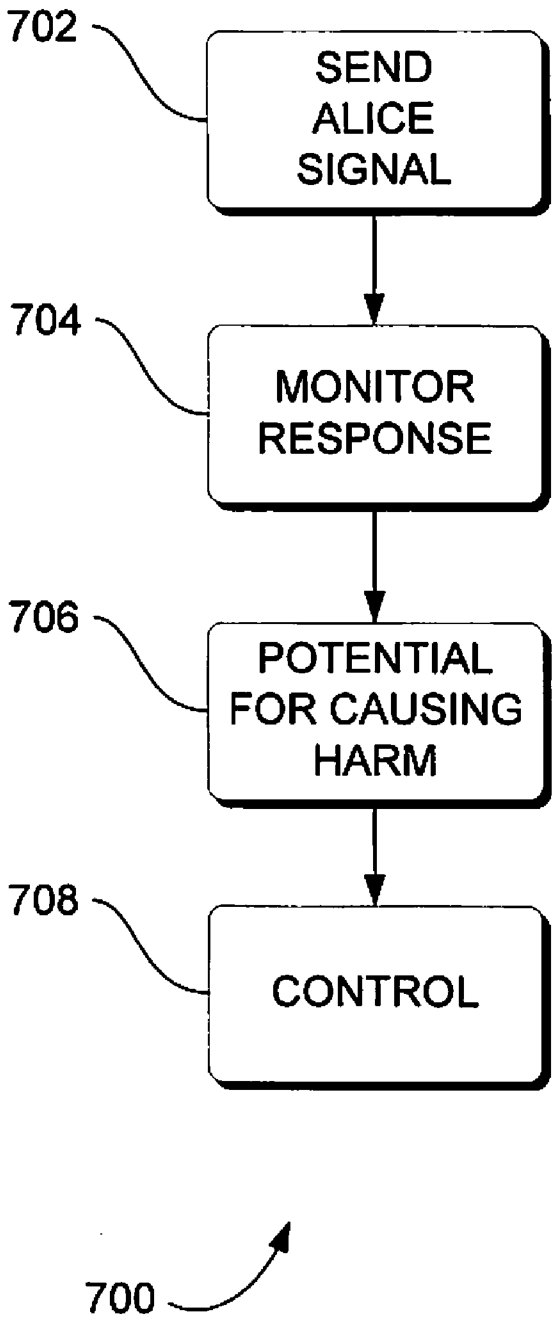
FIG. 7 is a flowchart for interrogating an anonymous autonomic agent, according to an embodiment.

FIG. 7 is a flowchart of a method 700 for providing security requirements, according to an embodiment, where a ruler entity decides to withdraw or generate a stay alive signal from an anonymous agent. Method 700 may solve the need in the art for management of autonomous entities that can be functionally extracted from an environment upon the occurrence of a predetermined condition. Method 700 may begin with action 702 where an ALice signal is sent to an anonymous agent to ascertain the agent's potential for harm to a system as shown in FIG. 4. After the ALice signal has been sent to the agent, control may be passed to action 704 for further processing.

In action 704 the response from the agent may be monitored. Monitored as used herein refers to maintaining regular surveillance, or close observation, over an anonymous agent and can include the absence of a signal. For example, not responding with a timeout period is considered, as used herein, as monitor response. After action 704 is completed, control may be passed to action 706 for further processing.

In action 706, the monitored response from action 704 may be analyzed to determine if it is in an appropriate format, within a certain timeout period, and with a valid and justified reason for being within the locus of interest or domain of the autonomous system. Once the potential for causing harm has been ascertained, control may be passed to action 708 for further processing.

In action 708, the system may control the future of the anonymous agent based on the potential for harm to the autonomous system. This mimics the mechanism of cell death in the human (and animal) body, and hence makes use of autonomic and other biologically inspired metaphors. The technique would send self-destruct signals to agents that can be compromised, or which cannot be identified as friendly or as having a right to access certain resources. The concept of the ALice signal is to challenge a mobile agent to determine if it is friendly and has permission to access certain resources. If it fails to identify itself appropriately following an ALice interrogation, it may be blocked from the system and given either a self-destruct signal, or its stay alive reprieve is withdrawn. As an alternative to the ALice signal, a quiesce signal, command or instruction can be sent. The quiesce signal is discussed in more detail in conjunction with FIGS. 5, 6 and 10.

Figure 8:
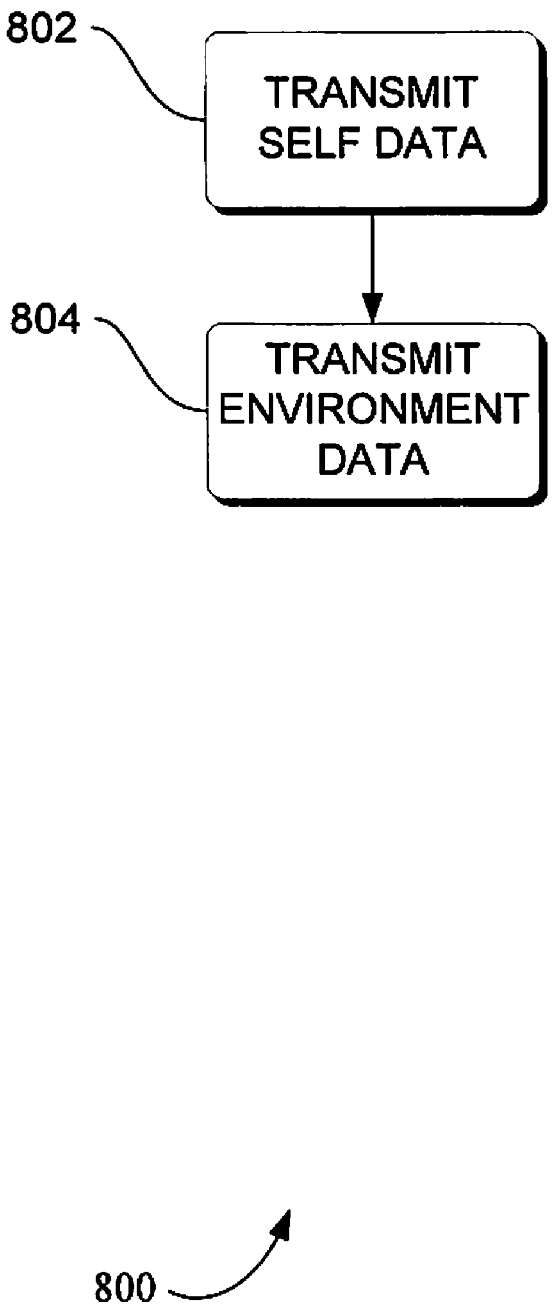
FIG. 8 is a flowchart of a method of autonomic communication by an autonomic element, according to an embodiment.

FIG. 8 is a flowchart of a method 800 of autonomic communication by an autonomic element. Method 800 can offer a holistic vision for the development and evolution of computer-based systems that brings new levels of automation and dependability to systems, while simultaneously hiding their complexity and reducing their total cost of ownership.

Method 800 may include transmitting self health/urgency data 802. Examples of the self health/urgency data may include information describing low battery power and/or failed sensors. Method 800 may also include transmitting 804 environment health/urgency data. Examples of the environment health/urgency data may include information describing inaccessible devices, unauthorized access, and/or an unidentified mobile agent sending communication signals.

Transmitting 802 and 804 can be performed in any order relative to each other. For example, in one embodiment the transmitting 802 self health/urgency data may be performed before transmitting 804 environment health/urgency data. In another embodiment, transmitting 804 environment health/urgency data may be performed before transmitting 802 self health/urgency data. In yet another embodiment, the self health/urgency data may be transmitted simultaneously with the environment health/urgency data. For example, the environment health/urgency data and the self health/urgency data may be transmitted together. One example of transmitting the environment health/urgency data and the self health/urgency data may include encapsulating the environment health/urgency data and the self health/urgency data in a X.25 packet, although one skilled in the art will readily recognize that any number of alternative packet types may be used that fall within the scope of this invention. The environment health/urgency data and the self health/urgency data can be thought of together as the "lub-dub" of a heartbeat in which the two "beats" or two pieces of data are transmitted simultaneously. The X.25 standard is published by the ITU Telecommunication Standardization Sector at Place des Nations, CH-1211 Geneva 20, Switzerland.

An autonomic environment may require that autonomic elements and, in particular, autonomic managers communicate with one another concerning self-* activities, in order to ensure the robustness of the environment. A reflex signal 4120 of FIG. 41 below can be facilitated through the pulse monitor (PBM). A PBM can be an extension of the embedded system's heart-beat monitor, or HBM, which safeguards vital processes through the emission of a regular "I am alive" signal to another process with the capability to encode self health/urgency data and environment health/urgency data as a single pulse. HBM is described in greater detail in FIG. 35, 36 below and FIG. 3 above. Together with the standard event messages on an autonomic communications channel, this may provide dynamics within autonomic responses and multiple loops of control, such as reflex reactions among the autonomic managers. Some embodiments of the autonomic manager communications (AM/AM) component 4118 may produce a reflex signal 4120 that includes the self health/urgency data and the environment health/urgency data in addition to the HBM. More concisely, the reflex signal can carry a PBM. A reflex signal that carries a PBM can be used to safe-guard the autonomic element by communicating health of the autonomic element to another autonomic unit. For instance, in the situation where each PC in a LAN is equipped with an autonomic manager, rather than each of the individual PCs monitoring the same environment, a few PCs (likely the least busy machines) can take on this role and alert the others through a change in pulse to indicate changing circumstances.

In some embodiments, an aspect of the reflex reaction and the pulse monitor may be the minimization of data sent—essentially only a "signal" may be transmitted. Strictly speaking, this may not be mandatory; more information can be sent, yet the additional information should not compromise the reflex reaction.

Just as the beat of the heart has a double beat (lub-dub), the autonomic element's pulse monitor can have a double beat encoded—as described above, a self health/urgency measure and an environment health/urgency measure. These match directly with the two control loops within the AE, and the self-awareness and environment awareness properties.

Figure 9:
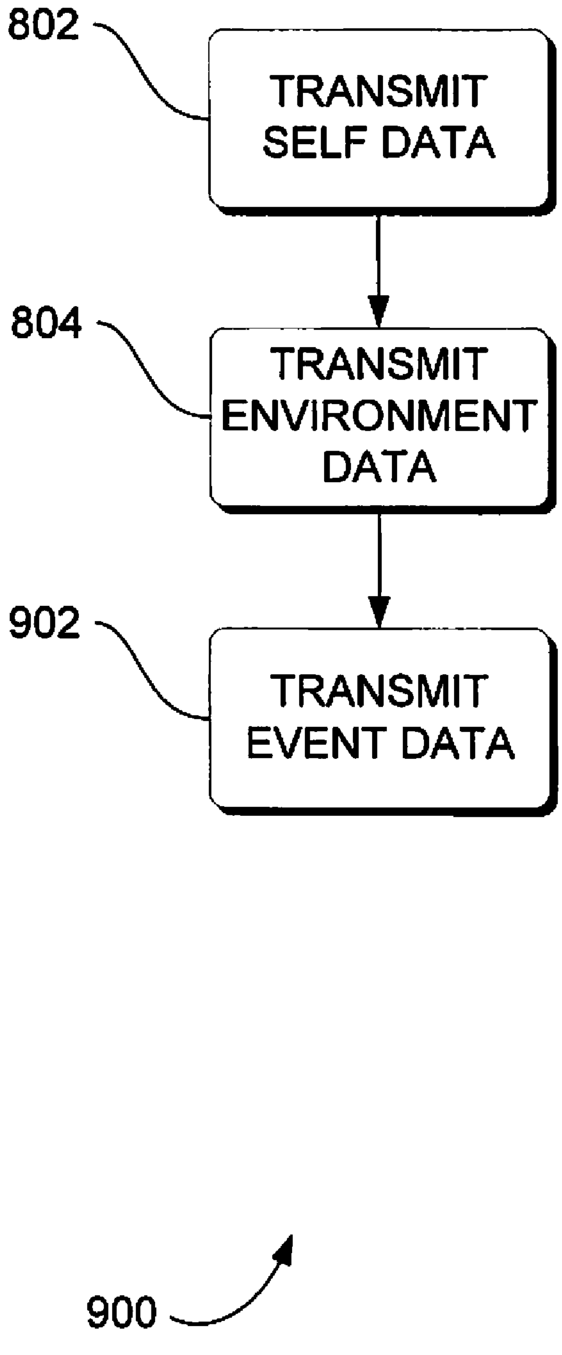
FIG. 9 is a flowchart of a method of autonomic communication by an autonomic element, according to an embodiment.

FIG. 9 is a flowchart of a method 900 of autonomic communication by an autonomic element. Method 900 may include transmitting 902 event message data in addition to the self and environment health/urgency data. Event message data can include data describing a change in condition, or a deviation from a normal operation. Event message data is described in more detail below in connection with FIG. 36.

In some embodiments, the self health/urgency data and environment health/urgency data encoded with the standard event messages on an autonomic communications channel may provide dynamics within autonomic responses and multiple loops of control, such as reflex reactions among an autonomic manager.

Figure 10:
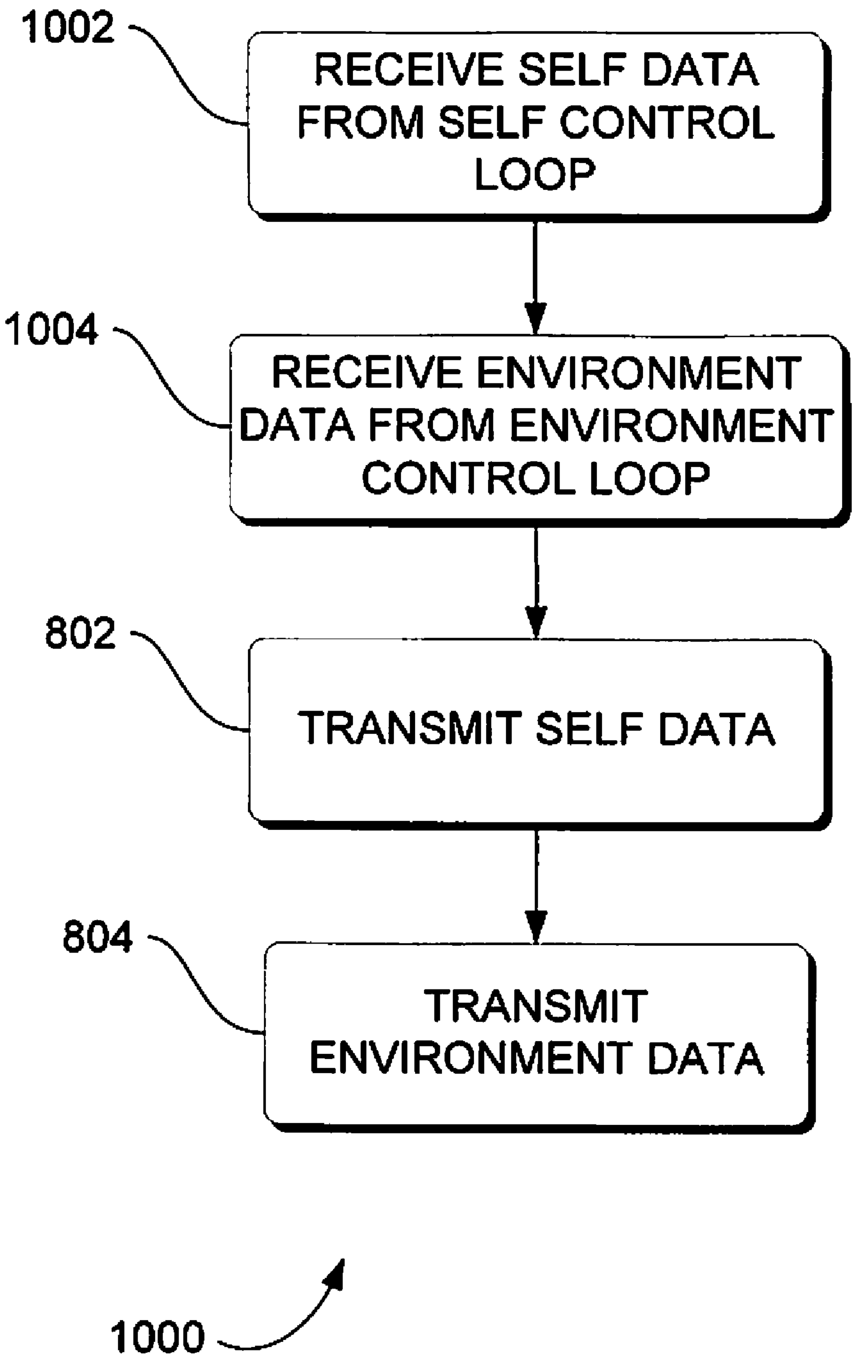
FIG. 10 is a flowchart of a method of autonomic communication by an autonomic element, according to an embodiment.

FIG. 10 is a flowchart of a method 1000 of autonomic communication by an autonomic element. Method 1000 may include receiving 1002 the self health/urgency data from a self control loop component of the autonomic element. One example of the self control loop component of the autonomic element may be the self awareness control loop 4114 of the autonomic element 4100 of FIG. 41 below.

Method 1000 may also include receiving 1004 the environment health/urgency data from an environment control loop component of the autonomic element. One example of the environment control loop component of the autonomic element may be the environment awareness control loop 4108 of the autonomic element 4100 of FIG. 41 below.

Figure 11:
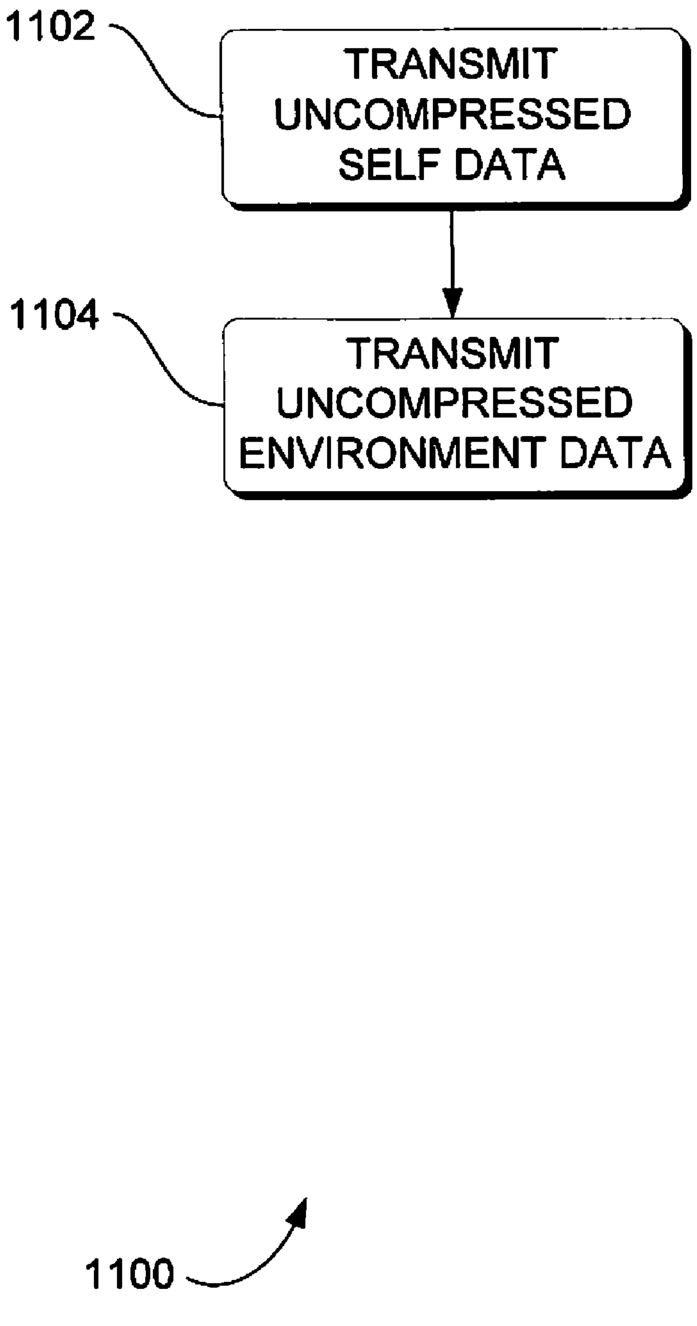
FIG. 11 is a flowchart of a method of autonomic communication by an autonomic element, according to an embodiment.

FIG. 11 is a flowchart of a method 1100 of autonomic communication by an autonomic element. Method 1100 may offer a holistic vision for the development and evolution of computer-based systems that brings new levels of automation and dependability to systems, while simultaneously hiding their complexity and reducing processing delays by systems that receive data from the autonomic element.

Method 1100 may include transmitting uncompressed self health/urgency data 1102. Method 1100 may also include transmitting 1104 uncompressed environment health/urgency data. In the absence of bandwidth concerns, the uncompressed data can be acted upon quickly and not incur processing delays. One important aspect may be that the data, whether uncompressed or sent in some other form, should be in a form that can be acted upon immediately and not involve processing delays (such as is the case of event correlation). Transmitting 1102 and 1104 can be performed in any order relative to each other.

Figure 12:
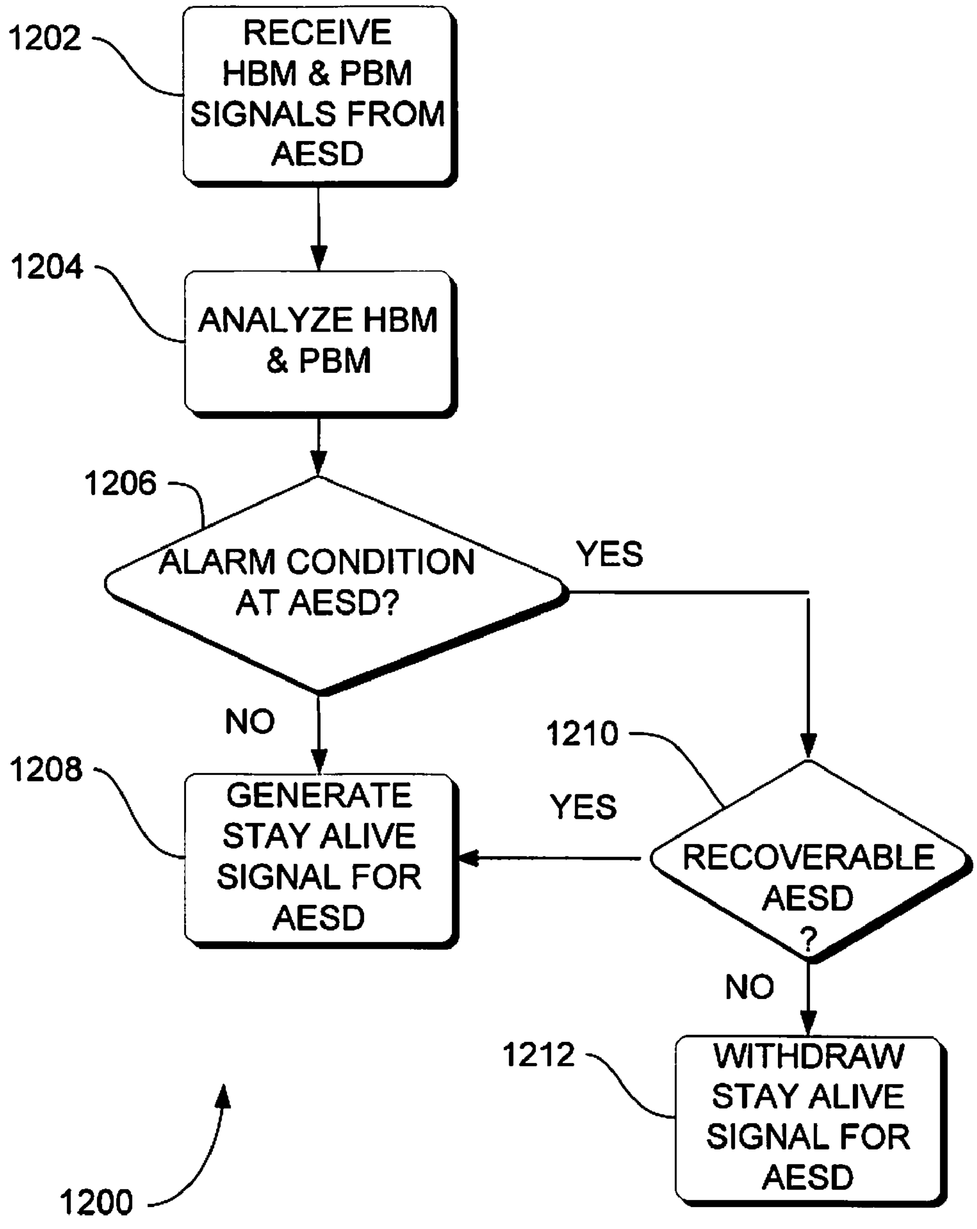
FIG. 12 is a flowchart of a method in which a ruler entity controls a stay alive signal in an autonomic environmental safety device, according to an embodiment.

FIG. 12 is a flowchart of a method 1200 in which a ruler entity controls a stay alive signal in an autonomic environmental safety device, according to an embodiment. Method 1200 may solve the need in the art for management of autonomous entities that can be functionally extracted from an environment upon the occurrence of a predetermined condition.

Method 1200 may include the ruler entity receiving 1202 a heart beat monitor (HBM) signal and pulse monitor (PBM) signal from the autonomic environmental safety device (AESD) or other managed entity. The HBM signal may be an indication that the autonomic environmental safety device may be operating. The HBM can be an "ON/OFF" state signal, an indication that a process may be being performed, or any other signal that can convey information that the autonomic environmental safety device is alive or active. The PBM signal may extend the HBM signal to incorporate reflex/urgency/health indicators from the autonomic manager representing its view of the current self-management state. The PBM signal thus can convey the performance and characteristics of the entity in the form of engineering data summarization to add context to the received HBM signal. Engineering data summarization may be a set of abstractions regarding sensors that may comprise rise and fall of data by a certain amount, external causes for parameter deviations, actual numerical value of the parameters being summarized, warning conditions, fault conditions, and any other summarization that would convey the general health of the system. After the HBM and PBM signals have been received, control may be forwarded to action 1204 for further processing.

In action 1204, an analysis of the HBM and PBM signal may be performed to determine trends and possible areas of concern. The purpose of the analysis may be to determine that a predetermined condition may have been exceeded, generate a projection through simulation and data modeling areas of parameters that can lead to the failure of the autonomic environmental safety device or that might jeopardize the assigned mission, and ascertain the quality of performance of the system. The analysis can be performed by using regression techniques, neural network techniques, statistical techniques, or any other technique that can convey information about the state of a system or emergent behavior of the system.

In action 1206, the existence of an alarm condition may be determined. In action 1206, the analysis of action 1204 can be referenced to determine existence of one or more alarms or other fault conditions that can trigger the withdrawal of a stay alive signal. If no fault conditions may be determined to exist, control may be passed to action 1208 so as to generate a stay alive signal.

In action 1210, a determination may be made to ascertain if the identified alarm or fault condition of action 1206 is recoverable by the autonomic environmental safety device. When an alarm or fault condition is determined to be recoverable, control may be passed to action 1208 to generate a stay alive signal. When an alarm or fault condition is determined not to be recoverable, control may be passed to action 1212 to withdraw the stay alive signal. Method 1300 below is one embodiment of determining 1210 if the identified fault condition is recoverable.

Figure 13:
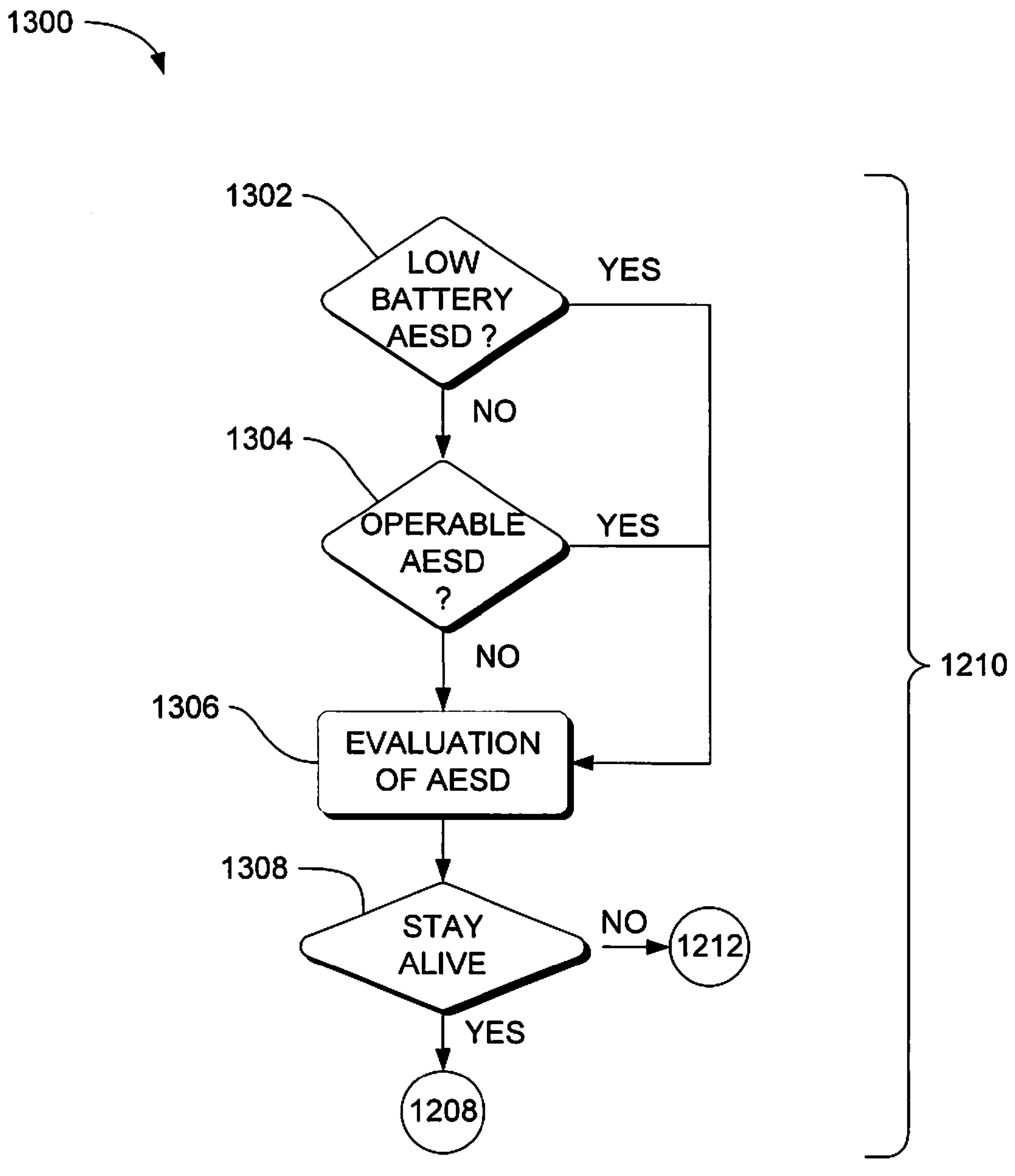
FIG. 13 is a flowchart of a method to determine the recoverability of an alarm or other fault condition in an autonomic environmental safety device, according to an embodiment.

FIG. 13 is a flowchart of a method 1300 to determine the recoverability of an alarm or other fault condition in an autonomic environmental safety device, according to an embodiment. Method 1300 may solve the need in the art for management of autonomic environmental safety devices that can be functionally extracted from an environment upon the occurrence of a predetermined condition. Method 1300 is one embodiment of the action in FIG. 12 above of determining 1210 if the identified fault condition is recoverable.

Method 1300 may begin with determining 1302 if a battery of the autonomic environmental safety device (AESD) is emitting low amounts of power. If the battery is determined to be emitting low power, control can pass to evaluation block 1306 for further processing.

If the battery is determined to be not emitting low power, control can pass to determining 1304 if the AESD is operable. After determining if the AESD is operable, control can pass to evaluation block 1306 for further processing.

In action 1306, a determination may be made of fault conditions that can have an impact on the success of the mission or task by which all entities may be striving to accomplish. The impact could be the ability to accomplish individual tasks or the potential for failure of the overall mission by permitting an entity to stay alive. The impact can be determined through Bayesian belief networks, statistical inference engines, or by any other presently developed or future developed inference engine that can ascertain the impact on a particular task if one or more AESDs is showing incorrect operation or alarm conditions.

Evaluation block 1306 may reference the battery level determined in action 1302 and the operability of the AESD determined in action 1304 to suggest a course of action that the managed entities should adopt, which in method 1300 is illustrated as being based on a stay alive signal. The determination of withdrawing or affirming the stay alive signal can be based on the occurrence of one or more of the identified fault conditions, or a combination of two or more of the identified fault conditions. For example, the stay alive signal could be withdrawn if there is emergent behavior and there would be an effect on the mission. In the alternative, the stay alive signal could be affirmed if there was only emergent behavior, or incorrect operation. After the evaluation is determined, control can pass to decision block 1308 for further processing in accordance to the decision made in evaluation block 1306.

In action 1308, if the desired control instruction is to maintain the stay alive signal, control can be passed to action 1208 for further processing. In the alternative, a withdrawal of the stay alive signal may be sent to action 1212 for further processing. It should be noted that generating a stay alive signal can be equivalent to generating a stay alive signal, affirming a stay alive signal, not withdrawing a stay alive signal, or any other condition that can determine if an entity is to perish or to extinguish unless allowed to continue by another entity. The other entity may be a managing entity since it can determine the outcome (life or death) of an entity.

FIG. 14 is a flowchart of a method 1400 of a ruling autonomic device controlling a stay-awake signal, according to an embodiment. Method 1400 may solve the need in the art to reduce the possibility that an autonomic environmental safety device will jeopardize the facility or mission of the autonomic environmental safety device.

Method 1400 may include receiving 1202 a signal from an autonomic environmental safety device (AESD) or some other managed entity. Action 1202 may receive a heart beat monitor (HBM) signal and pulse monitor (PBM) signal from the autonomic environmental safety device. The HBM signal may be an indication that the autonomic environmental safety device is operating. The HBM signal can be an "ON/OFF" state signal, an indication that a process is being performed, or any other signal that can convey information that the autonomic environmental safety device is awake or active. The PBM signal may extend the HBM signal to incorporate reflex/urgency/health indicators from the autonomic manager representing its view of the current self-management state. The PBM signal thus can convey the performance and characteristics of the entity in the form of engineering data summarization to add context to the received HBM signal. Engineering data summarization can be a set of abstractions regarding sensors that may comprise rise and fall of data by a certain amount, external causes for parameter deviations, actual numerical value of the parameters being summarized, warning conditions, fault conditions, and any other summarization that would convey the general health of the system. After the HBM and PBM signals have been received, control can be forwarded to action 1204 for further processing.

In action 1204, an analysis of the HBM and PBM signal may be performed to determine trends and possible areas of concern. The purpose of the analysis may be to determine that a predetermined condition may have been exceeded, generate a projection through simulation and data modeling areas of parameters that can lead to the failure of the autonomic environmental safety device or that might jeopardize the assigned mission, and ascertain the quality of performance of the system. The analysis can be performed by using regression techniques, neural network techniques, statistical techniques, or any other technique that can convey information about the state of a system or emergent behavior of the system. After the analysis has been performed, control can pass to action 1206 for further processing.

In action 1206, existence or non-existence of an alarm condition in the AESD may be determined. In action 1206, the analysis of action 1204 may be referenced to determine if one or more alarm conditions exist that can trigger the withdrawal of a stay-awake signal. If it is determined that no alarm conditions exist in the AESD, control can be passed to action 1402 to generate a stay-alive signal and a stay-awake signal. In the event that an alarm condition of the AESD is present, control can pass to action 1404 for further processing.

In action 1404, a determination may be made as to whether or not the identified AESD alarm condition of action 1206 is recoverable by the autonomic environmental safety device. When an alarm condition of the AESD is determined not to be recoverable, control can be passed to action 1406 to withdraw a stay-alive signal. Method 1500 below is one embodiment of determining 1404 if the identified alarm condition is recoverable. When the alarm condition is determined to be recoverable, control can be passed to action 1408 in which a determination may be made as to whether or not quiescing the autonomic environmental safety device is possible and/or and whether or not subsequent recovery is needed. When quiescence of the AESD is determined as not possible and recovery is not needed later, control can pass to action 1402 to generate a stay-awake/stay-alive-signal. When quiescence of the autonomic environmental safety device is determined as possible and/or needed in action 1408, control can pass to action 1410 to withdraw the stay-awake signal. Thus, quiescing the autonomic environmental safety device may solve the need in the art to functionally extract the AESD from an environment upon the occurrence of an alarm condition. Quiescence may be a less encompassing alternative to withdrawing the stay-awake signal of apoptosis. Method 1400 may allow an AESD that is in danger or endangering the mission to be put into a self-sleep mode, then later reactivated or self-destructed.

Figure 15:
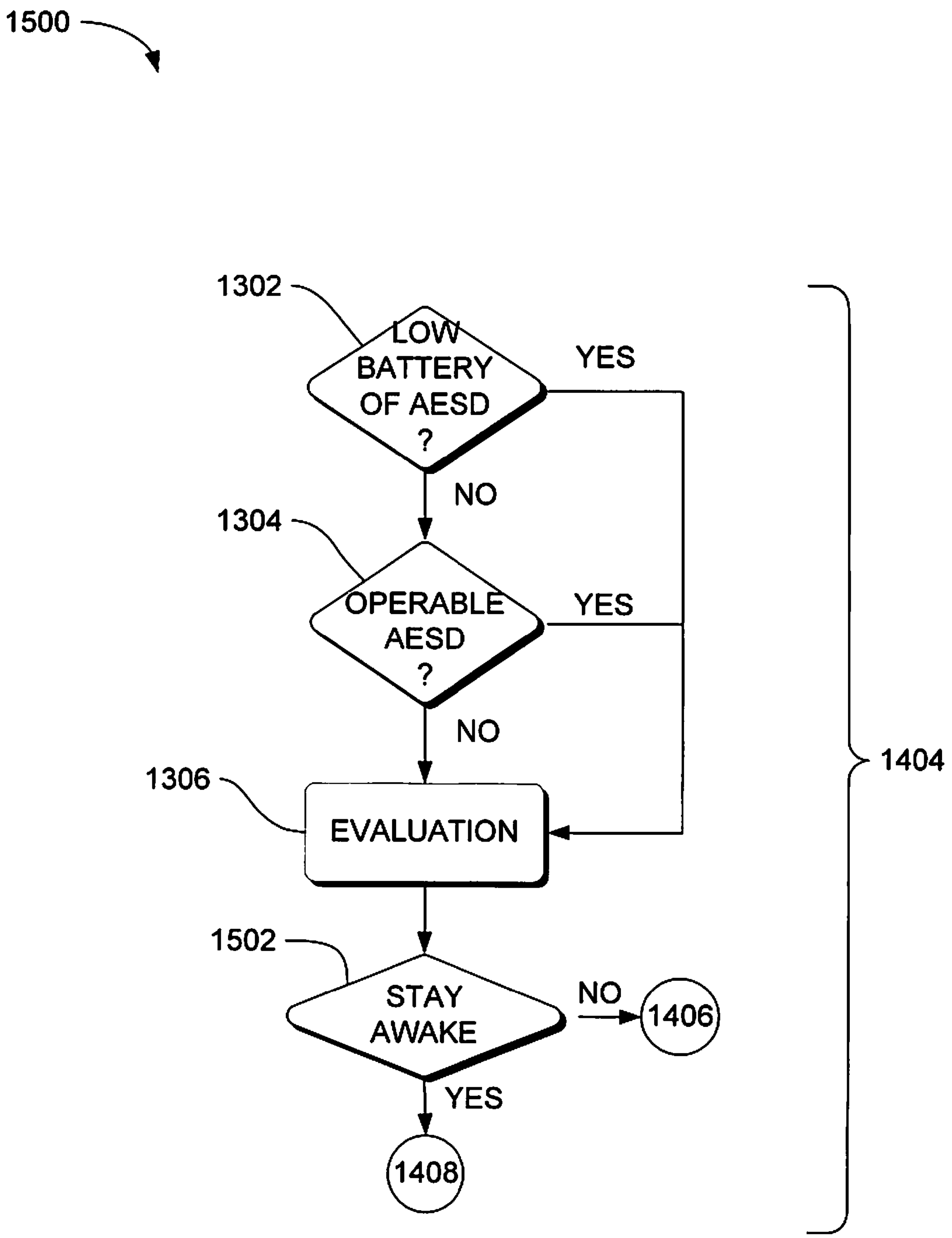
FIG. 15 is a flowchart of a method for determining the recoverability of an alarm condition of an autonomic environmental safety device, according to an embodiment.

FIG. 15 is a flowchart of a method 1500 for determining the recoverability of an alarm condition of an autonomic environmental safety device, according to an embodiment. Method 1500 may solve the need in the art for management of AESDs that can be functionally extracted from an environment upon the occurrence of an alarm condition. Method 1500 is one embodiment of determining whether or not an alarm condition is recoverable action 1404 in FIG. 14 above.

Method 1500 may begin with determining 1302 if a battery of the AESD is emitting low amounts of power. If the battery is determined to be emitting low power, control can pass to evaluation block 1306 for further processing.

If the battery is determined to be not emitting low power, control can pass to determine 1304 if the AESD is operable. After determining 1304 if the AESD is operable, control can pass to evaluation block 1306 for further processing.

In action 1306, a determination can be made of fault conditions determined in action 1302 and 1304 that can have an impact on the success of the mission or task which all entities may be striving to accomplish. The impact could be the ability to accomplish individual tasks or the potential for failure of the overall mission by permitting an entity to stay awake. The impact can be determined through Bayesian belief networks, statistical inference engines, or by any other presently developed or future developed inference engine that can ascertain the impact on a particular task if one or more AESD is showing incorrect operation or low power.

Evaluation block 1306 may reference the battery level determined in action 1302 and the operability of the AESD determined in action 1304 to suggest a course of action that the AESDs should adopt, which in method 1500 is illustrated as being based on a stay awake signal. The determination of withdrawing or affirming the stay awake signal can be based on the occurrence of one or more of the identified fault conditions, or a combination of two or more of the identified fault conditions. For example, the stay awake signal could be withdrawn if there is low power at the AESD that could affect the safety of occupants of the building. In the alternative, the stay awake signal could be affirmed if there was only fault condition, or incorrect operation. After the evaluation is determined, control can pass to decision block 1502 for further processing in accordance with the decision made in evaluation block 1306.

In action 1502, if the desired control instruction is to maintain the stay awake signal, control can be passed to action 1408 for further processing. In the alternative, a withdrawal of the stay awake signal may be sent to action 1410 for further processing. It should be noted that generating a stay awake signal may be equivalent to generating a stay awake signal, affirming a stay awake signal, not withdrawing a stay awake signal, or any other condition that can determine if an entity is to perish or to extinguish unless allowed to continue by another entity. The other entity may be a managing entity since a managing entity can determine the outcome (life or death) of an entity.

Figure 16:
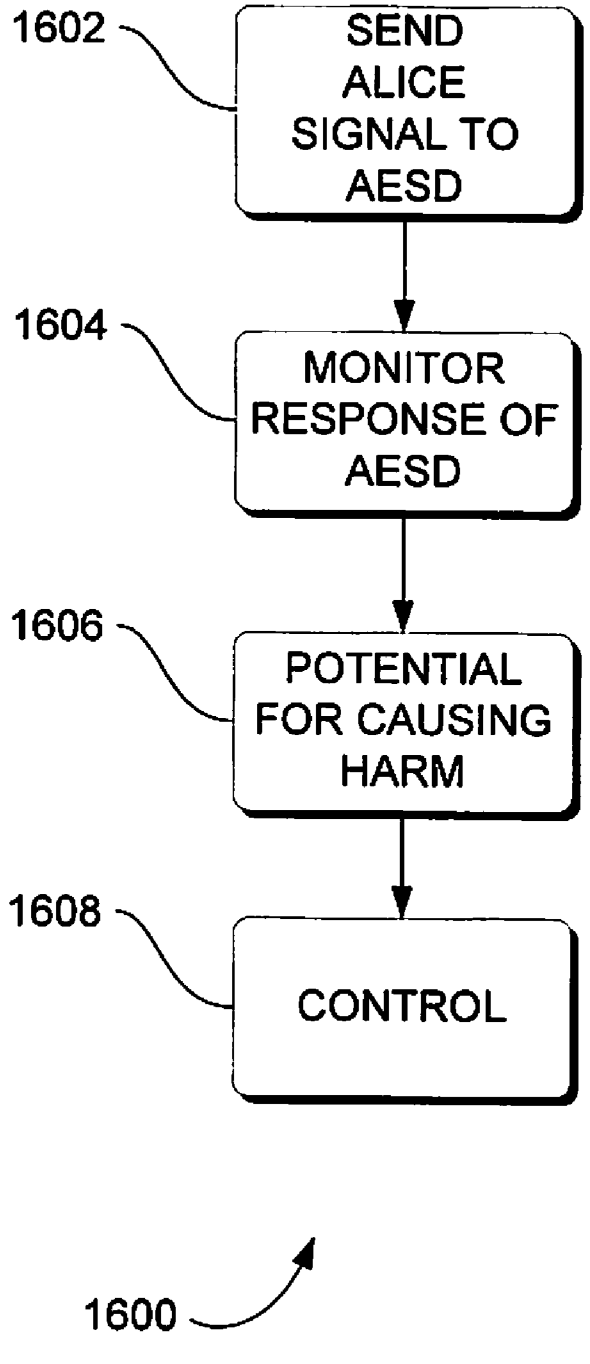
FIG. 16 is a flowchart of a method of a ruling autonomic device controlling a stay-awake signal of an autonomic environmental safety device, according to an embodiment.

FIG. 16 is a flowchart of a method 1600 of a ruling autonomic device controlling a stay-awake signal of an autonomic environmental safety device, according to an embodiment. Method 1600 may solve the need in the art for management of smoke detectors that can be functionally extracted from an environment upon the occurrence of a predetermined condition.

Method 1600 may begin by sending 1602 an ALice signal to an AESD to ascertain the AESD's potential for harm to a system.

Method 1600 also may include monitoring 1604 the response from the AESD. Monitoring 1604 as used herein may include maintaining regular surveillance, or close observation, over anonymous AESDs and can include the absence of a signal. For example, not responding within a timeout period is considered, as used herein, as monitoring the response.

Method 1600 also may include determining 1606 potential for causing harm to the autonomous system by the AESD.

In action 1608, the system may control the AESD based on the potential for harm. This mimics the mechanism of cell death in the human (and animal) organisms, and hence implements autonomic and other biologically inspired metaphors. Method 1600 can send self-destruct signals to AESDs that can be compromised, or which cannot be identified as friendly or as having a right to access certain resources. The ALice signal can challenge an AESD to determine if the AESD is friendly and may have permission to access certain resources. If an AESD fails to identify itself appropriately following an ALice interrogation, the AESD may be blocked from the system and given either a self-destruct signal, or its stay alive reprieve is withdrawn. As an alternative to the ALice signal, a quiesce signal, command or instruction can be sent. The quiesce signal is discussed in more detail in conjunction with FIGS. 14 and 15 above.

Figure 17:
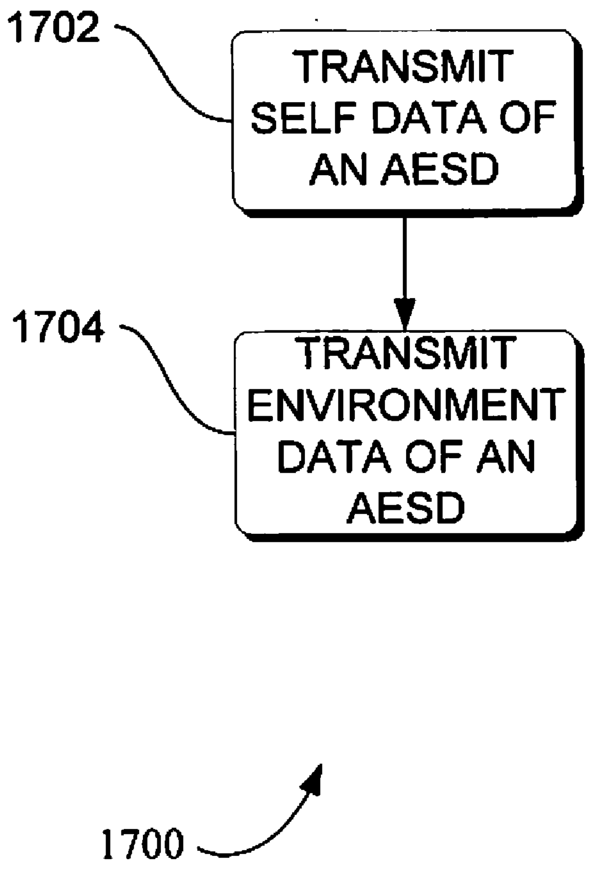
FIG. 17 is a flowchart of a method of autonomic communication by an autonomic environmental safety device, according to an embodiment.

FIG. 17 is a flowchart of a method 1700 of autonomic communication by an autonomic environmental safety device, according to an embodiment. Method 1700 may offer a holistic vision for the development and evolution of AESDs that brings new levels of automation and dependability to AESDs, while simultaneously hiding their complexity and reducing their total cost of ownership.

Method 1700 may include transmitting self health/urgency data 1702 of an AESD. Examples of the self health/urgency data may include information describing low battery power and/or failed sensors. Method 1700 also may include transmitting 1704 environment health/urgency data of the AESD. Examples of the environment health/urgency data may include information describing inaccessible devices, unauthorized access, and/or an unidentified AESD sending communication signals.

Transmitting 1702 and 1704 can be performed in any order relative to each other. For example, in one embodiment the transmitting 1702 self health/urgency data may be performed before transmitting 1704 environment health/urgency data. In another embodiment, transmitting 1704 environment health/urgency data may be performed before transmitting 1702 self health/urgency data. In yet another embodiment, the self health/urgency data may be transmitted simultaneously with the environment health/urgency data. For example, the environment health/urgency data and the self health/urgency data can be transmitted together. One example of transmitting the environment health/urgency data and the self health/urgency data may be encapsulating the environment health/urgency data and the self health/urgency data in a X.25 packet. The environment health/urgency data and the self health/urgency data can be thought of together as the "lub-dub" of a heartbeat in which the two "beats" or two pieces of data may be transmitted simultaneously. The X.25 standard is published by the ITU Telecommunication Standardization Sector at Place des Nations, CH-1211 Geneva 20, Switzerland. One of skill in the art will know that a variety of other types of packets fall with the bounds of the invention.

Figure 18:
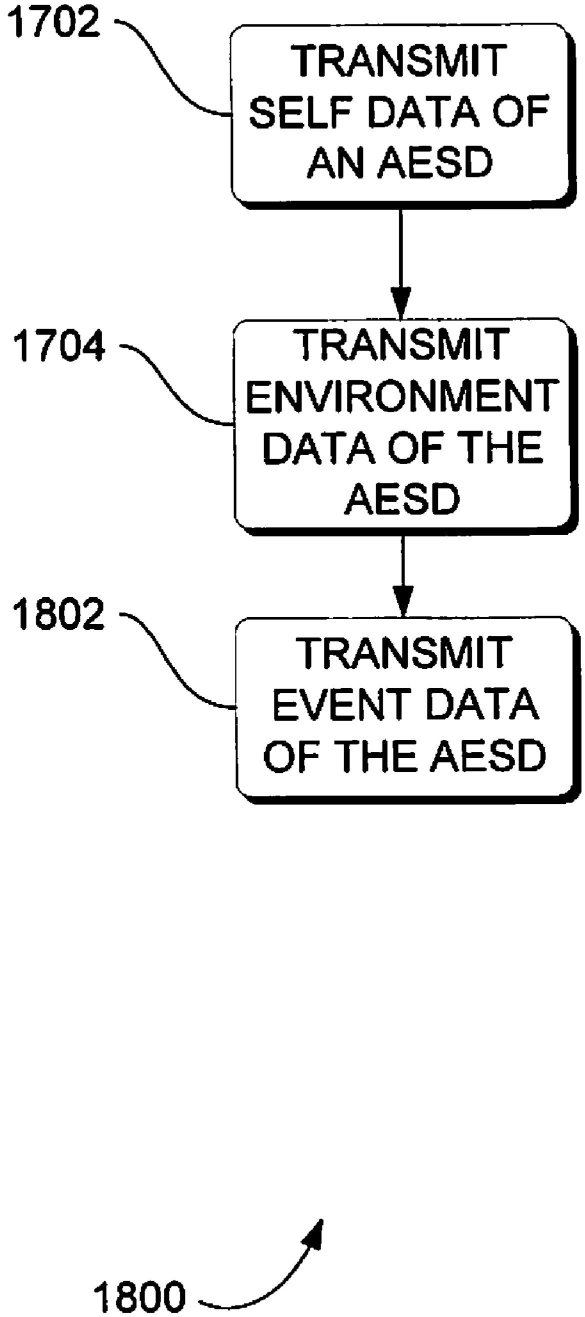
FIG. 18 is a flowchart of a method of autonomic communication by an autonomic environmental safety device, according to an embodiment.

FIG. 18 is a flowchart of a method 1800 of autonomic communication by an autonomic environmental safety device. Method 1800 may include transmitting 1802 event message data of the AESD in addition to the self and environment health/urgency data. Event message data can include data describing a change in condition, or a deviation from a normal operation. Event message data is described in more detail below in FIG. 31.

In some embodiments, the self health/urgency data and environment health/urgency data may be encoded with the standard event messages on an autonomic communications channel, which may provide dynamics within autonomic responses and multiple loops of control, such as reflex reactions among an autonomic manager.

Figure 19:
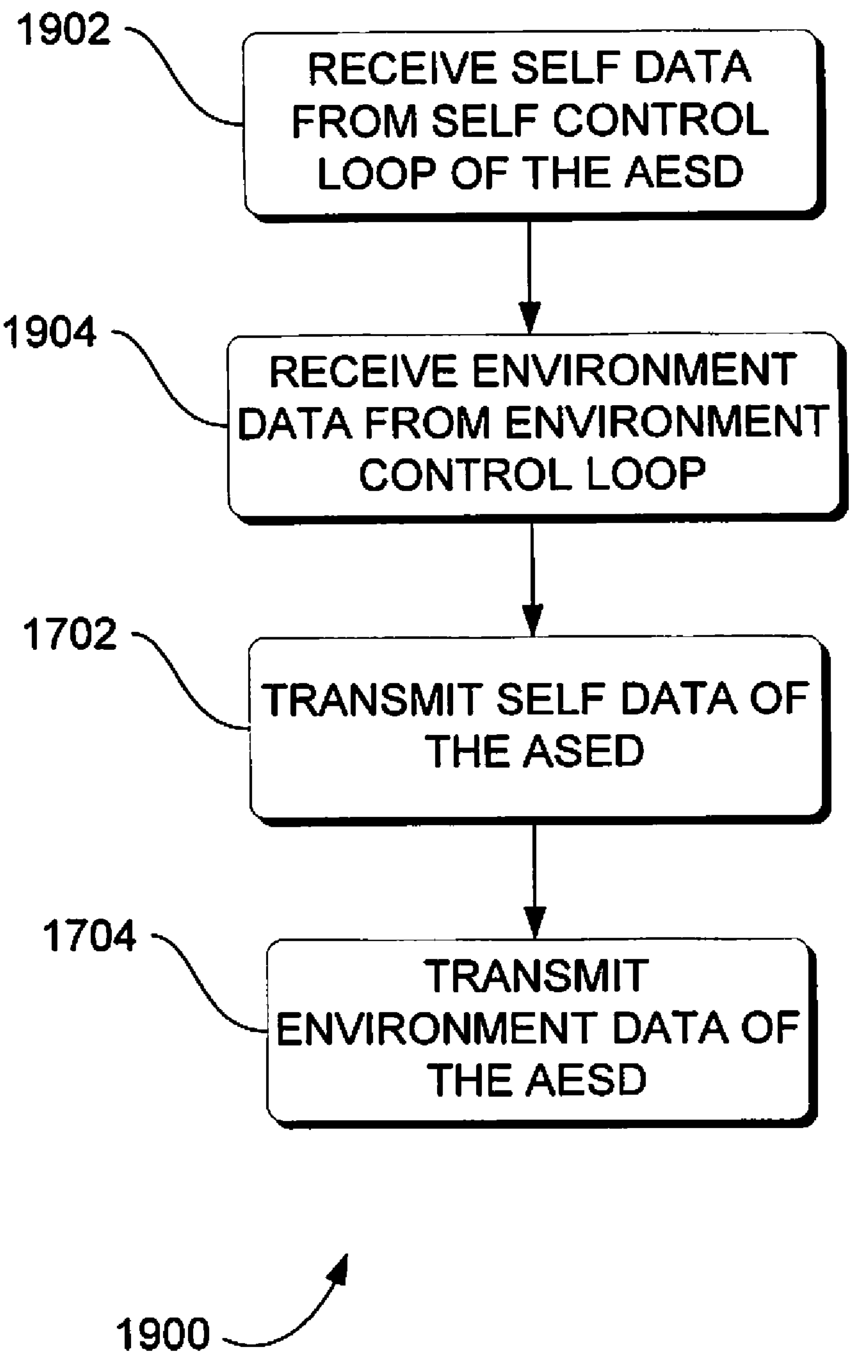
FIG. 19 is a flowchart of a method of autonomic communication by an autonomic environmental safety device, according to an embodiment.

FIG. 19 is a flowchart of a method 1900 of autonomic communication by an autonomic environmental safety device, according to an embodiment. Method 1900 may include receiving 1902 the self health/urgency data from a self control loop component of the AESD. Method 1900 also may include receiving 1904 the environment health/urgency data from an environment control loop component of the AESD.

Method 1900 may further include transmitting self health/urgency data 1702 of an AESD. Examples of the self health/urgency data may include information describing low battery power and/or failed sensors. Method 1900 also may include transmitting 1704 environment health/urgency data of the AESD. Examples of the environment health/urgency data may include information describing inaccessible devices, unauthorized access, and/or an unidentified AESD sending communication signals.

Figure 20:
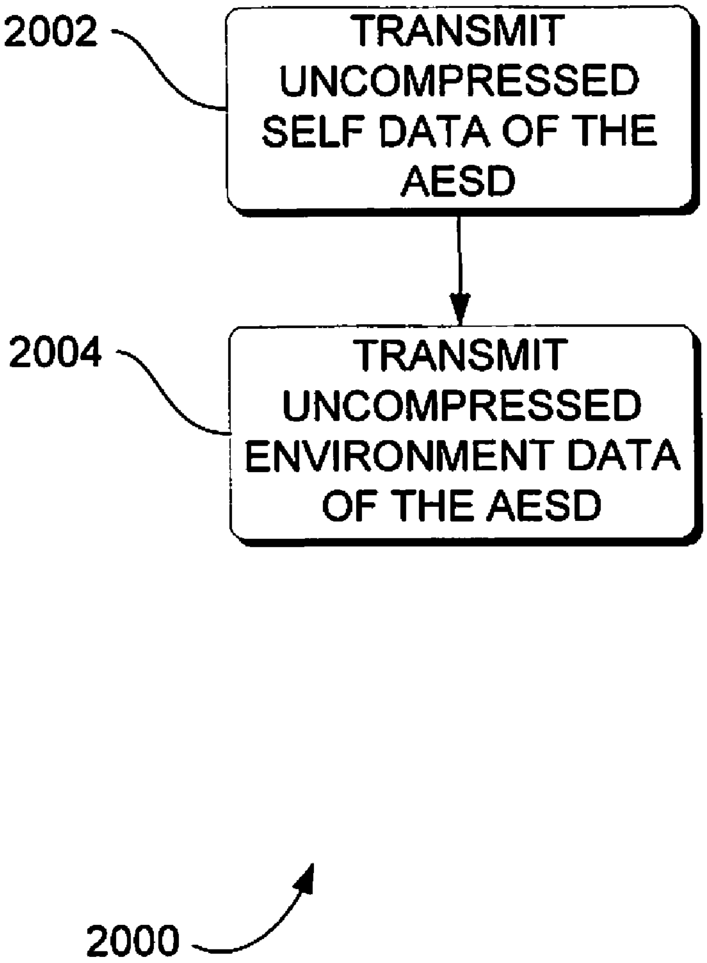
FIG. 20 is a flowchart of a method of autonomic communication by an autonomic environmental safety device, according to an embodiment.

FIG. 20 is a flowchart of a method 2000 of autonomic communication by an autonomic environmental safety device, according to an embodiment. Method 2000 may offer a holistic vision for the development and evolution of computer-based systems that brings new levels of automation and dependability to systems, while simultaneously system complexity and reducing processing delays by systems that receive data from the autonomic environmental safety device.

Method 2000 may include transmitting 2002 uncompressed self health/urgency data of the AESD. Method 2000 also may include transmitting 2004 uncompressed environment health/urgency data of the AESD. In the absence of bandwidth concerns, the uncompressed data can be acted upon quickly and will not incur processing delays. In some embodiments, the data, whether uncompressed or sent in some other form, may be in a form that can be acted upon immediately by the receiver and not involve processing delays (such as is the case of event correlation). Transmitting 2002 and 2004 can be performed in any order relative to each other.

In some embodiments, methods 200-2000 may be implemented as a computer data signal embodied in a carrier wave that represents a sequence of instructions which, when executed by a processor, such as processor 2204 in FIG. 22, cause the processor to perform the respective method. In other embodiments, methods 200-2000 may be implemented as a computer-accessible medium having executable instructions capable of directing a processor, such as processor 2204 in FIG. 22, to perform the respective method. In varying embodiments, the medium can be a magnetic medium, an electronic medium, or an optical medium.

Hardware and Operating Environment

FIGS. 21, 22, 23 and 24 are diagrams of hardware and operating environments in which different embodiments can be practiced. The description of FIGS. 21, 22, 23 and 24 provide an overview of computer hardware and suitable autonomic computing environments in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server autonomic computing environments where remote devices that perform tasks are linked through a communications network. Program modules may be located in both local and remote memory storage devices in a distributed autonomic computing environment. Those skilled in the art will know that these are only a few of the possible computing environments in which the invention may be practiced and therefore these examples are given by way of illustration rather than limitation.

Figure 21:
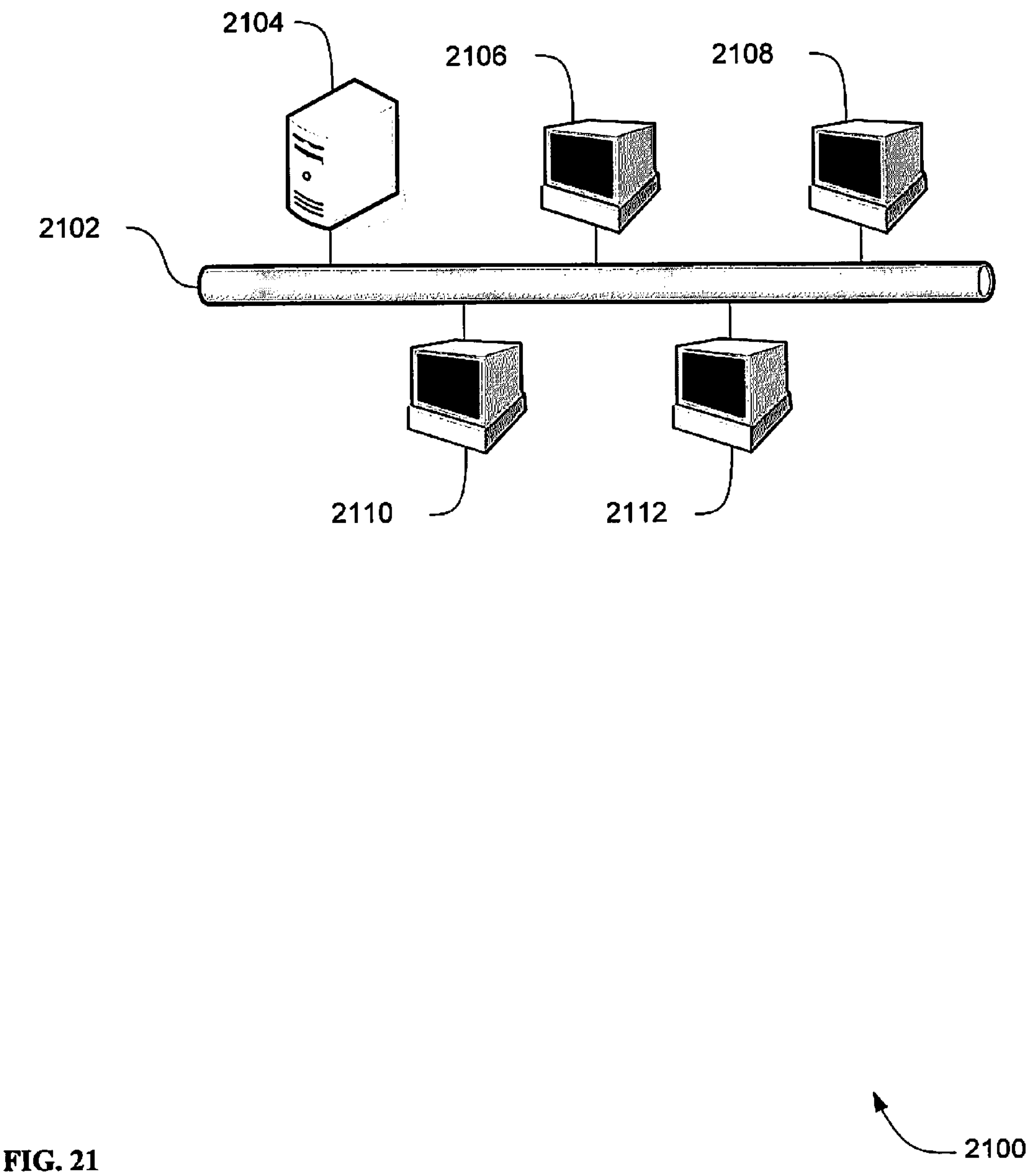
FIG. 21 is a block diagram of a conventional computer cluster environment in which different embodiments can be practiced.

FIG. 21 is a block diagram of a computer cluster environment 2100 in which different embodiments can be practiced. Apparatus 2500, as well as apparatus 2600, 2700, 2800, 2900, and 3000, and ESNS 3300 and 3400 can be implemented on computer cluster environment 2100.

Computer cluster environment 2100 may include a network 2102, such as an EtherFast 10/100 backbone, that can be operably coupled to a cluster server 2104 and a plurality of computers 2106, 2108, 2110 and 2112. One possible embodiment of the computers may be computer 2202 described below with reference to FIG. 22. The plurality of computers can include any number of computers, but some implementations may include 8, 16, 32 and as many as 512 computers. The ESNSs and NBFs described above can be distributed on the plurality of computers.

One example of the computer cluster environment 2100 may be a Beowolf computer cluster. The computer cluster environment 2100 may provide an environment in which a plurality of ESNSs and NBFs can be hosted in an environment that facilitates cooperation and communication between the ESNSs and the NBFs.

FIG. 22 is a block diagram of a hardware and operating environment 2200 in which different embodiments can be practiced. Computer 2202 may include a processor 2204, which may be a microprocessor, commercially available from Intel, Motorola, Cyrix and others. Computer 2202 may also include random-access memory (RAM) 2206, read-only memory (ROM) 2208, and one or more mass storage devices 2210, and a system bus 2212, that operatively couples various system components to the processing unit 2204. The memory 2206, 2208, and mass storage devices, 2210, are illustrated as types of computer-accessible media. Mass storage devices 2210 may be more specifically types of nonvolatile computer-accessible media and can include one or more hard disk drives, floppy disk drives, optical disk drives, and tape cartridge drives. The processor 2204 can execute computer programs stored on the computer-accessible media.

Computer 2202 may be communicatively connected to the Internet 2214 via a communication device 2216. Internet 2214 connectivity is well known within the art. In one embodiment, a communication device 2216 may be a modem that responds to communication drivers to connect to the Internet via what is known in the art as a "dial-up connection." In another embodiment, a communication device 2216 may be an Ethernet® or similar hardware network card connected to a local-area network (LAN) that itself is connected to the Internet via what is known in the art as a "direct connection" (e.g., Ti line, etc.).

A user may enter commands and information into the computer 2202 through input devices such as a keyboard 2218 or a pointing device 2220. The keyboard 2218 may permit entry of textual information into computer 2202, as known within the art, and embodiments are not limited to any particular type of keyboard. Pointing device 2220 may permit the control of the screen pointer provided by a graphical user interface (GUI) of operating systems such as versions of Microsoft Windows®. Embodiments are not limited to any particular pointing device 2220. Such pointing devices may include mice, touch pads, trackballs, remote controls and point sticks. Other input devices (not shown) could include a microphone, joystick, game pad, satellite dish, scanner, or the like.

In some embodiments, computer 2202 may be operatively coupled to a display device 2222. Display device 2222 may be connected to the system bus 2212. Display device 2222 can permit the display of information, including computer, video and other information, for viewing by a user of the computer. Embodiments are not limited to any particular display device 2222. Such display devices may include cathode ray tube (CRT) displays (monitors), as well as flat panel displays such as liquid crystal displays (LCDs). In addition to a monitor, computers may typically include other peripheral input/output devices such as printers (not shown). Speakers 2224 and 2226 provide audio output of signals. Speakers 2224 and 2226 may also be connected to the system bus 2212.

Computer 2202 may also include an operating system (not shown) that could be stored on the computer-accessible media RAM 2206, ROM 2208, and mass storage device 2210, and may be executed by the processor 2204. Examples of operating systems may include Microsoft Windows®, Apple MacOS®, Linux®, UNIX®. Examples are not limited to any particular operating system, however, and the construction and use of such operating systems are well known within the art.

Embodiments of computer 2202 are not limited to any type of computer 2202. In varying embodiments, computer 2202 may comprise a PC-compatible computer, a MacOS®-compatible computer, a Linux®-compatible computer, or a UNIX®-compatible computer. The construction and operation of such computers are well known within the art.

Computer 2202 may be operated using at least one operating system to provide a graphical user interface (GUI) including a user-controllable pointer. Computer 2202 may have at least one web browser application program executing within at least one operating system, to permit users of computer 2202 to access an intranet, extranet or Internet world-wide-web pages as addressed by Universal Resource Locator (URL) addresses. Examples of browser application programs can include Netscape Navigator® and Microsoft Internet Explore®.

The computer 2202 may operate in a networked environment using logical connections to one or more remote computers, such as remote computer 2228. These logical connections may be achieved by a communication device coupled to, or a part of, the computer 2202. Embodiments are not limited to a particular type of communications device. The remote computer 2228 could be another computer, a server, a router, a network PC, a client, a peer device or other common network node. The logical connections depicted in FIG. 22 can include a local-area network (LAN) 2230 and a wide-area network (WAN) 2232. Such networking environments are commonplace in offices, enterprise-wide computer networks, intranets, extranets and the Internet.

When used in a LAN-networking environment, the computer 2202 and remote computer 2228 may be connected to the local network 2230 through network interfaces or adapters 2234, which is one type of communications device 2216. Remote computer 2228 may also include a network device 2236. When used in a conventional WAN-networking environment, the computer 2202 and remote computer 2228 may communicate with a WAN 2232 through modems (not shown). The modem, which can be internal or external, is connected to the system bus 2212. In a networked environment, program modules depicted relative to the computer 2202, or portions thereof, can be stored in the remote computer 2228.

Computer 2202 may also include power supply 2238. Each power supply can be a battery.

Figure 23:
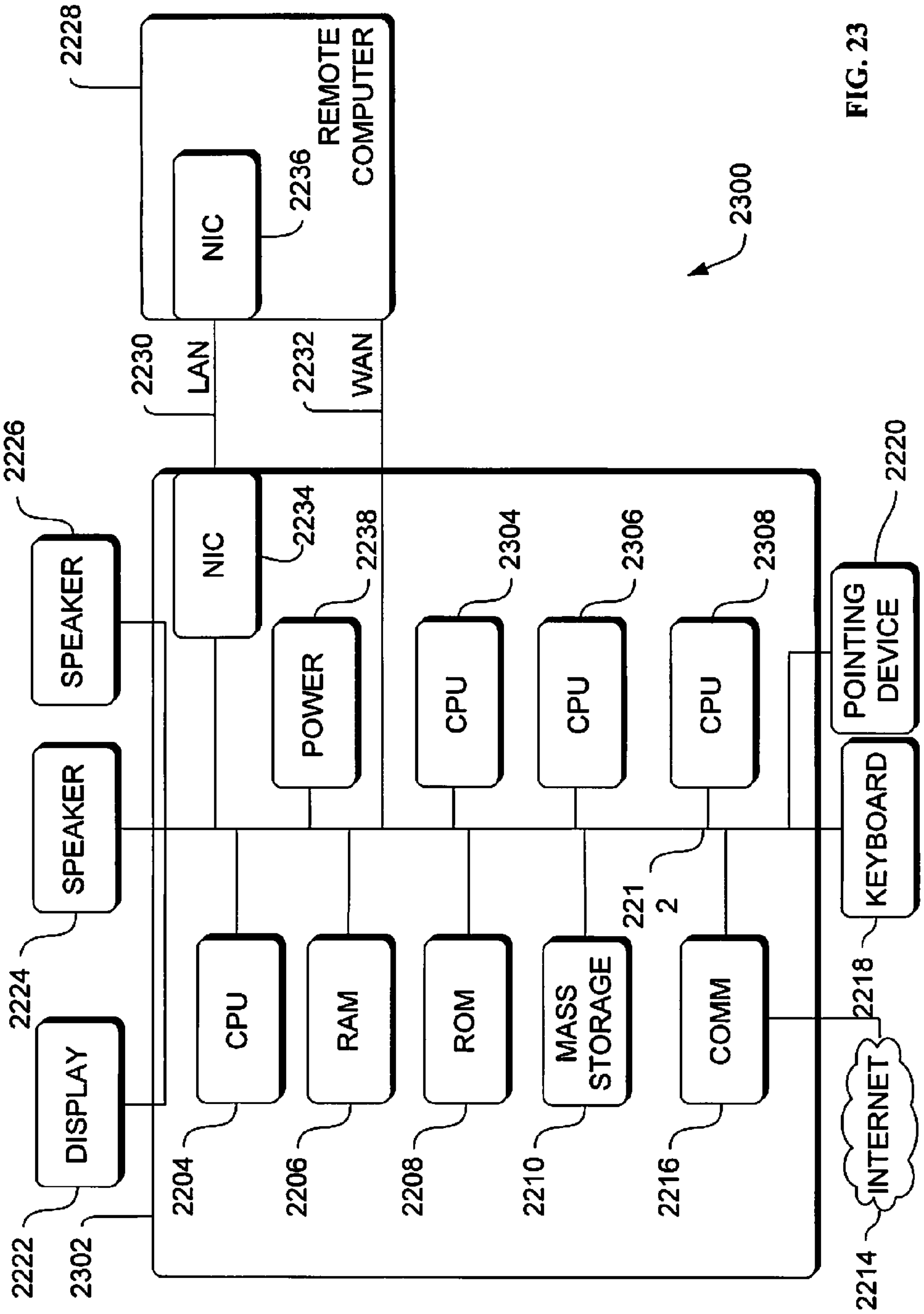
FIG. 23 is a block diagram of a conventional multiprocessor hardware and operating environment in which different embodiments can be practiced.

FIG. 23 is a block diagram of a multiprocessor hardware and operating environment 2300 in which different embodiments can be practiced. Computer 2302 may include a plurality of CPUs or microprocessors, such as microprocessor 2204, 2304, 2306, and 2308. The four microprocessors of computer 2302 may be one example of a multi-processor hardware and operating environment; other numbers of microprocessors may be used in other embodiments.

Similar to the computer cluster environment 2100 in FIG. 21 above, the computer 2302 may provide an environment in which a plurality of ESNSs and NBFs can be hosted in an environment that facilitates cooperation and communication between the ESNSs and the NBFs.

Figure 24:
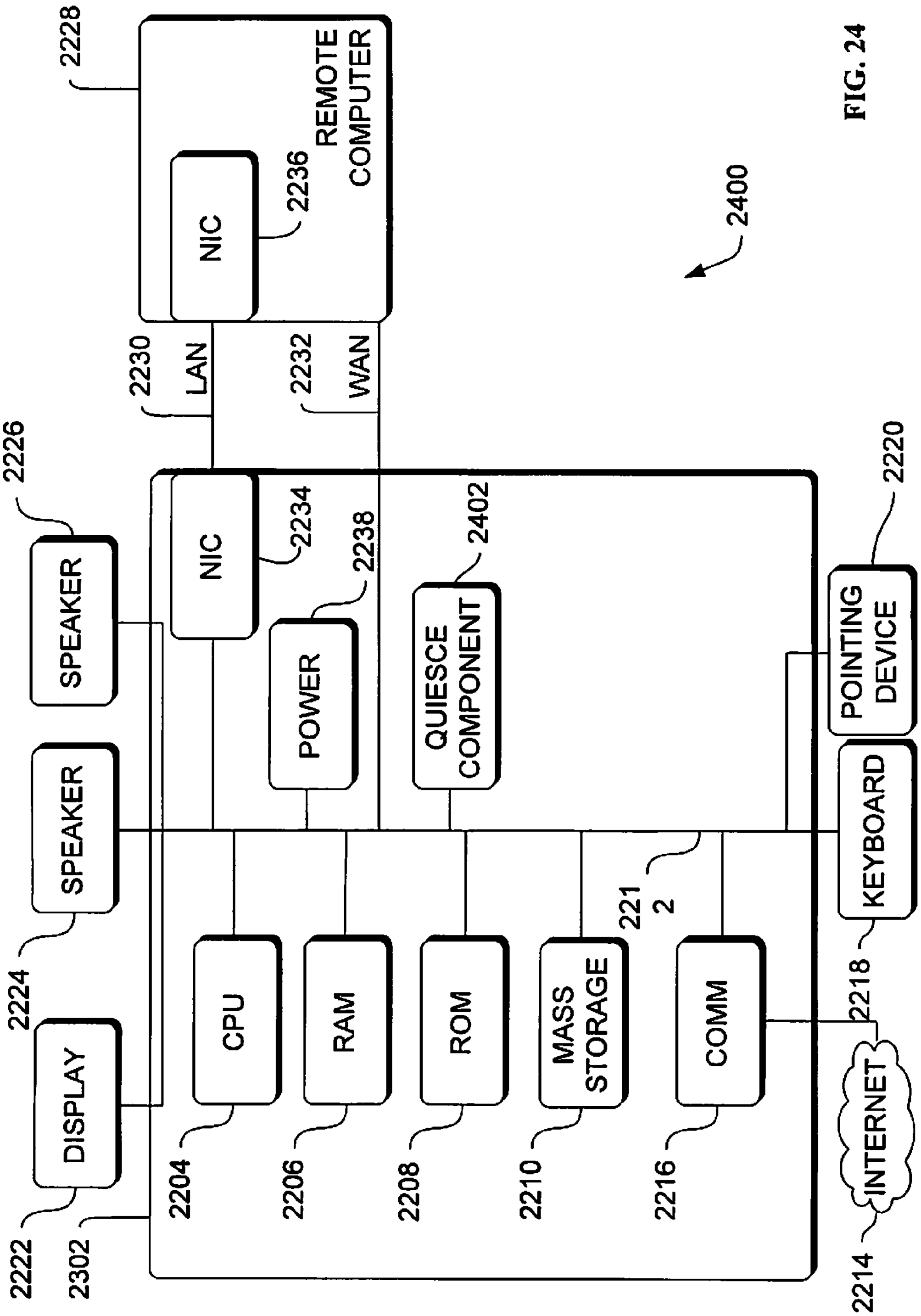
FIG. 24 is a block diagram of a hardware and operating environment which may include a quiesce component, according to an embodiment.

FIG. 24 is a block diagram of a hardware and operating environment 2400 which may include a quiesce component, according to an embodiment. The hardware and operating environment 2400 may solve the need in the art to reduce the possibility that an autonomic element will jeopardize the mission of the autonomic unit.

A quiesce component 2402 of an autonomic unit can render the autonomic unit inactive for a specific amount of time or until a challenging situation has passed. The quiesce component 2402 may be invoked when either an external supervisory entity or the autonomic unit itself determines that the autonomic unit could best serve the needs of the swarm by quiescing. Quiescing can render the autonomic unit temporarily inactive or disabled. Thus, the quiesce component 2402 may reduce the possibility that an autonomic element will jeopardize the mission of the autonomic element by deactivating or inactivating the autonomic element.

Quiesce time may be defined as the length of time taken to quiesce a system (to render it inactive), or the length of time between periods of activity (i.e. the length of time of inactivity). The quiescing may be somewhat analogous to the cell lifecycle, were cells may stop dividing and go into a quiescent state.

Components of system 100 and apparatus 2500, 2600, 2700, 2800, 2900, 3000, 3100, 3200, 3300, 3400, 3500, 3600, 3700, 3800, 3900, 4000 and 4100, and methods 200, 300, 400, 500, 600, 700, 800, 900, 1000, 1100, 1200, 1300, 1400, 1500, 1600, 1700, 1800, 1900 and 2000 can be embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of ways that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components can execute on as few as one computer as in computer 2202 in FIG. 22, or on at least as many computers as there are components.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components can communicate in any of a number of ways that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components may execute on as few as one computer as in computer 2202 in FIG. 22, or on at least as many computers as there are components.

Apparatus Embodiments

In the previous section, some embodiments of operating environments are described. In this section, particular apparatus of such embodiments are described by reference to a series of block diagrams. Describing the apparatus by reference to block diagrams enables one skilled in the art to develop programs, firmware, or hardware, including such instructions to implement the apparatus on suitable computers, executing the instructions from computer-readable media.

Figure 25:
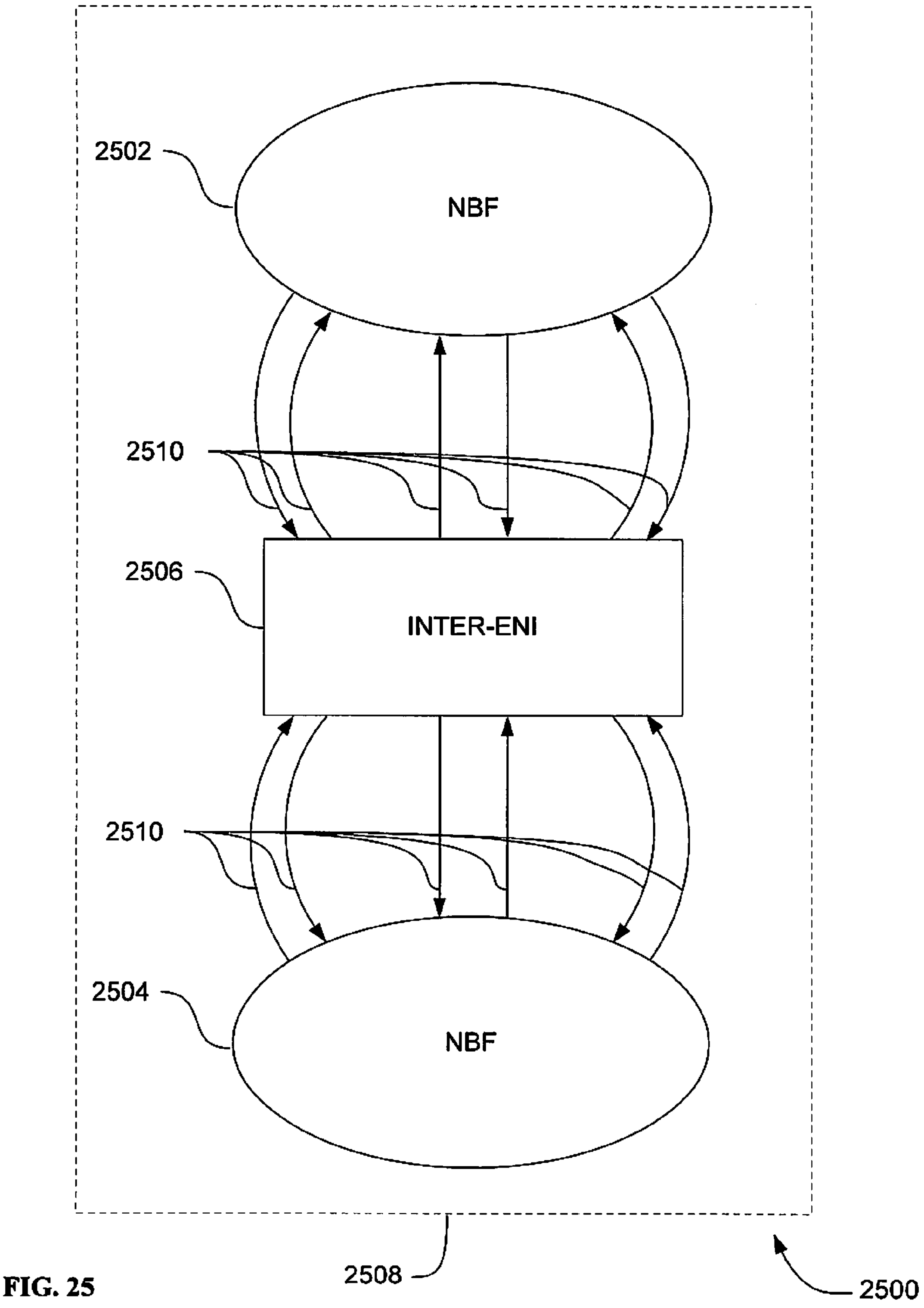
FIG. 25 is a block diagram of an apparatus of an evolvable synthetic neural system to manage collective interactions between autonomous entities, according to an embodiment.

FIG. 25 is a block diagram that provides an overview of an evolvable synthetic neural system to manage collective interactions between autonomous entities, according to an embodiment. Apparatus 2500 may include a first plurality of neural basis functions (NBFs) 2502 and 2504. NBFs are the fundamental building block of apparatus 2500. In some embodiments of apparatus 2500, the plurality of NBFs may include more than the two NBFs 2502 and 2504 shown in FIG. 25. In some embodiments, apparatus 2500 may include only one NBF. One embodiment of a NBF is described below with reference to FIG. 26.

Apparatus 2500 may also include a first inter-evolvable neural interface (ENI) 2506 that is operably coupled to each of the of neural basis functions 2502 and 2504. The NBFs 2502 and 2504 may be highly integrated, and coupling between the NBFs through the ENI 2506 may provide a three dimensional complexity. Thus, for example, when apparatus 2500 is implemented on microprocessors, such as microprocessor 2204 described above with reference to FIG. 22, apparatus 2500 may provide a synthetic neural system that reconciles the two dimensional nature of microprocessor technologies to the three dimensional nature of biological neural systems.

This embodiment of the inter-ENI 2506 may be known as an inter-NBF ENI because the inter-ENI 2506 is illustrated as being between or among the NBFs 2502 and 2504 at the same level within a hierarchy. Apparatus 2500 shows only one level 2508 of a hierarchy, although one skilled in the art will recognize that multiple hierarchies may be used within the scope of this invention.

Apparatus 2500 may also operate autonomously. A system operates autonomously when it exhibits the properties of being self managing and self governing, often termed as autonomic, pervasive, sustainable, ubiquitous, biologically inspired, organic or with similar such terms. ENI 2506 may adapt apparatus 2500 by instantiating new NBFs and ENIs and establishing operable communication paths 2510 to the new NBFs and the ENIs to apparatus 2500. ENI 2506 may also adapt apparatus 2500 by removing or disabling the operable communication paths 2510 to the new NBFs and ENIs. The adapting, establishing, removing and disabling of the communication paths 2510 may be performed autonomously. Thus, apparatus 2500 may satisfy the need for a synthetic neural system that performs significant tasks with complete autonomy.

Apparatus 2500 may be capable of establishing and removing links to other similarly configured systems (not shown). Thus, the apparatus 2500 may be described as self-similar.

While the apparatus 2500 is not limited to any particular NBF or ENI, for sake of clarity simplified NBFs and a simplified ENI are described.

Figure 26:
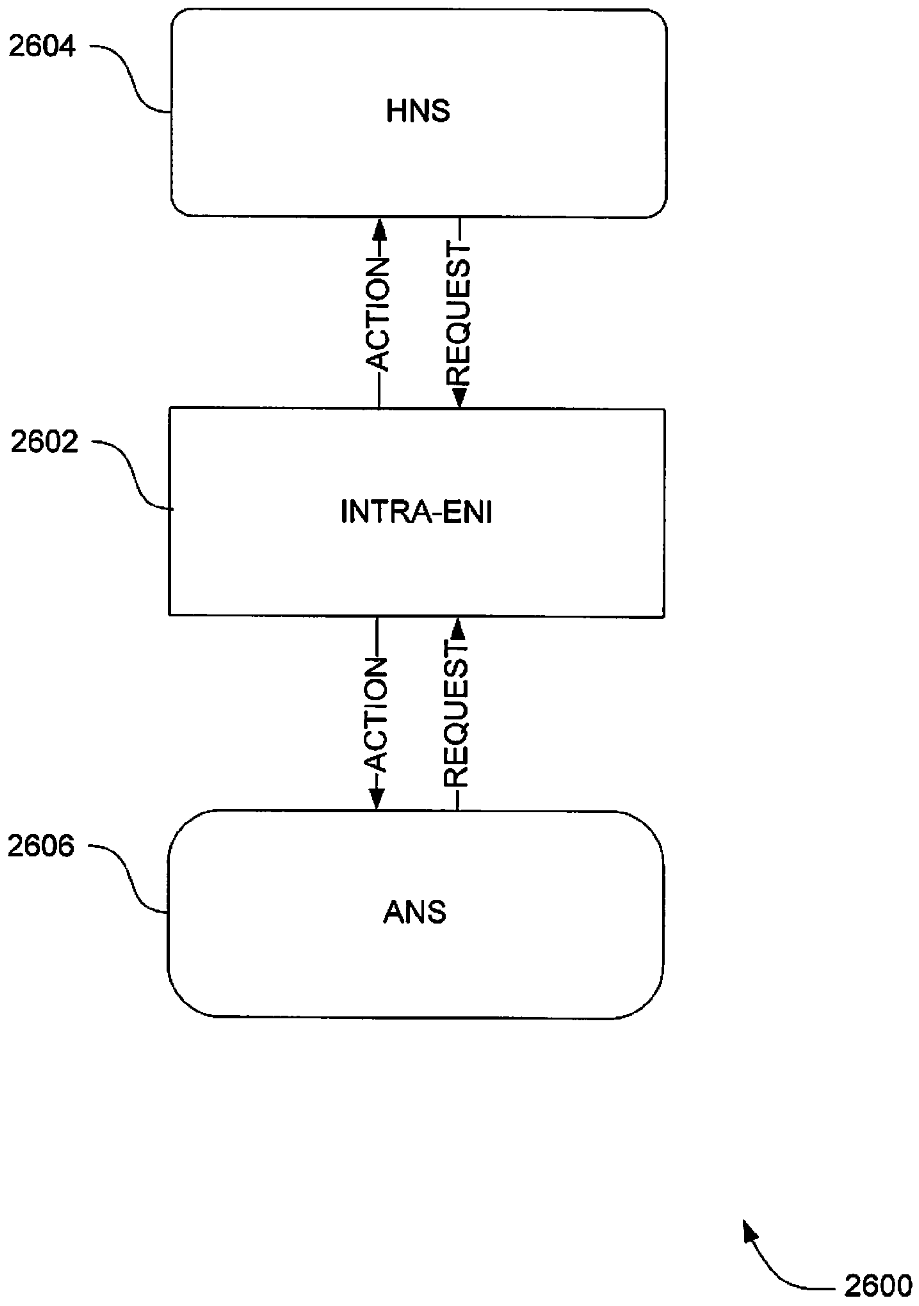
FIG. 26 is a block diagram of a neural basis function of a worker, according to an embodiment.

FIG. 26 is a block diagram of a neural basis function (NBF) 2600 of a worker according to an embodiment. NBF 2600 is illustrated as a bi-level neural system because both high-level functions and low-level functions are performed by NBF 2600.

NBF 2600 may include an intra-evolvable neural interface (intra-ENI) 2602. The ENI 2602 may be operably coupled to a heuristic neural system (HNS) 2604 and operably coupled to an autonomous neural system (ANS) 2606. The HNS 2604 may perform high-level functions and the ANS 2606 performs low-level functions that are often described as "motor functions" such as "motor" 4010 in FIG. 40 below. In NBF 2600, the HNS 2604 and the ANS 2606 in aggregate may provide a function of a biological neural system. The intra-ENI 2602 shown in FIG. 26 is an ENI that is wholly contained within an NBF, and is therefore prefixed with "intra."

The intra-ENI 2602 may send action messages to and receive request messages from the HNS 2604 and the ANS 2606 during learning and task execution cycles, as well as during interfacing operations between the intra-ENI and the HNS 2604 and the ANS 2606 when the HNS 2604 and the ANS 2606 need to be modified as a result of other system failures or modification of objectives. NBF 2600 is illustrated as a worker NBF because this NBF performs functions, but does not provide instructions commands to other NBFs.

Figure 27:
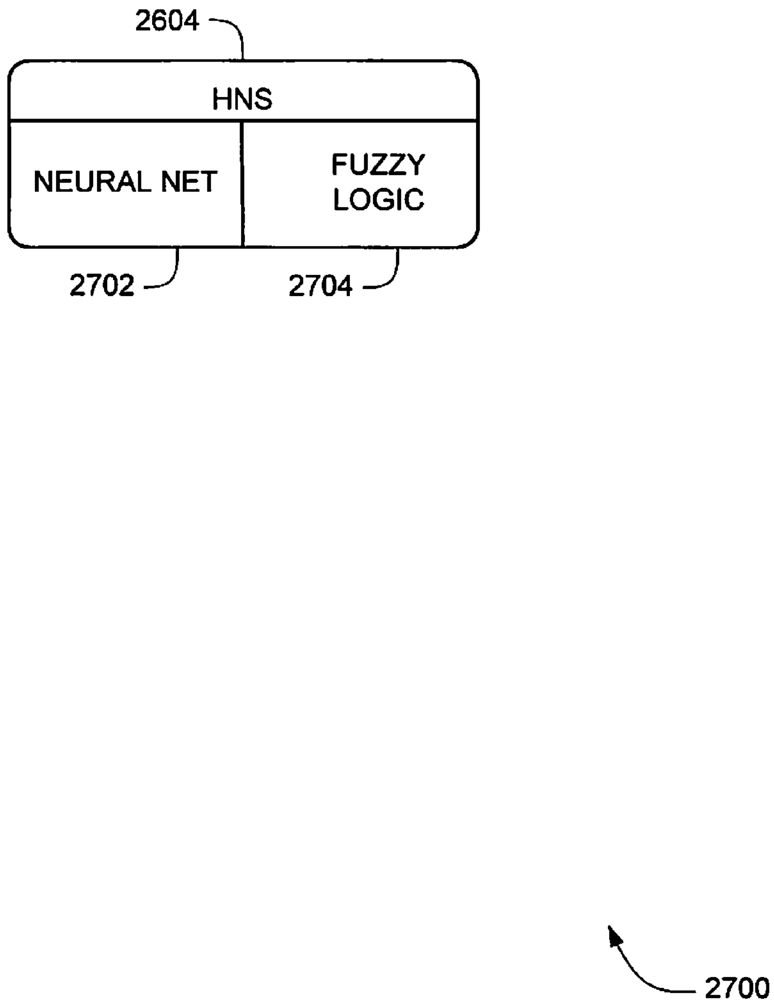
FIG. 27 is a block diagram of a heuristic neural system, according to an embodiment.

FIG. 27 is a block diagram of a heuristic neural system 2700, according to an embodiment.

The heuristic neural system (HNS) 2700 may be composed of a neural net 2702 for pattern recognition and a fuzzy logic package 2704 to perform decisions based on recognitions. Taken together the neural net 2702 and the fuzzy logic package 2704 may form a basis for a higher level heuristic intelligence.

Figure 28:
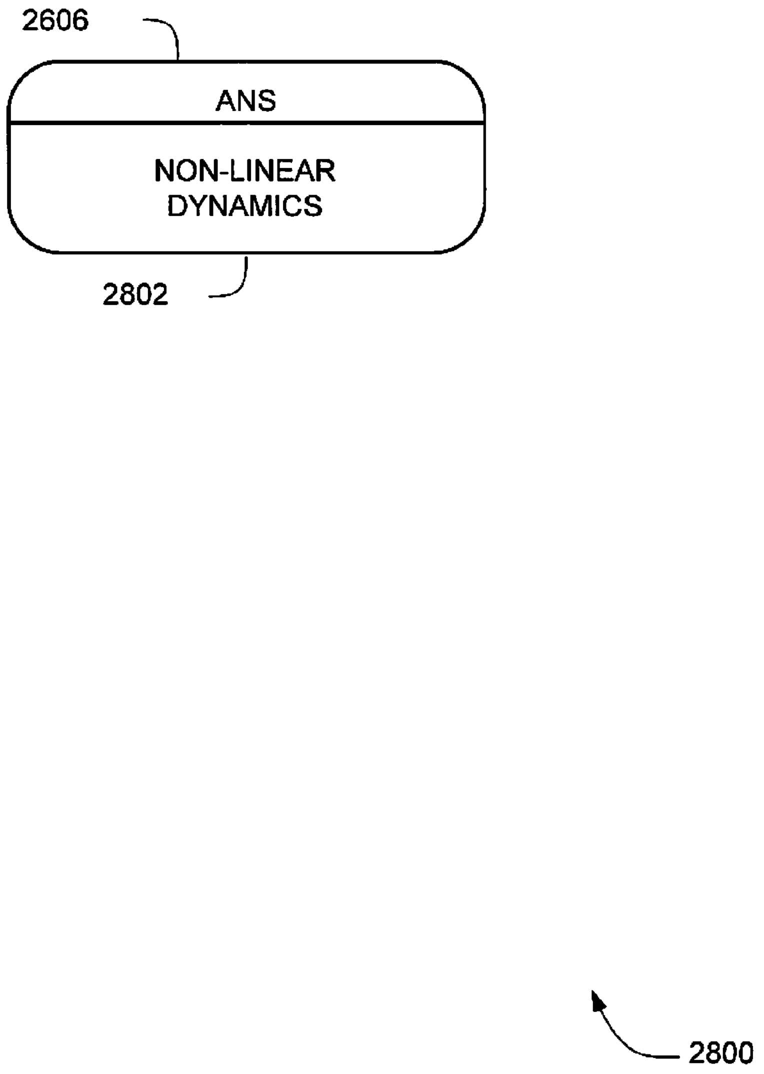
FIG. 28 is a block diagram of an autonomous neural system, according to an embodiment.

FIG. 28 is a block diagram of an autonomous neural system 2800 according to an embodiment.

The autonomous neural system (ANS) 2800 may include a non-linear dynamics simulation 2802 that represents smart servo system behavior.

Figure 29:
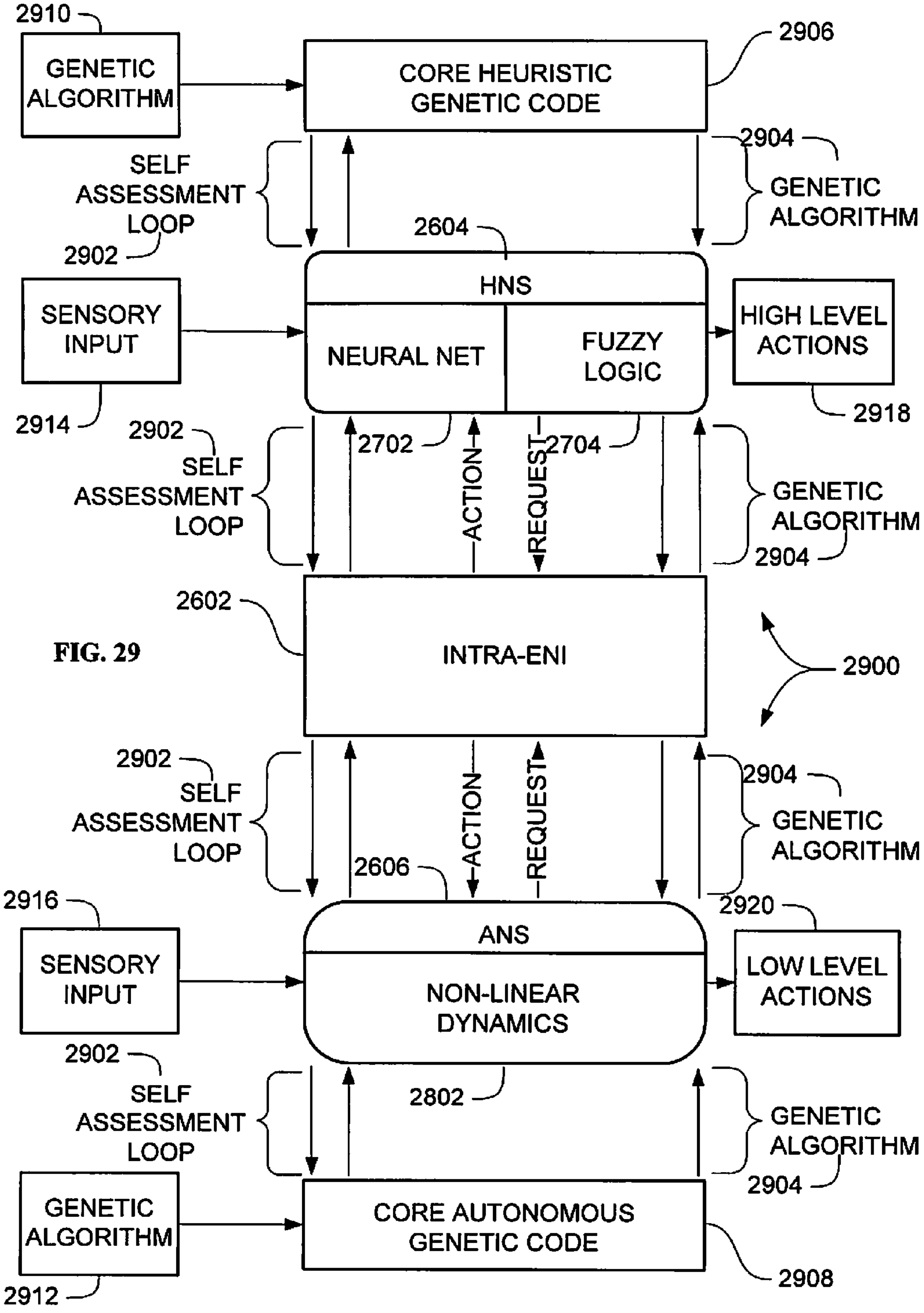
FIG. 29 is a block diagram of a neural basis function of a worker, according to an embodiment.

FIG. 29 is a block diagram of a neural basis function (NBF) 2900 of a worker, according to an embodiment. NBF 2900 is shown as a bi-level neural system.

In some embodiments, NBF 2900 may include a self assessment loop (SAL) 2902 at each interface between autonomic components. Each SAL 2902 may continuously gauge efficiency of operations of the combined HNS 2604 and ANS 2606. The standards and criteria of the efficiency may be set or defined by objectives of the NBF 2900.

In some embodiments, NBF 2900 may also include genetic algorithms (GA) 2904 at each interface between autonomic components. The GAs 2904 may modify the intra-ENI 2602 to satisfy requirements of the SALs 2902 during learning, task execution or impairment of other subsystems.

Similarly, the HNS 2604 may have a SAL 2902 interface and a GA 2904 interface to a core heuristic genetic code (CHGC) 2906, and the ANS 2606 may have a SAL 2902 interface and a GA 2904 interface to a core autonomic genetic code (CAGC) 2908. The CHGC 2906 and CAGC 2908 may allow modifications to a worker functionality in response to new objectives or injury. The CHGC 2906 and the CAGC 2908 autonomic elements may not be part of an operational neural system, but rather may store architectural constraints on the operating neural system for both parts of the bi-level system. The CHGC 2906 and the CAGC 2908 may both be modifiable depending on variations in sensory inputs via GAs 2904.

In some embodiments, the CHGC 2906 and the CAGC 2908 in conjunction with SALs 2902 and GAs 2904 may be generalized within this self similar neural system to reconfigure the relationship between NBFs as well as to permit the instantiation of new NBFs to increase the overall fitness of the neural system. Thus, NBF 2900 may provide a form of evolution possible only over generations of NBF workers.

In some embodiments, NBF 2900 may also include genetic algorithms 2910 and 2912 that provide process information to the CHGC 2906 and the CAGC 2908, respectively. HNS 2604 and ANS 2606 may receive sensory input 2914 and 2916, respectively, process the sensory input and generate high level actions 2918 and low level actions 2920, respectively.

Figure 30:
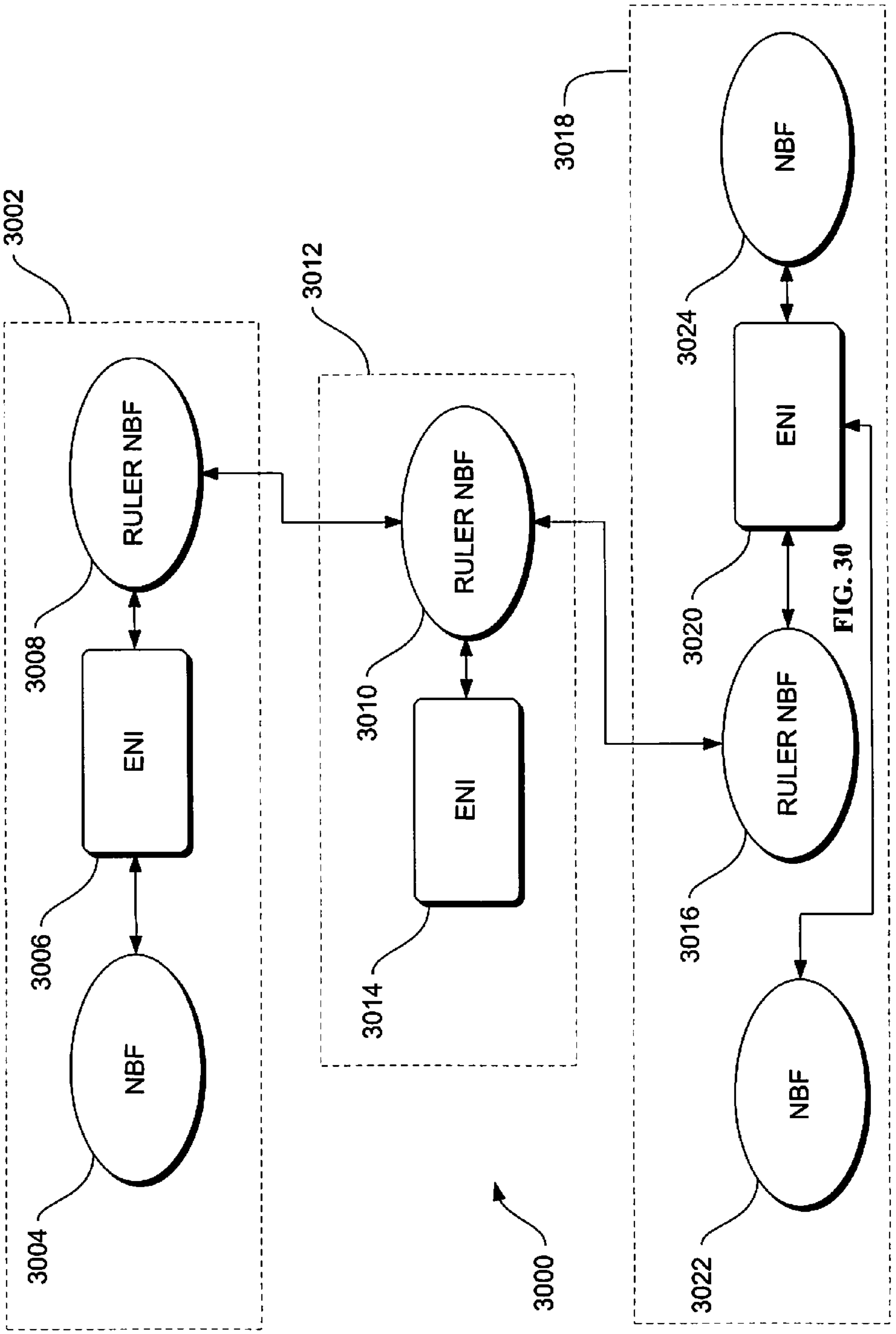
FIG. 30 is a block diagram of a multiple level hierarchical evolvable synthetic neural system, according to an embodiment.

FIG. 30 is a block diagram of a multiple level hierarchical evolvable synthetic neural system (ESNS) 3000, according to an embodiment.

The multiple level hierarchical ESNS 3000 may include a first level of hierarchy 3002 that includes a NBF 3004 and inter-ENI 3006 and a ruler NBF 3008. A ruler NBF, such as ruler NBF 3008 may perform functions and also provide instructions commands to other subordinate NBFs.

The ruler NBF 3008 of the first hierarchical level 3002 is illustrated as being operably coupled to a ruler NBF 3010 in a second hierarchical level 3012. Ruler NBF 3010 may perform functions, receive instructions and commands from other ruler NBFs that are higher in the hierarchy of the ESNS 3000 and also provide instructions commands to other subordinate NBFs.

The second hierarchical level 3012 may also include an inter-ENI 3014. The second hierarchical level 3012 of FIG. 30 shows the embodiment of an ESNS 3000 having one NBF operably coupled to an ENI. The ruler NBF 3010 of the second hierarchical level 3012 may be operably coupled to a ruler NBF 3016 in a third hierarchical level 3018.

The third hierarchical level 3016 may also include an inter-ENI 3020. The third hierarchical level 3016 of FIG. 30 shows the embodiment of an ESNS 3000 having more than two NBFs (e.g. 3016, 3022 and 3024) operably coupled to an ENI.

In some embodiments, the NBFs 3004, 3008, 3010, 3016, 3022 and 3024 may include the aspects of NBFs 2502 and 2504 in FIG. 25 above, and/or NBF 2600 in FIG. 26 above. One skilled in the art will appreciate that many combinations exist that fall within the purview of this invention.

Figure 31:
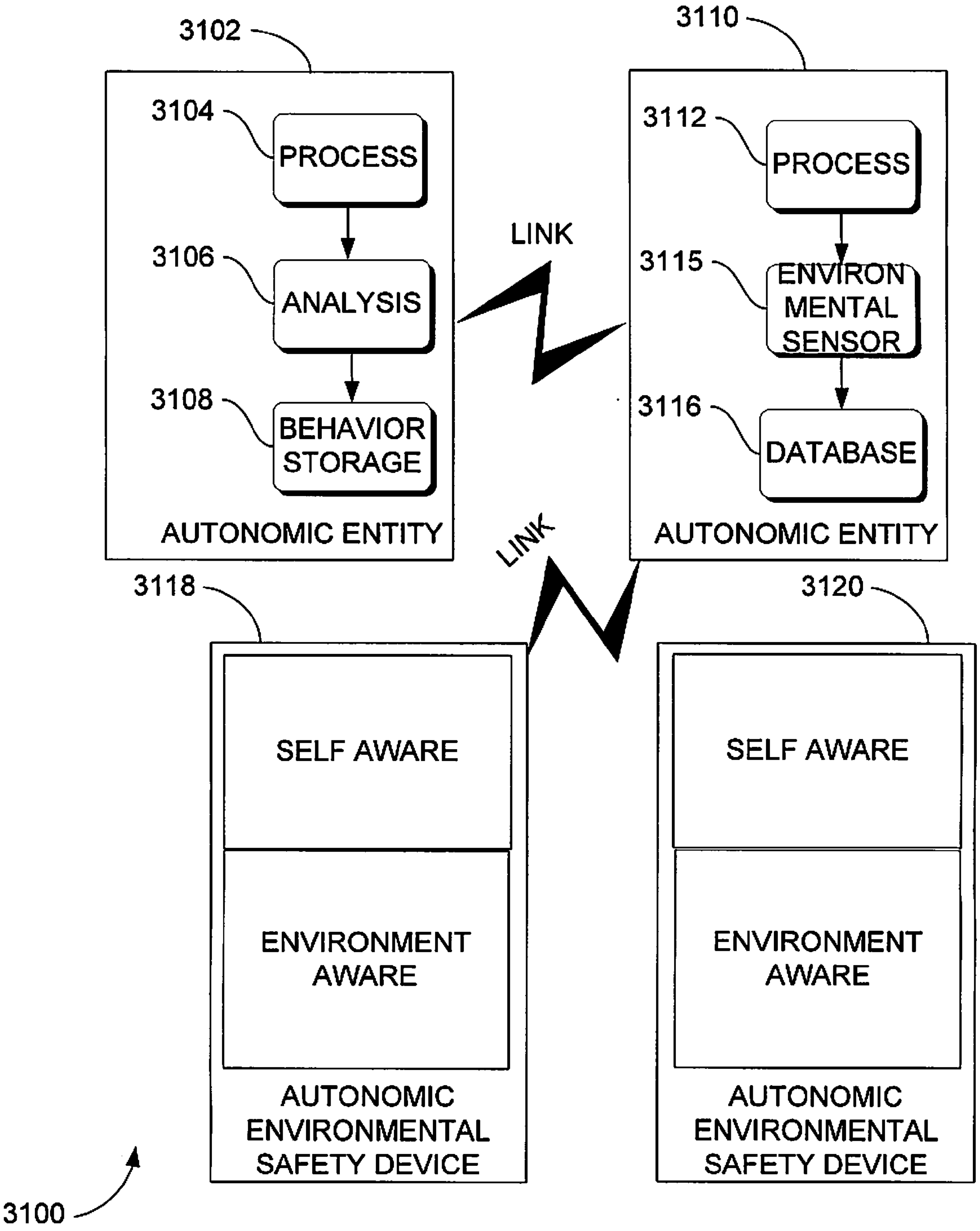
FIG. 31 is a block diagram of a plurality of autonomic entities including autonomic environmental safety devices assembled to perform a task, according to an embodiment.

FIG. 31 is a block diagram of a plurality of autonomic entities including autonomic environmental safety devices assembled to perform a task, according to an embodiment. As a general rule these entities may be self-configuring: adapt automatically to the dynamically changing environments; self-optimizing: monitor and tune resources automatically; self-protecting: anticipate, detect, identify, and protect against attacks from anywhere; and, self-healing: discover, diagnose, and react to disruptions. As shown with reference to autonomic environmental safety devices 3118 and 3120, autonomic computing may have a self-aware layer and an environment aware layer. The self-aware layer of the autonomic entity (agent or other) may be comprised of a managed component and autonomic manager, which can be an agent, termed a self-managing cell (SMC). Control loops with sensors (self-monitor) and effectors (self-adjuster) together with system knowledge and planning/adapting policies may allow the autonomic entities to be self aware and to self manage. A similar scheme may facilitate environment awareness—allowing self management if necessary, but without the immediate control to change the environment; control may be affected through communication with other autonomic managers that have the relevant influence, through reflex or event messages.

The autonomic entities may be arranged or assigned distinctive roles such as worker entities (e.g. autonomic environmental safety device), coordinating or managing entities, and message entities. Based on the task a ruler entity could be assigned a set of worker entities to manage inclusive of determining if a stay alive signal ought to be withdrawn. Furthermore, the communication between the ruler and the worker may be facilitated through the message entity. The message entity may have the additional task of communicating with a remote system. In the case of space exploration, the remote system could be mission control on earth, mission control on an orbital platform, or any other arrangement that can facilitate that is external to the collection of autonomic environmental safety devices. It is foreseeable that the remote system could be an autonomic entity acting like the project manager for the facility or building. Communication with a ruler entity may be limited to the download of science data and status information. An example of such a grouping is shown in FIG. 31 where autonomic entity 3102 is shown as a ruler entity, autonomic entity 3110 is a message entity, and autonomic environmental safety devices 3118 and 3120 are examples of worker entities. In terms of hardware, these entities can be all identical, with the discernable difference being programming to accomplish assigned tasks. An added benefit to having identical hardware can be replacing failed entities, which can be accomplished by activating software code found in the autonomic entity. If hardware differences exist, the differences can be based on specialized equipment suitable for a particular task. However, in some embodiments, certain functions or roles, such as ruler and messenger, may be expected to be within the skill set of all the autonomic entities. In some embodiments, autonomic entity 3110 may be an AESD.

As shown in FIG. 31, ruler autonomic entity 3102 may comprise a program or process executing in ruler entity 3102. Ruler entity 3102 can be implemented using a data processing system, or in the form of an autonomous agent compiled by a data processing system. In the alternative, the ruler entity could be an autonomous nano-technology swarm that is launched from a stationary factory ship for exploring planets, asteroids, or comets. Further, analysis module 3106 or agent, as executed by ruler entity 3102, can be used to monitor process 3104 and to receive pulse monitor and heart beat monitor signals from worker entities through the messenger entity. When analysis module 3106 is used to monitor process 3104, it may be to detect errors or problems with the operation of process 3104. In some embodiments, ruler autonomic entity 3102 may be an AESD.

As shown in FIG. 31, analysis environmental sensor 3106 can include an evaluator or other monitoring engine used to monitor the operation of process 3104. Analysis environmental sensor 3106 may be executed in response to some event. This event can be a periodic event, such as the passage of some period of time, or data received from one or more of the worker entities. Further, the event can be the initialization of internal procedures in process 3104 or the starting or restarting of ruler entity 3102. Depending on the particular implementation, analysis environmental sensor 3106 can continuously run in the background monitoring process 3104 and analyzing the worker entity signals. See method 1200 in FIG. 12 above for actions taken by analysis agent module 3106 in formulating a strategy for the worker entities. Further, analysis agent 3104 may be subject to any self-healing routines found in ruler entity 3102.

This monitoring by analysis agent 3106 may be based on rules stored in behavior storage 3108, which can be used to compare the actual behavior of the received data to an expected behavior as defined in behavior storage 3108. In the some embodiments, behavior storage 3108 (ruler entity 3102) can be a collection of rules that can be updated by a remote computer through the messenger entity that reflects most current fixes (self-healing) or repair procedures and responses to worker entities upon the occurrence of an event, change in condition, or deviation from a normal operation. Behavior storage 3108 can be narrowly tailored based on the use and purpose of the autonomic entity, such as messenger entity 3110 and have only those procedures needed to perform its programming.

When messenger entity connects to a remote computer at a command and control station, database 3116 can be updated with information that can later be used to program ruler entity 3102 or messenger entity 3110. In some embodiments, a copy of the rules in database 3116 may contain the most up-to-date information. If the objective changes or a solution to a problem requires an updated version not found within the autonomic entity, the entities attempts to contact message entity 3110 to see if more recent or up-to-date information is available. If updates are available, these updates may be sent to the requesting entity for processing.

The information in behavior storage 3108 and databases in messenger and worker entity can include an array of values that are expected when selected process or operations are implemented in the respective entity. Examples processes may be initializing software, timing requirements, synchronization of software modules, and other metrics that can provide information concerning the running of a process within the respective entity. Examples operations may be data gathering, processing of information, controlling machinery, or any other operation where data processing systems may be employed. These expected values may be compared to determine if an error condition may have occurred in the operation of the entity. An error condition may be analyzed to determine its causes and possible correction. In the case of a worker entity, the error may be internally analyzed to select the appropriate self-healing procedure and the error can be sent to the ruler entity to be analyzed by analysis agent 3106 using the rules in behavior storage 3108. Based on the analysis, the ruler entity can elect to either withdrawal the stay alive signal to the malfunctioning worker entity or wait a selected period to generate one or more stay alive signal, withdrawal of a stay alive signal, or a self-destruct signal. If the stay alive signal is withdrawn, the malfunctioning entity can be disconnected from the operation and the task be assigned to another entity or partially performed by the remaining entity to insure its completion.

Figure 32:
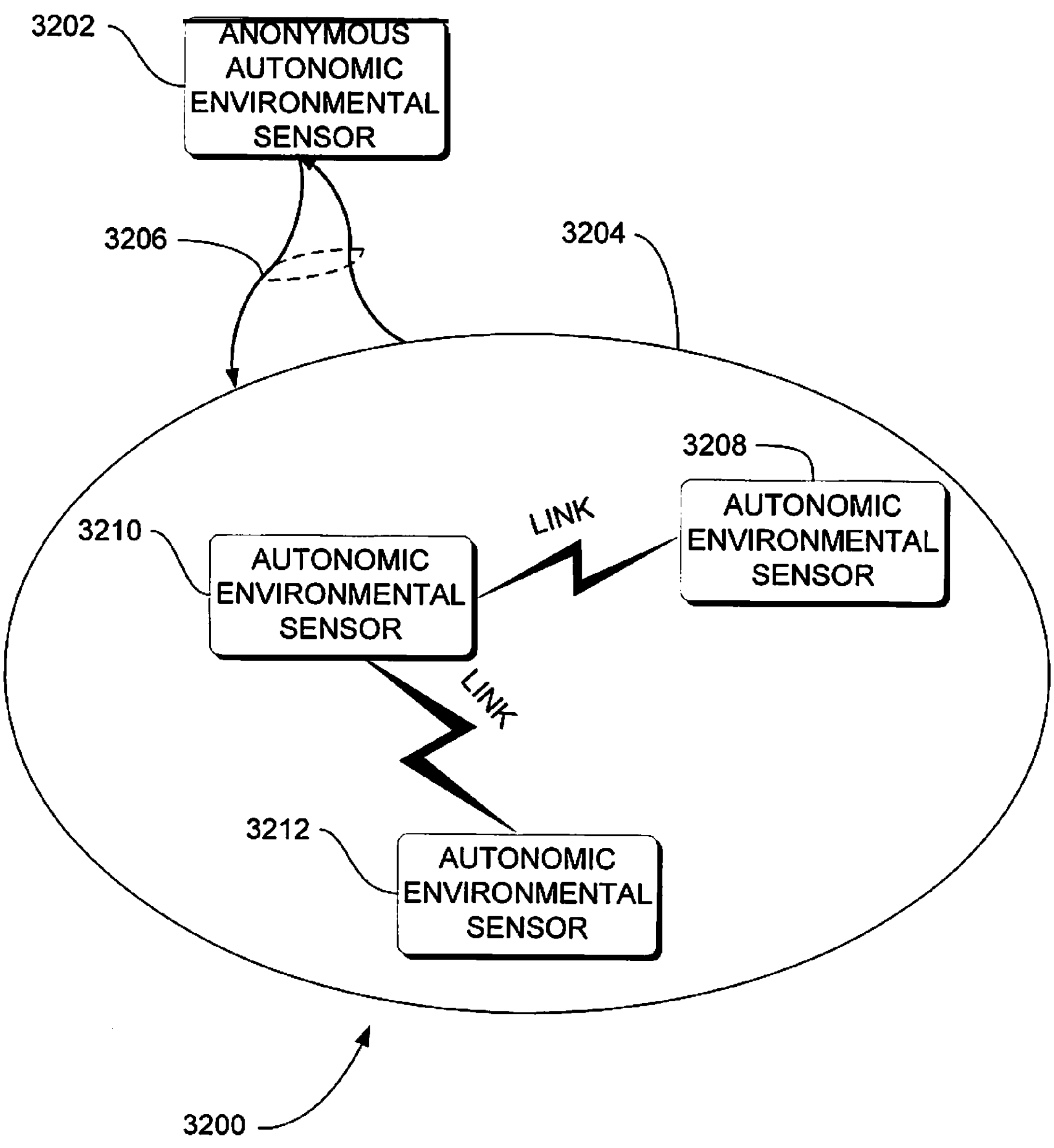
FIG. 32 is a block diagram of an autonomous entity management system, according to an embodiment.

FIG. 32 is a block diagram of an autonomous entity management system 3200, according to an embodiment. The system 3200 may be a generalized system because the system can represent a myriad of devices, processes, or device and process that perform a task in accordance to its programming or design. The system can represent a situation in which an autonomous system 3204 encounters an anonymous autonomic environmental sensor 3202. An anonymous autonomous agent may be a visiting agent, a mobile agent that can enter the sphere of influence of the autonomous system 3204, or any device for which the autonomous system 3204 may have no established relationship. Example encounters may be wireless device (agent) and communication tower (system), a client and server, a video subscriber and video provider, a process and an operating system, and so forth. System 3200 may solve the need in the art for management of autonomous entities that can be functionally extracted from an environment upon the occurrence of a predetermined condition such as a potential security breach.

The autonomous system 3204 may comprise one or more autonomic environmental safety devices 3208, 3210, and 3212, all performing assigned functions and roles. As noted earlier, roles can be a combination of ruler, messenger, and worker. Functions may include data gathering, communication functions, scheduling, controlling, security, and so forth. Upon detecting the presence of the anonymous autonomic environmental sensor 3202, the assigned autonomous agent for performing security functions for autonomous system 3204 may interrogate the anonymous autonomic environmental sensor 3202, requesting production of valid credentials. It should be noted at this point that detection can occur by employing various schemes such as when the anonymous autonomic environmental sensor 3202 requests resources from the system 3204 or from any autonomic entity that forms part of the system, response to polling signals from the autonomous system 3204, or through a friend or foe signal that indicates the presence of an anonymous entity 3202 in proximity to the autonomous system 3204.

To the autonomous system 3204 security may be important because of compromises by the accidental misuse of hosts by agents, as well as the accidental or intentional misuse of agents by hosts and agents by other agents. The result can be, by way of example, damage, denial-of-service, breach-of-privacy, harassment, social engineering, event-triggered attacks, and compound attacks. To prevent security breaches it may be important to ensure that visiting agents have valid and justified reasons for being there, as well as providing security to the visiting agent with interaction with other agents and host. Upon detection, an asynchronous ALice signal (Autonomic license) 3206 may be sent to the visiting environmental sensor 3202 requiring valid credentials from the environmental sensor 3202. The anonymous environmental sensor 3202 may need to work within the autonomic system 3204 to facilitate self-management, and as such the anonymous environmental sensor 3202 and its host may need to be able to identify each other's credentials through such as an ALice signal. The autonomic system 3204 can establish certain response characteristics for the returned signal from the environmental sensor 3202. For example, the autonomic system 3204 can require a response in an appropriate format, within a certain timeout period, and with a valid and justified reason for being within the locus of interest or domain of the autonomous system 3204. For protection the autonomic system 3204 can make an assessment of the quality of the response from the anonymous environmental sensor 3202 to ascertain the potential of the agent for causing harm to the autonomous system 3204. Based on this determination, the autonomous system 3204 can control the type of interaction with the environmental sensor 3202. The agent can be destroyed, blocked, partially blocked, stay alive signal withdrawn, or allowed to communicate with other agents within the autonomous system 3204. The protection can be triggered at any level of infraction or by a combination of infractions by the anonymous autonomous environmental sensor 3202 when responding to the ALice signal. Failure to identify itself appropriately, following an ALice interrogation, it can be blocked from the system and given either a self-destruct signal, or its "stay alive" reprieve can be withdrawn. The consequence of an unacceptable response to an anonymous environmental sensor 3202, should it fail to respond within a timeout period, may be that the environmental sensor 3202 is deemed to be an intruder or other invalid agent (process) and consequently may be destroyed and/or excluded from communicating with other autonomic environmental safety devices 3208, 3210, 3212 in the system. As an alternative to the ALice signal, a quiesce signal, command or instruction can be sent. The quiesce signal is discussed in more detail in conjunction with FIGS. 14 and 15 above.

Figure 33:
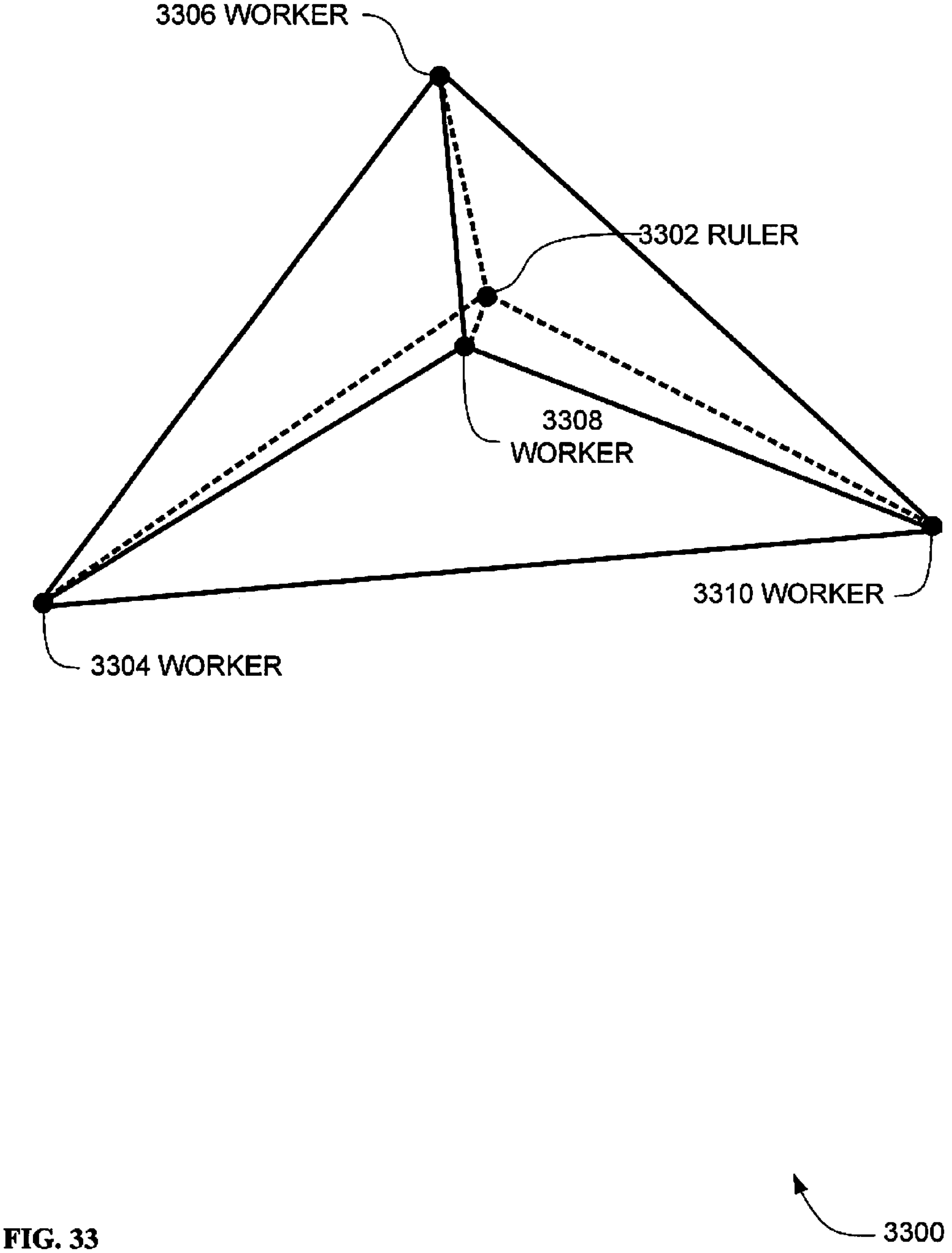
FIG. 33 is a diagram of a three dimensional hierarchical evolvable synthetic neural system, according to an embodiment.

Referring to FIG. 33, a particular three-dimensional implementation is described in conjunction with FIG. 25 and the apparatus described in FIG. 30.

FIG. 33 is a diagram of a three dimensional (3D) hierarchical evolvable synthetic neural system (ESNS) 3300, according to an embodiment.

Some embodiments of the 3D hierarchical ESNS 3300 may include a ruler subsystem 3302 and four worker subsystems 3304, 3306, 3308 and 3310. Each subsystem in the 3D hierarchical ESNS 3300 may include one or more ESNSs such as system 2500 or ESNS 3000.

The three dimensional architecture of 3D hierarchical ESNS 3300 may provide a three dimensional complexity. An implementation of ESNS 3000 on a microprocessor, such as microprocessor 2204, described above with reference to FIG. 22, may provide a synthetic neural system that reconciles the two dimensional nature of microprocessor technologies to the three dimensional nature of biological neural systems.

Figure 34:
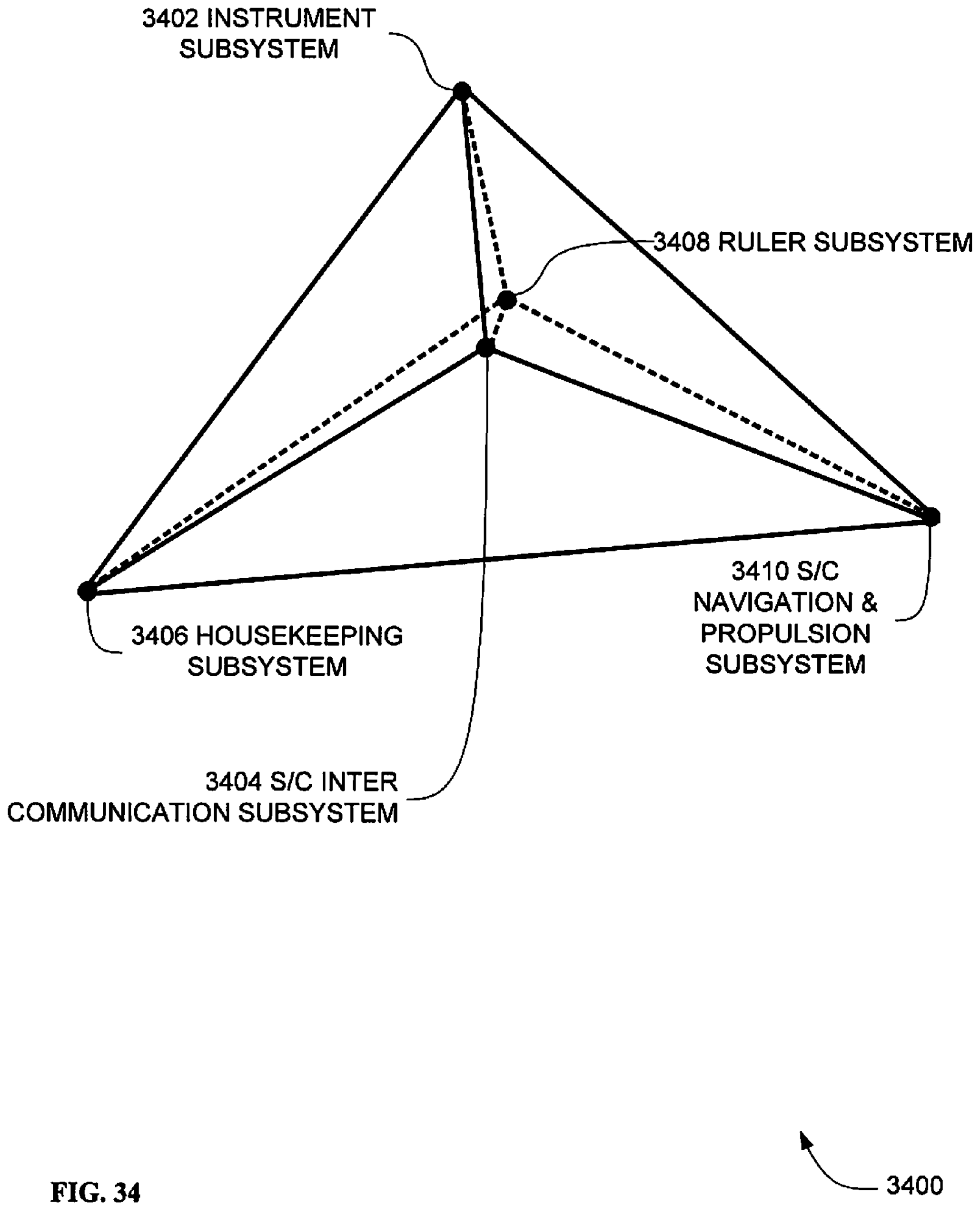
FIG. 34 is a diagram of a heuristic neural system, according to an embodiment, for a single instrument spacecraft to prospect asteroid belts.

Referring to FIG. 34, a particular three-dimensional implementation for asteroid prospecting is described in conjunction with the system overview in FIG. 25 and the apparatus described in FIG. 30.

FIG. 34 is a diagram of a heuristic neural system (HNS) 3400, according to an embodiment, for a single instrument spacecraft to prospect asteroid belts.

Each spacecraft may be controlled by a subset of NBFs (SNBF) which in aggregate may provide the behavior of a subsystem of the mission. For example, a solar sailing SNBF 3402 may control sail deployment and subsequent configuration activity much as terrestrial sailors perform navigation and manage propulsion. A spacecraft inter communication subsystem SNBF 3404 may control communication with other workers and rulers. Also, a housekeeping SNBF 3406 may control the spacecraft housekeeping. HNS 3400 may also include a ruler subsystem 3408 to coordinate all activities. Similarly, a spacecraft navigation and propulsion subsystem 3410 may control the navigation and propulsion, matching the navigation and propulsion to the current objectives.

In at least one embodiment, each spacecraft could be a worker in a totally autonomous space mission. The space mission may be configured as an autonomous nanotechnology swarm (ANTS). Each spacecraft in an ANTS may be assigned a specialized mission, much like ants in an ant colony have a specialized mission. Yet, the HNS architecture of each worker in an ANTS may provide coordination and interaction between each HNS that yields performance of the aggregate of the ANTS that exceeds the performance of a group of generalist workers.

More specifically, the SNBFs within HNS 3400 may have a hierarchical interaction among themselves much as the workers do in the entire ANTS collective. Hence, although many activities of the spacecraft could be controlled by individual SNBFs, a ruler SNBF may coordinate all of the SNBFs to assure that spacecraft objectives are met. Additionally, to have redundancy for the mission, inactive workers and rulers may only participate if a member of their type is lost. In addition, a hierarchical worker node can collapse to a non-hierarchical one, if all of the available sub-rulers for that node are lost.

In one particular application of an ANTS, a prospecting asteroid mission (PAM) may survey a large population or surface area targets, such as main-belt asteroids. The primary objective of a PAM could be exploration of the asteroid belt in search of resources and material with astrobiologically relevant origins and signatures. The PAM may include a swarm of approximately 1000 spacecraft that includes approximately 10 types of specialist workers (e.g. HNS 3400) with a common spacecraft bus that is organized into 10 subswarms of approximately 100 spacecraft each, having approximately 10 specialist HNSs.

In some embodiments, each individual spacecraft in a PAM may weigh 1 kilogram or less with a one meter diameter body and 100 meter$^2$ sails when fully deployed. Each spacecraft may be packaged into a 10 cm$^2$ sided cube. A swarm of 1000 of these spacecraft may fit into 1 meter$^3$ weighing 1000 kilograms in deployment. Each spacecraft may also include a solar sail propulsion system that requires no expendable supplies and a small nuclear battery that provides sufficient power to each worker. Thus, the prospecting asteroid mission may be self-directed and can possibly be self-sustaining for tens of years.

Figure 35:
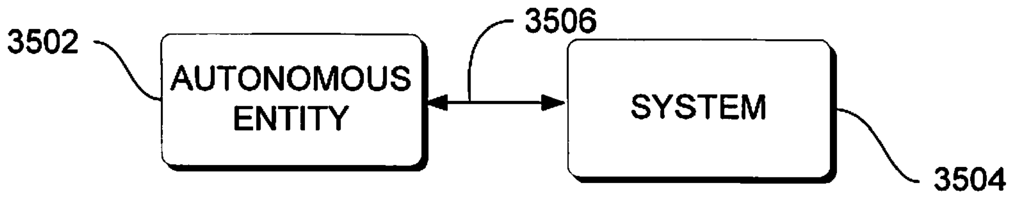
FIG. 35 is a diagram of an autonomous entity managing a system, according to an embodiment.

FIG. 35 is a block diagram of an autonomic entity management system 3500, according to an embodiment. The system 3504 may be a generic system because it can represent a myriad of devices, processes, or device and process that perform a task in accordance to its programming or design. The system 3504 could be software for updating or for synchronizing a file, could be a worker craft containing unique instruments for data gathering in an autonomous nano-technology swarm, or the system 3504 could be an application for managing resources in networks or general purpose computers. The system 3504 can have multiple applications and capabilities such as self healing and self monitoring, and in some embodiments, the system 3504 may be required to have a way for communicating a functional status and operating state signal to the managing autonomous entity manager 3502. The system 3504 may exhibit the properties of being self managing and self governing, often termed autonomic, pervasive, sustainable, ubiquitous, biologically inspired, organic or with similar such terms.

While the autonomic entity management system 3500 is shown as discrete autonomic components it should be understood that autonomic computing is dependent on many disciplines for its success; not least of these is research in agent technologies. The autonomic manager 3502 or system 3504 can be agents themselves containing functionality for measurement and event correlation and support for policy based control.

The functional status may be represented by a heart beat monitor (HBM) signal that indicates that the system 3504 is still functioning as designed. The HBM signal is fundamentally an "I am alive" signal to the autonomic manager, such as autonomic entity 3502, indicating that the system is functioning. These signals can be communicated from system 3504 through an appropriate bi-directional communication link 3506. The response from the autonomous manager 3502 can use the same link to influence system 3504. The communication link can be one or more radio link, data bus, a call procedure when implemented as software, or any other link presently existing or to be developed for facilitating communication between autonomic elements.

The operating state signal may be represented by a pulse monitor (PBM) signal. The PBM signal can be used by the autonomic entity 3502 or autonomic manager to infer potential warning conditions so preparations can be made to handle changing processing loads, impact on mission objectives, planning for correction, and possible substitute or reassignment of role or functionality to perform the desired objectives of system 3504. Autonomous manager 3502 has the additional option of generating a stay alive signal that can be used to safeguard resources, safeguard the completion of the objectives, and safeguard the system 3504 by removing the offending agent or the sub-component of system 3504. The stay alive signal borrows from the process of apoptosis in biological systems for cell self-destruction to maintain growth and protect the biological system from catastrophe. In biological systems, self-destruct is an intrinsic property that is delayed due to the continuous receipt of biochemical reprieves. The process is referred to as apoptosis, meaning drop out due to the origin of the word derived from dropping of leaves from trees; i.e., loss of cells that ought to die in the midst of the living structure. This process has also been nicknamed death by default, where cells are prevented from putting an end to themselves due to constant receipt of biochemical stay alive signals. In the present arrangement, self-destruction is usable in preventing race conditions and undesirable emergent behavior that have been shown to influence system performance and thus mission objectives. While self-destruction can be viewed as a last resort situation to prevent further damage, in other situations, such as security of the agent or system 3504, self-destruction can be used as an intrinsic part of the process, such as blocking the autonomic entity from communicating or using the resources of the system.

Figure 36:
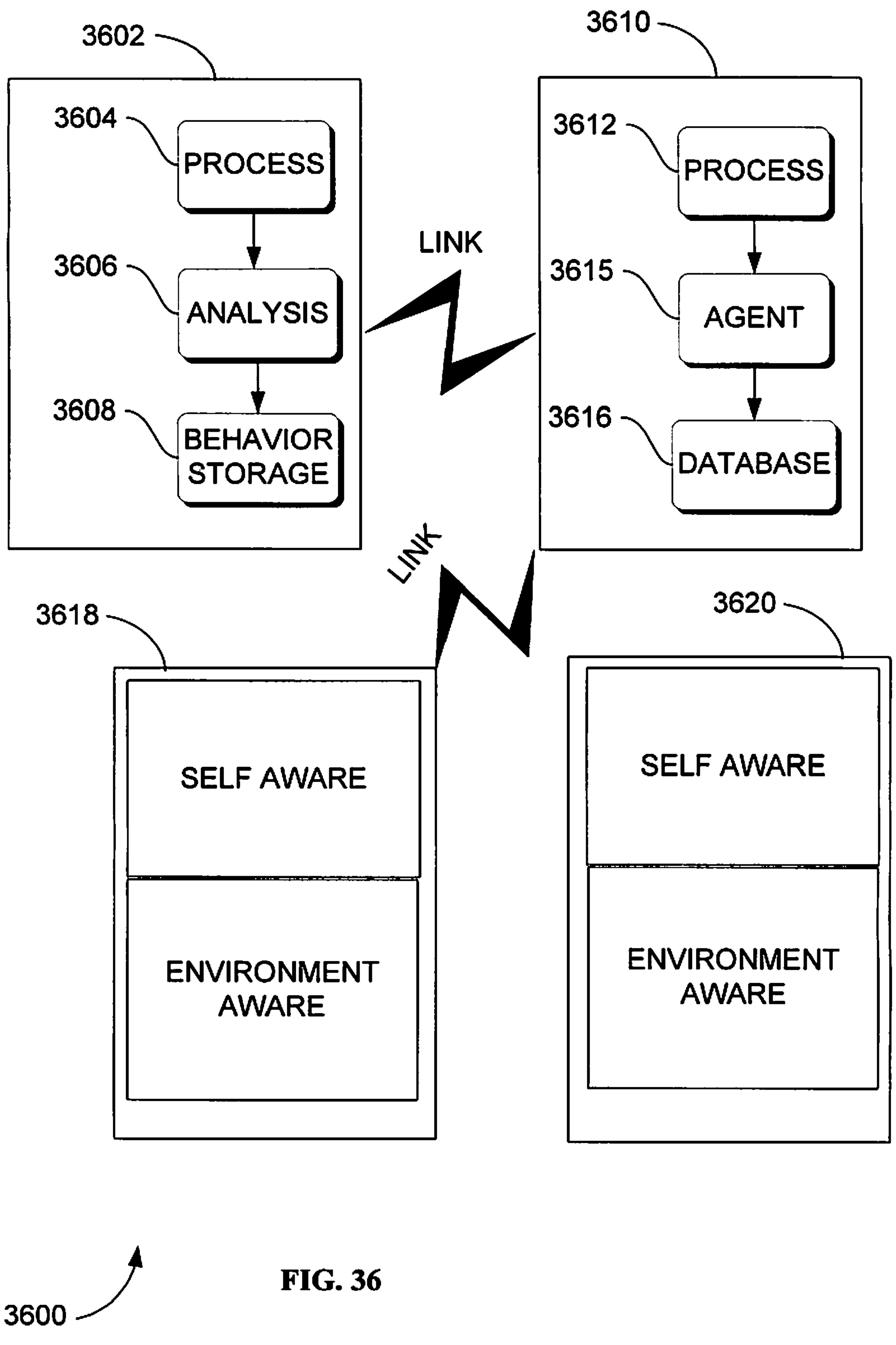
FIG. 36 is a diagram of autonomous entities interaction, according to an embodiment.

FIG. 36 is a diagram representation of a plurality of autonomic entities that have been assembled to perform a task. These entities may be Self-configuring: adapt automatically to the dynamically changing environments; Self-optimizing: monitor and tune resources automatically; Self-protecting: anticipate, detect, identify, and protect against attacks from anywhere; and, Self-healing: discover, diagnose, and react to disruptions. As shown with reference to autonomic entities 3618 and 3620, autonomic computing may have a self-aware layer and an environment aware layer. The self-aware layer of the autonomic entity (agent or other) may be comprised of a managed component and autonomic manager, which can be an agent, termed a self-managing cell (SMC). Control loops with sensors (self-monitor) and effectors (self-adjuster) together with system knowledge and planning/adapting policies may allow the autonomic entities to be self aware and to self manage. A similar scheme may facilitate environment awareness—allowing self managing if necessary, but, without the immediate control to change the environment, this could be affected through communication with other autonomic managers that have the relevant influence, through reflex or event messages. The autonomic entities may be arranged or assigned distinctive roles such as worker entities, coordinating or managing entities, and message entities. Based on the task, a ruler entity could be assigned a set of worker entities to manage, inclusive of determining if a stay alive signal ought to be withdrawn. Further, the communication between the ruler and the worker may be facilitated through the message entity. The message entity could have the additional task of communicating with a remote system. In the case of space exploration, the remote system could be mission control on earth, mission control on an orbital platform, or any other arrangement that can facilitate that is external to the collection of autonomic elements. It is foreseeable that the remote system could be an autonomic entity acting like the project manager for the mission. Communication with mission control may be limited to the download of science data and status information. An example of such a grouping is shown in FIG. 36 where autonomic entity 3602 is shown as a ruler entity, autonomic entity 3610 as a message entity, and autonomic entities 3618 and 3620 are examples of worker entities. In terms of hardware, these entities can be all identical with the discernable difference being programming to accomplish assigned tasks. An added advantage to having identical hardware may be replacing failed entities, which can be accomplished by activating software code found in the autonomic entity. If hardware differences exist they can be based on specialized equipment suitable for a particular task. However, at a minimum, certain functions or roles, such as ruler and messenger, may be expected to be within the skill set of all the autonomic entities.

As shown in FIG. 36, ruler autonomic entity 3602 may comprise a program or process 3604 executing in ruler entity 3602. Ruler entity 3602 can be implemented using a data processing system, such as data processing system 2302 in FIG. 23, or in the form of an autonomous agent compiled by a data processing system. In the alternative, the ruler entity could be an autonomous nano-technology swarm that may be launched from a factory ship for exploring planets, asteroids, or comets. Further, analysis module 3606 or agent as executed by ruler entity 3602 can be used to monitor process 3604 and to receive pulse monitor and heart beat monitor signals from worker entities through the messenger entity. When analysis module 3606 is used to monitor process 3604, it may be to detect errors or problems with the operation of process 3604.

As shown in FIG. 36, analysis agent 3606 can include an evaluator or other monitoring engine used to monitor the operation of process 3604. Analysis agent 3606 may be executed in response to some event. This event can be a periodic event, such as the passage of some period of time or data received from one or more of the worker entities. Further, the event can be the initialization of internal procedures in process 3604 or the starting or restarting of ruler entity 3602. Depending on the particular implementation, analysis agent 3606 can continuously run in the background monitoring process 3604 and analyzing the worker entity signals. See method 300 in FIG. 3 above for actions taken by analysis agent module 3606 in formulating a strategy for the worker entities. Further, analysis agent 3606 may be subject to any self-healing routines found in ruler entity 3602.

This monitoring by analysis agent 3606 may be based on rules stored in behavior storage 3608, which could be used to compare the actual behavior of the received data to an expected behavior as defined in behavior storage 3608. In the present arrangement, behavior storage 3608 (ruler entity 3602) may be a collection of rules that can be updated by a remote computer through the messenger entity that reflects most current fixes (self-healing) or repair procedures and responses to worker entities upon the occurrence of an event, change in condition, or deviation from a normal operation. Behavior storage 3608 can be narrowly tailored based on the use and purpose of the autonomic entity, such as messenger entity 3610 and have only those procedures needed to perform its programming.

When messenger entity connects to remote computer at a command and control station, database 3616 can be updated with information that can later be used to program ruler entity or worker entity. In some embodiments, a copy of the rules in database 3616 may contain the most up-to-date information. If the objective changes or a solution to a problem requires an updated version not found within the autonomic entity, the entities may attempt to contact message entity 3610 to see if more recent or up-to-date information is available. If updates are available, these updates may be sent to the requesting entity for processing.

The information in behavior storage 3608 and databases in messenger and worker entity can include an array of values that are expected when selected process or operations are implemented in the respective entity. Examples processes may be initializing software, timing requirements, synchronization of software modules, and other metrics that can provide information concerning the running of a process within the respective entity. Examples of operations may be data gathering, processing of information, controlling machinery, or any other operation where data processing systems are employed. These expected values can be compared to determine if an error condition has occurred in the operation of the entity. An error condition can be analyzed to determine its causes and possible correction. In the case of a worker entity, the error can be internally analyzed to select the appropriate self-healing procedure and the error can be sent to the ruler entity to be analyzed by analysis agent 3606 using the rules in behavior storage 3608. Based on the analysis, the ruler entity can elect to either withdraw the stay alive signal to the malfunctioning worker entity or wait a selected period to generate one or more stay alive signal, withdrawal of a stay alive signal, or a self-destruct signal. If the stay alive signal is withdrawn, the malfunctioning entity could be disconnected from the operation and assigned to another entity or partially performed by the remaining entity to insure its completion.

Figure 37:
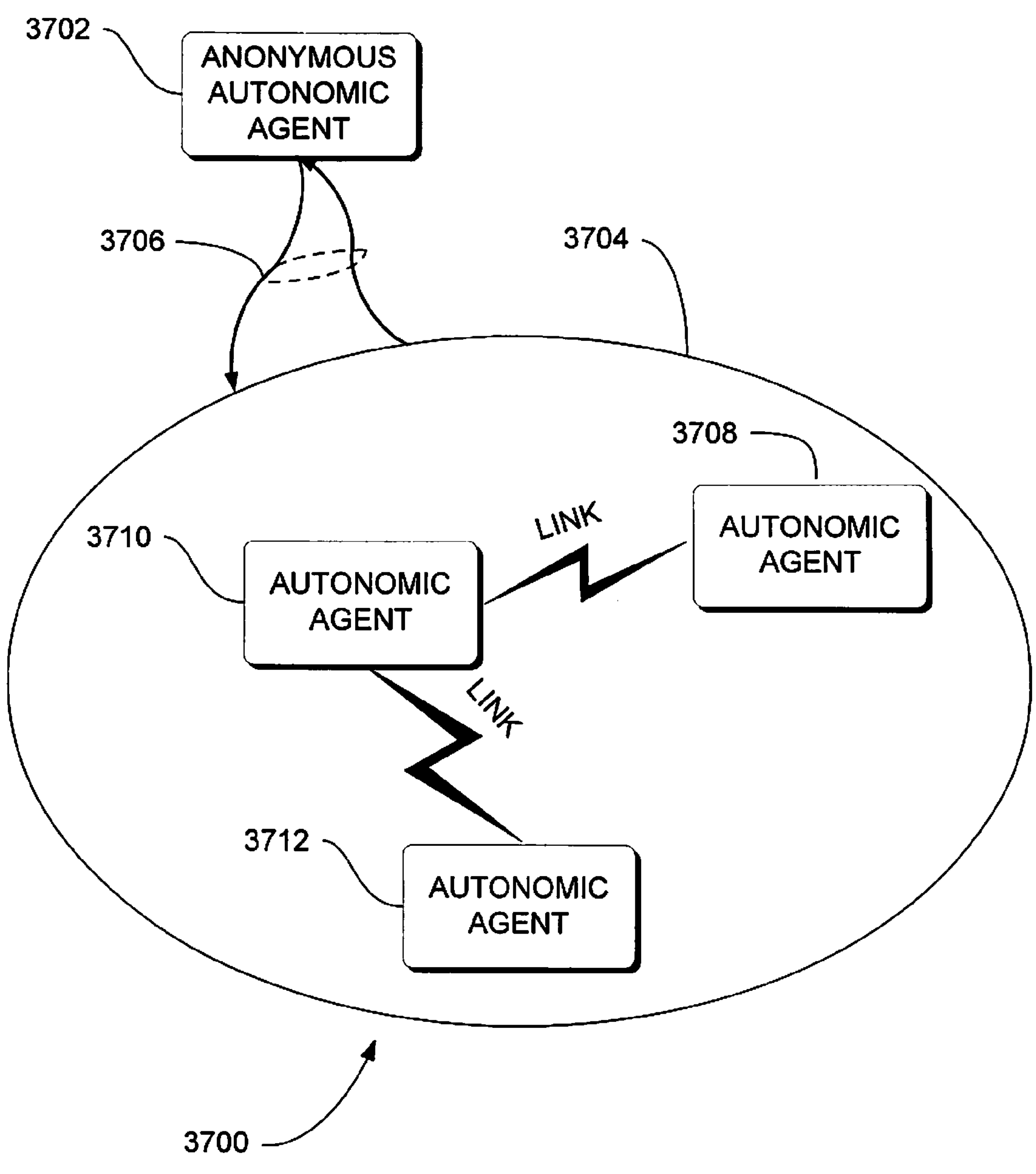
FIG. 37 is a block diagram of an autonomous entity management system, according to an embodiment.

FIG. 37 is a block diagram of an autonomous entity management system 3700 according to an embodiment. The system 3700 may be a generic system because it represents a myriad of devices, processes, or device and process that perform a task in accordance to its programming or design. The illustrated system 3700 represents an instance when an autonomous system 3704 encounters an anonymous autonomic agent 3702. An anonymous autonomous agent can be a visiting agent, a mobile agent that can enter the sphere of influence of the autonomous system 3704, or any device for which the autonomous system 3704 has no established relationship. Example encounters may be a wireless device (agent) and communication tower (system), a client and server, a video subscriber and video provider, a process and an operating system. System 3700 may solve the need in the art for management of autonomous entities that can be functionally extracted from an environment upon the occurrence of a predetermined condition such as a potential security breach.

The autonomous system 3704 may comprise one or more autonomic agents 3708, 3710, and 3712, all performing assigned functions and roles. As noted earlier, roles can be a combination of ruler, messenger, and worker. Functions may be data gathering, communication functions, scheduling, controlling, security, and so forth. Upon detecting anonymous autonomic agent 3702, the assigned autonomous agent for performing security functions for autonomous system 3704 may interrogate the anonymous autonomic agent 3702, requesting production of valid credentials. It should be noted at this point that detection can occur by employing various schemes such as when the anonymous autonomic agent 3702 requests resources from the system 3704 or from any autonomic entity that forms part of the system, response to polling signals from the autonomous system 3704, or through a friend or foe signal that indicates the presence of an anonymous entity 3702 in proximity to the autonomous system 3704.

To the autonomous system 3704, security may be important because of compromises by the accidental misuse of hosts by agents, as well as the accidental or intentional misuse of agents by hosts and agents by other agents. The result may be damage, denial-of-service, breach-of-privacy, harassment, social engineering, event-triggered attacks, or compound attacks. To prevent security breaches, it may be important to ensure that visiting agents have valid and justified reasons for being there as well as providing security to the visiting agent with interaction with other agents and host. Upon detection the visiting agent 3702 may be sent an asynchronous ALice signal (Autonomic license) 3706 requiring valid credentials from the agent 3702. The anonymous agent 3702 may need to work within the autonomic system 3704 to facilitate self-management, and as such the anonymous agent 3702 and its host may need to be able to identify each other's credentials through such as an ALice signal. The autonomic system 3704 can establish certain response characteristics for the returned signal from the agent 3702. For example, the autonomic system 3704 can require a response in an appropriate format, within a certain timeout period, and with a valid and justified reason for being within the locus of interest or domain of the autonomous system 3704. For protection, the autonomic system 3704 may make an assessment of the quality of the response from the anonymous agent 3702 to ascertain the potential of the agent for causing harm to the autonomous system 3704. Based on this determination the autonomous system 3704 can control the type of interaction with the agent 3702. The agent can be destroyed, blocked, partially blocked, stay alive signal withdrawn, or allowed to communicate with other agents within the autonomous system 3704. The protection can be triggered at any level of infraction or by a combination of infractions by the anonymous autonomous agent 3702 when responding to the ALice signal. If the agent 3702 fails to identify itself appropriately following an ALice interrogation, the agent 3702 may be blocked from the system and given either a self-destruct signal, or its "stay alive" reprieve is withdrawn. The consequence of an unacceptable response by an anonymous agent 3702, should it fail to do so within a timeout period, may be that the agent 3702 may be determined to be an intruder or other invalid agent (process) and consequently it is destroyed and/or excluded from communicating with other agents 3708, 3710, 3712 in the system. As an alternative to the ALice signal, a quiesce signal, command or instruction can be sent. The quiesce signal is discussed in more detail in conjunction with FIGS. 5, 6 and 24.

Figure 38:
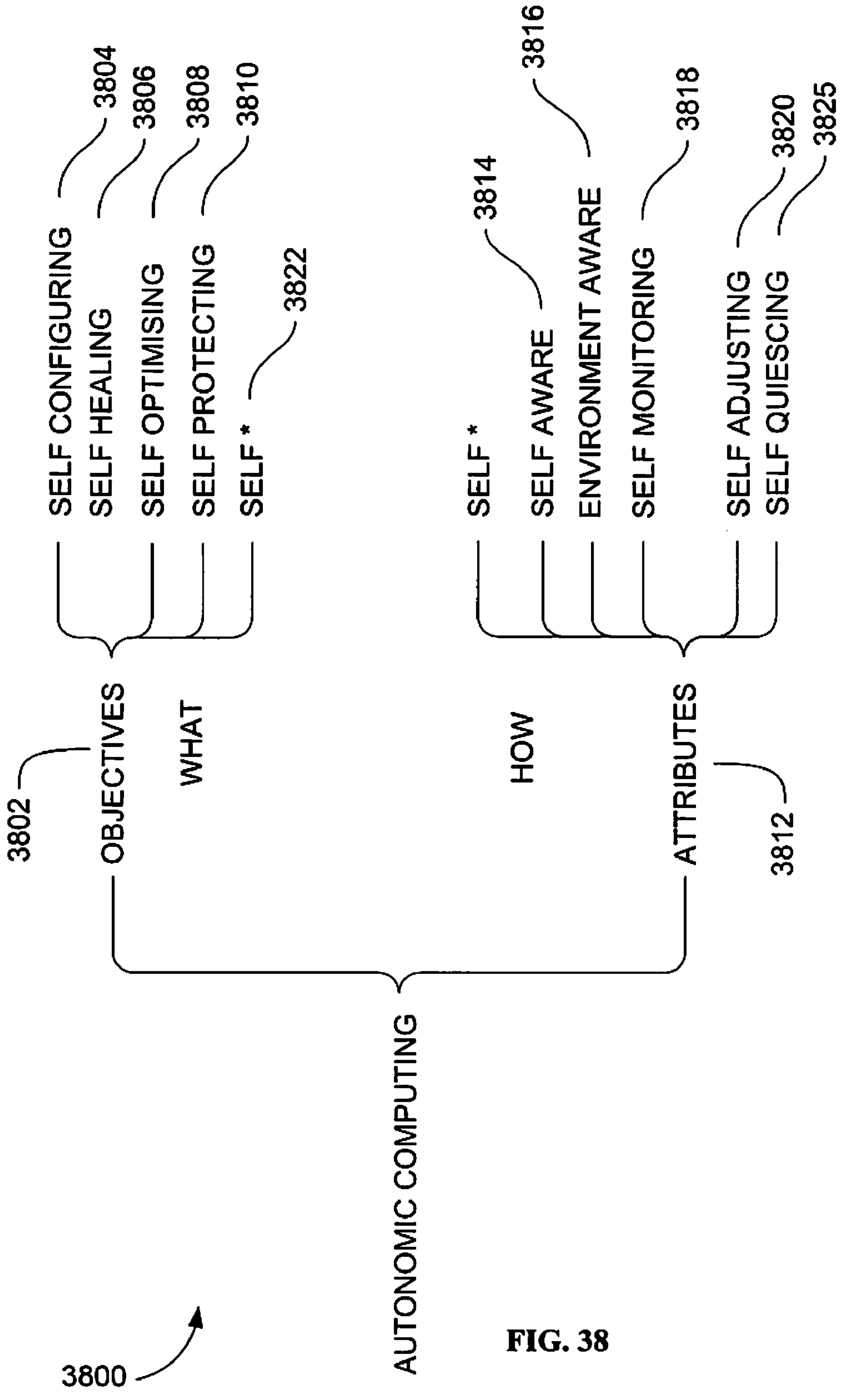
FIG. 38 is a hierarchical chart of an autonomous entity management system, according to an embodiment.

FIG. 38 is a hierarchical chart of an autonomous entity management system 3800, according to an embodiment. Properties that a system may possess in order to constitute an autonomic system are depicted in the autonomous entity management system 3800.

General properties of an autonomic (self-managing) system may include four objectives defined by International Business Machines 3802: self-configuring 3804, self-healing 3806, self-optimizing 3808 and self-protecting 3810, and four attributes 3812: self-awareness 3814, environment-awareness 3816, self-monitoring 3818 and self-adjusting 3820. One skilled in the art will recognize that other properties also exist, such as self-quiescing 3825. Essentially, the objectives 3802 could represent broad system requirements, while the attributes 3812 identify basic implementation mechanisms.

Self-configuring 3804 may represent an ability of the system 3800 to re-adjust itself automatically; this can simply be in support of changing circumstances, or to assist in self-healing 3806, self-optimization 3808 or self-protection 3810. Self-healing 3806, in reactive mode, is a mechanism concerned with ensuring effective recovery when a fault occurs, identifying the fault, and then, where possible, repairing it. In proactive mode, the self-healing 3806 objective may monitor vital signs in an attempt to predict and avoid "health" problems (i.e. reaching undesirable situations).

Self-optimization 3808 may mean that the system 3800 is aware of ideal performance of the system 3800, can measure current performance of the system 3800 against that ideal, and has defined policies for attempting improvements. The system 3800 can also react to policy changes within the system as indicated by the users. A self-protecting 3810 system 3800 can defend the system 3800 from accidental or malicious external attack, which necessitates awareness of potential threats and a way of handling those threats.

Self-managing objectives 3802 may require awareness of an internal state of the system 3800 (i.e. self-aware 3814) and current external operating conditions (i.e. environment-aware 3816). Changing circumstances can be detected through self-monitoring and adaptations are made accordingly (i.e. self-adjusting 3820). Thus, system 3800 may have knowledge of available resources, components, performance characteristics and current status of the system, and the status of interconnections with other systems, along with rules and policies of therein can be adjusted. Such ability to operate in a heterogeneous environment may require the use of open standards to enable global understanding and communication with other systems.

These mechanisms may not be independent entities. For instance, if an attack is successful, this may include self-healing actions, and a mix of self-configuration and self-optimisation, in the first instance to ensure dependability and continued operation of the system, and later to increase the self-protection against similar future attacks. Finally, these self-mechanisms could ensure there is minimal disruption to users, avoiding significant delays in processing.

Other self * properties have emerged or have been revisited in the context of autonomicity. We highlight some of these briefly here. Self-* 3822 may be self-managing properties, as follows. Self-anticipating is an ability to predict likely outcomes or simulate self-* actions. Self-assembling is an assembly of models, algorithms, agents, robots, etc.; self-assembly is often influenced by nature, such as nest construction in social insects. Self-assembly is also referred to as self-reconfigurable systems. Self-awareness is "know thyself" awareness of internal state; knowledge of past states and operating abilities. Self-chop is the initial four self-properties (Self-Configuration 3804, Self-Healing 3806, Self-Optimisation 3808 and Self-Protection 3810). Self-configuring is an ability to configure and re-configure in order to meet policies/goals. Self-critical is an ability to consider if policies are being met or goals are being achieved (alternatively, self-reflect). Self-defining is a reference to autonomic event messages between Autonomic Managers: contains data and definition of that data-metadata (for instance using XML). In reference to goals/policies: defining these (from self-reflection, etc.). Self-governing is autonomous: responsibility for achieving goals/tasks. Self-healing is reactive (self-repair of faults) and Proactive (predicting and preventing faults). Self-installing is a specialized form of self-configuration—installing patches, new components, etc or re-installation of an operating system after a major crash. Self-managing is autonomous, along with responsibility for wider self-* management issues. Self-optimizing is optimization of tasks and nodes. Self-organized is organization of effort/nodes; particularly used in networks/communications. Self-protecting is an ability of a system to protect itself. Self-reflecting is an ability to consider if routine and reflex operations of self-* operations are as expected and can involve self-simulation to test scenarios. Self-similar is self-managing components created from similar components that adapt to a specific task, for instance a self-managing agent. Self-simulation is an ability to generate and test scenarios, without affecting the live system. Self-aware is self-managing software, firmware and hardware.

Figure 39:
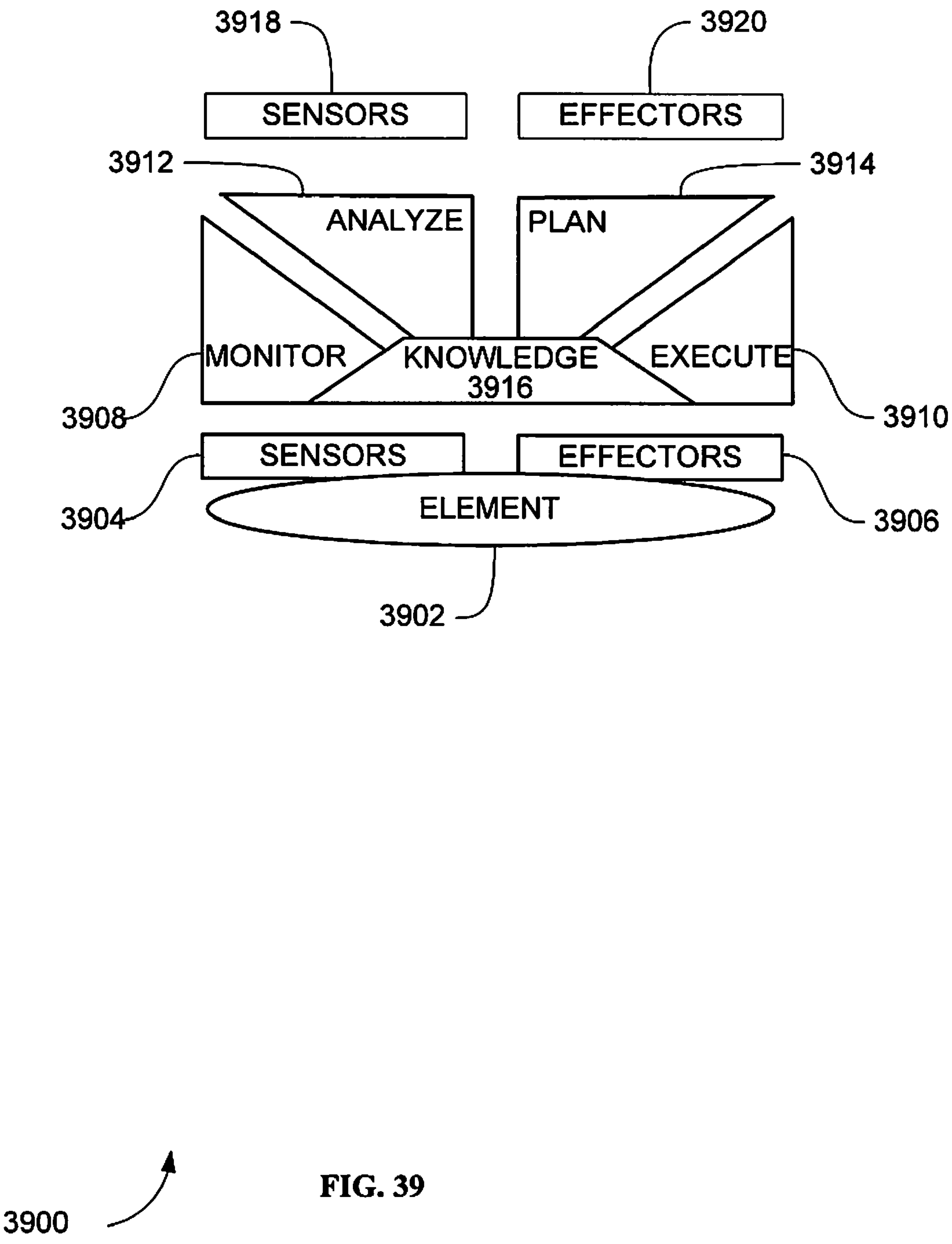
FIG. 39 is a block diagram of an autonomic element, according to an embodiment.

FIG. 39 is a block diagram of an autonomic element 3900, according to an embodiment. Autonomic element 3900 may include an element 3902 that is operably coupled to sensors and 3904 and effectors 3906.

Autonomic element 3900 may also include components that monitor 3908, execute 3910, analyze 3912 and plan 3914; those components may access knowledge 3916. Those components can interact with sensors 3918 and effectors 3920.

Figure 40:
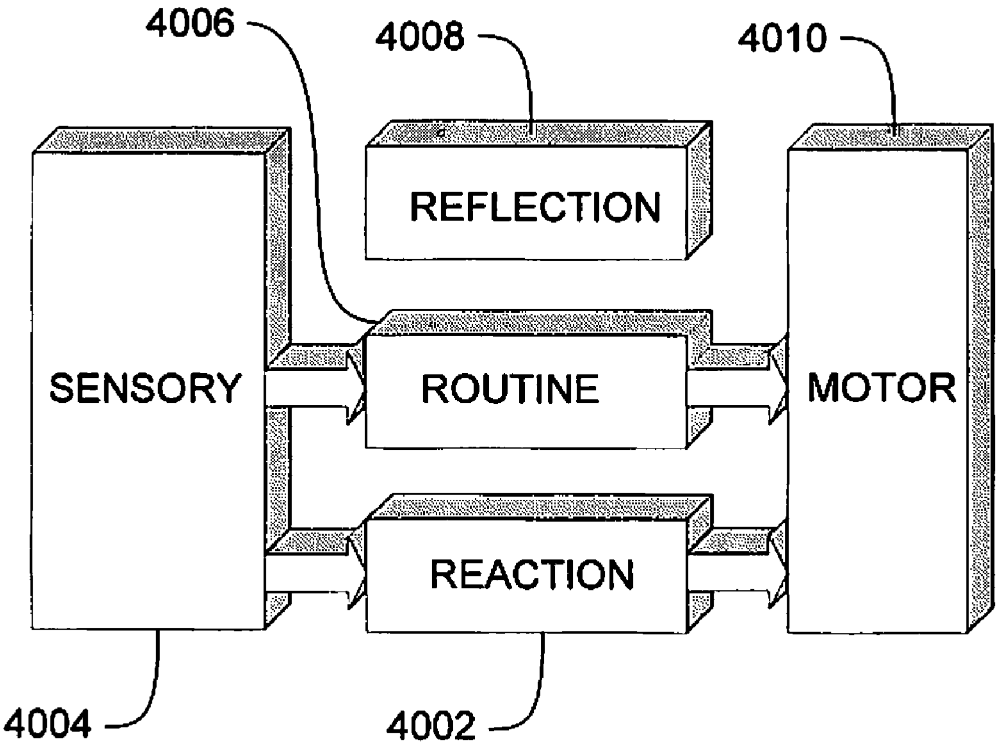
FIG. 40 is a block diagram of autonomy and autonomicity at a high system level, according to an embodiment.

FIG. 40 is a block diagram of autonomy and autonomicity 4000 at a high system level, according to an embodiment. A high level perspective for an intelligent machine design is depicted in FIG. 40. This diagram of autonomy and autonomicity 4000 includes intelligent machine design and system level autonomy and autonomicity.

FIG. 40 describes three levels for the design of intelligent systems:

1) Reaction 4002—the lowest level, where no learning occurs but there is immediate response to state information coming from sensory systems 4004.

2) Routine 4006—middle level, where largely routine evaluation and planning behaviors take place. Input is received from sensory system 4004 as well as from the reaction level and reflection level. This level of assessment results in three dimensions of affect and emotion values: positive affect, negative affect, and (energetic) arousal.

3) Reflection 4008—top level, receives no sensory 4004 input or has no motor 4010 output; input is received from below. Reflection is a meta-process, whereby the mind deliberates about itself. Essentially, operations at this level look at the system's representations of its experiences, its current behavior, its current environment, and so forth.

As illustrated, input from, and output to, the environment may only take place within the reaction 4002 and routine 4006 layers. One can consider that reaction 4002 level essentially sits within the "hard" engineering domain, monitoring the current state of both the machine and its environment, with rapid reaction to changing circumstances; and, that the reflection 4002 level can reside within an artificial domain utilizing its techniques to consider the behavior of the system and learn new strategies. The routine 4006 level can be a cooperative mixture of both. The high-level intelligent machine design may be appropriate for autonomic systems as depicted here in FIG. 40, in consideration of the dynamics of responses including reaction 4002 and also for reflection 4008 of self-managing behavior.

As depicted autonomic computing can reside within the domain of the reaction 4002 layer as a result of a metaphoric link with the autonomic biological nervous system, where no conscious or cognitive activity takes place. Other biologically-inspired computing (also referred to as nature-inspired computing, organic computing, etc.) may provide such higher level cognitive approaches for instance as in swarm intelligence. Within the autonomic computing research community, autonomicity may not normally be considered to imply this narrower view. Essentially, the autonomic self-managing metaphor can be considered to aim for a user/manager to be able to set high-level policies, while the system achieves the goals. Similar overarching views exist in other related initiatives and, increasingly, they are influencing each other.

In terms of autonomy and autonomicity, autonomy can be considered as being self-governing while autonomicity can be considered being self-managing. At the element level, an element may have some autonomy and autonomic properties, since to self-manage implies some autonomy, while to provide a dependable autonomous element requires such autonomic properties as self-healing along with the element's self-directed task. From this perspective, it would appear that the separation of autonomy and autonomicity as characteristics will decrease in the future and eventually will become negligible. On the other hand, at the system level if one considers again the three tiers of the intelligent machine design (reaction 4002, routine 4006, and reflection 4008) and accepts the narrower view of autonomicity, there is a potential correlation between the levels. That is, the reaction 4002 level correlates with autonomicity, and the reflection 4008 level correlates with autonomy; autonomy as in self-governing of the self-managing policies within the system.

Figure 41:
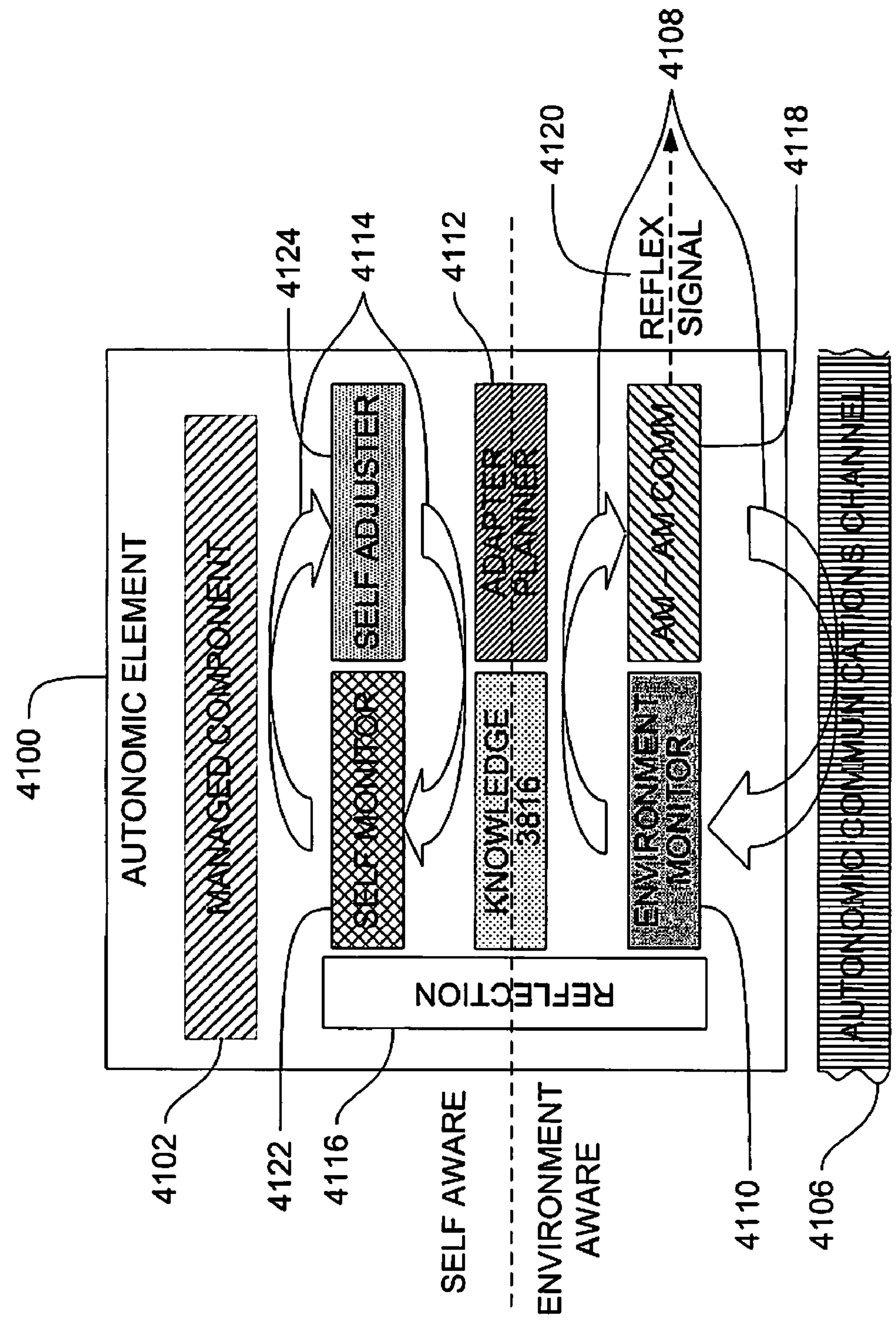
FIG. 41 is a block diagram of an architecture of an autonomic element (AE), according to an embodiment that may include reflection and reflex layers.

FIG. 41 is a block diagram of an architecture of an autonomic element (AE) 4100 according to an embodiment that includes reflection and reflex layers. The autonomic element 4100 may include a managed component (MC) 4102 that is managed, and the autonomic element 4100 may further include an autonomic manager (AM), not shown. The AM may be responsible for the MC 4102 within the AE 4100. The AM can be designed as part of the component or provided externally to the component, as an agent, for instance. Interaction of the autonomic element 4100 can occur with remote (external) autonomic managers (cf. the autonomic communications channel 4106) through virtual, peer-to-peer, client-server or grid configurations.

An important aspect of the architecture of many autonomic systems can be sensors and effectors, such as shown in FIG. 39. A control loop 4108 can be created by monitoring 4110 behavior through sensors, comparing this with expectations (knowledge 3916, as in historical and current data, rules and beliefs), planning 4112 what action is necessary (if any), and then executing that action through effectors. The closed loop of feedback control 4108 can provide a basic backbone structure for each system component. FIG. 41 describes at least two control loops in the autonomic element 4100, one for self-awareness 4114 and another 4108 for environmental awareness.

In some embodiments, the self-monitor/self-adjuster control loop 4114 can be substantially similar to the monitor, analyze, plan and execute (MAPE) control loop described in FIG. 39. The monitor-and-analyze parts of the structure can perform a function of processing information from the sensors to provide both self-awareness 4114 and an awareness 4108 of the external environment. The plan-and-execute parts can decide on the necessary self-management behavior that will be executed through the effectors. The MAPE components can use the correlations, rules, beliefs, expectations, histories, and other information known to the autonomic element, or available to it through the knowledge repository 3916 within the AM 4104.

A reflection component 4116 may perform analysis computation on the AE 4100 (cf. the reflection component 4116 within the autonomic manager). In terms of an autonomic system, reflection can be particularly helpful in order to allow the system to consider the self-managing policies, and to ensure that the policies are being performed as expected. This may be important since autonomicity involves self-adaptation to the changing circumstances in the environment. An autonomic manager communications (AM/AM) component 4118 can also produce a reflex signal 4120. A self adjuster 4122 can be operably coupled to a self-monitor 4124 in the self control loop 4114.

CONCLUSION

The systems, methods and apparatus disclosed herein provide autonomic environmental safety devices, such as smoke detectors, that may be associated in a heuristic neural system (HNS) architecture in which a heart beat monitor signal and a reflex signal may be exchanged between devices in the HNS so that stay-alive signals and stay-awake signals to the devices can be controlled in ways that provide more reliable alerts of environmental danger.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in procedural terms, one of ordinary skill in the art will appreciate that implementations can be made in an object-oriented design environment or any other design environment that may provide the required relationships.

In particular, one of skill in the art will readily appreciate that the names of the methods and apparatus may be not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new environmental safety devices.

The terminology used in this application is meant to include all environments and alternate technologies which provide the same functionality as described herein.

We claim:

1. A computer-accessible medium in a first autonomic environmental safety device, the computer-accessible medium having executable instructions of autonomic communication, the executable instructions capable of directing a processor of the first autonomic environmental safety device to perform:

receiving a quiesce instruction from a second autonomic environmental safety device; and invoking a function of a quiesce component of the first autonomic environmental safety device, wherein the function of the quiesce component comprises deactivating the first autonomic environmental safety device, and then, if the first autonomic environmental safety device does not receive a stay-alive reprieve signal after a predetermined period of time, the first autonomic environmental safety device self-destructs.

2. The computer-accessible medium of claim 1, wherein the autonomic environmental safety device comprises a smoke detector.

3. The computer-accessible medium of claim 1, wherein transmitting environment health/urgency data is performed before transmitting self health/urgency data.

4. The computer-accessible medium of claim 1, wherein transmitting environment health/urgency data is performed simultaneously with transmitting self health/urgency data.

5. The computer-accessible medium of claim 1, wherein the executable instructions further comprise transmitting the environment health/urgency data and the self health/urgency data together.

6. The computer-accessible medium of claim 5, wherein the executable instructions further comprise encapsulating the environment health/urgency data and the self health/urgency data in a packet.

7. The computer-accessible medium of claim 1, the medium further comprising executable instructions capable of directing the processor to perform transmitting event messages.

8. The computer-accessible medium of claim 1, the medium further comprising executable instructions capable of directing the processor to perform:

receiving self health/urgency data from a self control loop component of the autonomic environmental safety device.

9. The computer-accessible medium of claim 1, the medium further comprising executable instructions capable of directing the processor to perform:

receiving environment health/urgency data from an environment control loop component of the autonomic environmental safety device.

10. An autonomic environmental safety device, the autonomic environmental safety device comprising:

a self-monitor that is operable to receive information from sensors and operable to monitor and analyze the sensor information and access a knowledge repository;

a self-adjuster operably coupled to the self-monitor in a self control loop, the self adjuster operable to access the knowledge repository, the self adjuster operable to transmit data to effectors, and self adjuster operable to plan and execute;

an environment-monitor that is operable to receive information from the sensors and operable to monitor and analyze the sensor information and access the knowledge repository;

an autonomic manager communications component operably coupled to the environment-monitor in an environment control loop, the autonomic manager communications component being operable to access the knowledge repository, and to produce and transmit a pulse monitor signal, the pulse monitor signal including a heart beat monitor signal and a reflex signal, the reflex signal including self health/urgency data and environment health/urgency data; and a quiescing component operably coupled to the self-monitor, the quiescing component receiving a quiescence instruction from another autonomic environmental safety device, the quiescing component withdrawing a stay-awake signal, if the first autonomic environmental safety device does not receive a stay-alive reprieve signal after a predetermined period of time, the first autonomic environmental safety device self-destructs.

11. The autonomic environmental safety device of claim 10, wherein the autonomic environmental safety device further comprises a smoke detector.

12. The autonomic environmental safety device of claim 10, wherein the self health/urgency data further comprises uncompressed self health/urgency data, and wherein the environment health/urgency data further comprises uncompressed environment health/urgency data.

13. The autonomic environmental safety device of claim 10, wherein the autonomic manager communications component is further operable to transmit the environment health/urgency data and the self health/urgency data together.

14. The autonomic environmental safety device of claim 13, wherein the autonomic manager communications component is further operable to encapsulate the environment health/urgency data and the self health/urgency data in a packet.

15. The autonomic environmental safety device of claim 10, wherein the pulse monitor signal further comprises at least one of an urgency signal, environmental condition, and an event condition.

16. A method for managing a first smoke detector based on a functioning state and an operating status of the smoke detector, the method comprising:

receiving a quiesce instruction from a second smoke detector;

invoking a function of a quiesce component of the first smoke detector, wherein the function of the quiesce component comprises deactivating the first smoke detector, and then, if the first smoke detector does not receive a stay-alive reprieve signal after a predetermined period of time, the first smoke detector self-destructs;

generating one or more stay-awake signal based on the functioning state and operating status of the first smoke detector.

17. The method of claim 16, wherein the generating one or more stay-awake signal is based on processing received signals from the smoke detector indicative of functioning state and operating status to obtain an analysis of the condition of the smoke detector.

18. The method of claim 16, wherein the functioning state of the smoke detector comprises one or more on signal, off signal, active signal, and inactive signal.

19. The method of claim 16, wherein the operating status of the smoke detector comprises one or more urgency signal, reflex signal, environmental condition, and event condition.

20. The method of claim 19, wherein an event condition further comprises one or more incorrect operation, emergent behavior, failure to perform self healing, and likelihood of jeopardizing primary objectives.

21. An autonomic system, the autonomic system comprising:

a plurality of autonomic environmental safety devices performing one or more programmed tasks;

a coordinating autonomic environmental safety device for assigning programmed tasks and for issuing instructions to the plurality of autonomic environmental safety devices;

a messenger autonomic environmental safety device for facilitating communication among the coordinating autonomic environmental safety device, plurality of autonomic environmental safety devices, and a remote system;

wherein one or more programmed tasks performed by the plurality of autonomic environmental safety device is generating signals indicative of functional state and operating status;

wherein the coordinating autonomic environmental safety device based on the generated signals emits a stay-awake signal to one or more of the plurality of autonomic environmental safety devices, and then, if the at least one autonomic environmental safety device does not receive the stay-awake signal after a predetermined period of time, the at least one autonomic environmental safety device self-destructs, and wherein the coordinating autonomic environmental safety device based on the generated signals emits a quiesce signal to one or more of the plurality of autonomic environmental safety devices.

22. The autonomic system of claim 21, wherein the plurality of autonomic environmental safety devices further comprises a plurality of smoke detectors.

23. The autonomic system of claim 21, where in the functioning state of the system comprises one or more on signal, off signal, active signal, and inactive signal.

24. The autonomic system of claim 23, wherein the operating status of the system comprises one or more urgency signal, reflex signal, environmental condition, and event condition.

25. The autonomic system of claim 24, wherein an event condition further comprises one or more incorrect operation, emergent behavior, failure to perform self healing, and likelihood of jeopardizing primary objectives.

26. An autonomous system, the autonomous system comprising:

a first autonomic environmental safety device composed of self-similar autonomic components;

a second autonomic environmental safety device composed of self-similar autonomic components;

a third autonomic environmental safety device composed of self-similar autonomic components;

wherein the third autonomic environmental safety device facilitates communication between the first autonomic environmental safety device and the second autonomic environmental safety device;

wherein the first autonomic environmental safety device generates a heart beat monitor signal and pulse monitor signal;

wherein the second autonomic environmental safety device generates a stay- awake signal based on the generated heart beat monitor signal and pulse monitor signal from the first autonomic environmental safety device, and then, if the first autonomic environmental safety device does not receive a stay-awake signal after a predetermined period of time, the first autonomic environmental safety device self-destructs, and wherein the second autonomic environmental safety device generates a quiesce signal based on the generated heart beat monitor signal and pulse monitor signal from the first autonomic environmental safety device.

27. The autonomous system of claim 26, wherein each autonomic environmental safety device comprises a first plurality of neural basis functions and a first evolvable neural interface operably coupled to each of the first plurality of neural basis functions.

28. The autonomous system of claim 26, wherein each of the autonomic environmental safety devices comprises a smoke detector.

29. A computer-accessible medium having executable instructions to construct an environment of an autonomic environmental safety device to satisfy increasingly demanding external requirements, the executable instructions capable of directing a processor to perform:

instantiating a first embryonic evolvable neural interface;

evolving the first embryonic evolvable neural interface towards complex complete connectivity;

wherein the evolvable neural interface receives one or more heart beat monitor signal, pulse monitor signal, and quiesce signal, wherein the evolvable neural interface generates one or more heart beat monitor signal, pulse monitor signal, and quiesce signal, wherein the quiesce signal comprises a stay-awake signal, wherein the first embryonic evolvable neural interface receives the quiesce signal from a second embryonic evolvable neural interface to withdraw a stay-awake signal, and then, if the first embryonic evolvable neural interface does not receive a stay-alive reprieve signal after a predetermined period of time, the first embryonic evolvable neural interface self-destructs.

30. The computer-accessible medium of claim 29, wherein the autonomic environmental safety device further comprises a smoke detector.

31. The computer-accessible medium of claim 29, wherein the embryonic evolvable neural interface further comprises a neural thread possessing only minimal connectivity.

32. A computer-accessible medium having executable instructions to protect an autonomic system, the executable instructions capable of directing a processor of the autonomic system to perform:

sending a quiesce signal to a first autonomic environmental safety device from a second autonomic environmental safety device;

monitoring the response of the autonomic environmental safety device to the quiesce signal;

determining the autonomic environmental safety device potential for causing harm to the autonomic system, and controlling the autonomic system based on the autonomic environmental safety device potential for causing harm to the autonomic system, wherein controlling the autonomic system further comprises blocking the autonomic environmental safety device from accessing certain resources, and generating a signal to the autonomic environmental safety device to transmit the autonomic environmental safety device stay-awake, and wherein a quiesce signal is a request for the autonomic environmental safety device to deactivate the autonomic environmental safety device, if the first autonomic environmental safety device does not receive a stay-alive reprieve signal, the first autonomic environmental safety device self-destructs.

33. The computer-accessible medium of claim 32, wherein the autonomic environmental safety device comprises a smoke detector.

34. The computer-accessible medium of claim 32, wherein controlling the autonomic system further comprises:

generating a signal to the autonomic environmental safety device to withdraw the autonomic environmental safety device stay-awake.

35. A computer system for protecting an autonomic system, the computer system comprising:

a processor;

a storage device coupled to the processor; and software operative on the processor for:

(i) sending a quiesce signal to an autonomic environmental safety device from a second autonomic environmental safety device;

(ii) monitoring the response of the autonomic environmental safety device to the quiesce signal;

(iii) determining the autonomic environmental safety device potential for causing harm to the autonomic system, and (iv) controlling the autonomic system in reference to potential of the autonomic system to cause harm to the autonomic system, wherein controlling the autonomic system further comprises withdrawing the autonomic environmental safety device stay-awake, wherein controlling the autonomic system is blocking the autonomic environmental safety device from accessing certain resources, and wherein the quiesce signal is a request for the autonomic environmental safety device to deactivate itself, and then, if the first autonomic environmental safety device does not receive a stay-alive reprieve signal, the first autonomic environmental safety device self-destructs.

36. The computer system of claim 35, wherein the autonomic environmental safety device further comprises a smoke detector.

* * * * *